United States Patent
Bayerlein et al.

(10) Patent No.: US 10,478,660 B2
(45) Date of Patent: Nov. 19, 2019

(54) RECUMBENT THERAPEUTIC AND EXERCISE DEVICE

(71) Applicant: Woodway USA, Inc., Waukesha, WI (US)

(72) Inventors: Douglas G. Bayerlein, Oconomowoc, WI (US); Nicholas A. Oblamski, Waukesha, WI (US); Jose D. Bernal-Ramirez, West Allis, WI (US); Daniel D. Wagner, Waukesha, WI (US)

(73) Assignee: Woodway USA, Inc., Waukesha, WI (US)

( * ) Notice: Subject to any disclaimer, the term of this patent is extended or adjusted under 35 U.S.C. 154(b) by 0 days.

(21) Appl. No.: 15/576,486

(22) PCT Filed: May 26, 2016

(86) PCT No.: PCT/US2016/034344
§ 371 (c)(1),
(2) Date: Nov. 22, 2017

(87) PCT Pub. No.: WO2016/191561
PCT Pub. Date: Dec. 1, 2016

(65) Prior Publication Data
US 2018/0154204 A1 Jun. 7, 2018

Related U.S. Application Data

(60) Provisional application No. 62/167,108, filed on May 27, 2015.

(51) Int. Cl.
*A63B 21/00* (2006.01)
*A61H 1/02* (2006.01)
(Continued)

(52) U.S. Cl.
CPC ....... *A63B 21/4033* (2015.10); *A61H 1/0214* (2013.01); *A61H 1/0277* (2013.01);
(Continued)

(58) Field of Classification Search
CPC . A63B 22/06; A63B 22/0605; A63B 22/0611; A63B 22/001; A63B 2022/0652;
(Continued)

(56) References Cited

U.S. PATENT DOCUMENTS

| | | | |
|---|---|---|---|
| 583,920 | A | 6/1897 | Montgomery |
| 1,820,372 | A | 8/1931 | Blomquist |

(Continued)

FOREIGN PATENT DOCUMENTS

| | | |
|---|---|---|
| EP | 2 364 686 A1 | 9/2011 |
| GB | 2 096 006 | 10/1982 |

(Continued)

OTHER PUBLICATIONS

Extended European Search Report for European Application No. 18156027.7, dated Nov. 6, 2018, 9 pages.
(Continued)

*Primary Examiner* — Nyca T Nguyen
(74) *Attorney, Agent, or Firm* — Foley & Lardner LLP

(57) ABSTRACT

Various embodiments related to a recumbent therapeutic and exercise device are provided herein. The recumbent therapeutic and exercise device includes a frame; a hand crank system coupled to the frame, the hand crank system including a hand crank rotatable by a user, wherein the hand crank is movable in a substantially vertical plane closer to and further from a support surface for the frame; and a foot crank system coupled to the frame, the foot crank system including a foot crank rotatable by the user, wherein the foot crank is movable in a substantially horizontal plane relative to the support surface for the fame.

6 Claims, 51 Drawing Sheets

(51) Int. Cl.
  *A63B 22/00*   (2006.01)
  *A63B 22/06*   (2006.01)
  *A63B 21/22*   (2006.01)
  *A63B 22/20*   (2006.01)
  *A63B 71/06*   (2006.01)
  *A63B 21/005*  (2006.01)
  *A63B 24/00*   (2006.01)
  *A63B 21/008*  (2006.01)
  *A63B 21/012*  (2006.01)
  *F03G 5/00*    (2006.01)
  *A63B 71/02*   (2006.01)
  *F03G 5/06*    (2006.01)

(52) U.S. Cl.
  CPC ....... *A61H 1/0281* (2013.01); *A63B 21/0051* (2013.01); *A63B 22/0005* (2015.10); *A63B 22/0012* (2013.01); *A63B 22/0015* (2013.01); *A63B 22/0605* (2013.01); *A63B 24/0087* (2013.01); *A63B 71/0622* (2013.01); *A61H 2201/0192* (2013.01); *A61H 2201/1223* (2013.01); *A61H 2201/1246* (2013.01); *A61H 2201/1261* (2013.01); *A61H 2201/1436* (2013.01); *A61H 2201/1445* (2013.01); *A61H 2201/1633* (2013.01); *A61H 2201/1671* (2013.01); *A61H 2201/5007* (2013.01); *A61H 2201/5043* (2013.01); *A61H 2201/5046* (2013.01); *A61H 2201/5048* (2013.01); *A61H 2201/5061* (2013.01); *A61H 2201/5097* (2013.01); *A61H 2203/0406* (2013.01); *A61H 2230/06* (2013.01); *A63B 21/0053* (2013.01); *A63B 21/0055* (2015.10); *A63B 21/0058* (2013.01); *A63B 21/00069* (2013.01); *A63B 21/0083* (2013.01); *A63B 21/0087* (2013.01); *A63B 21/00178* (2013.01); *A63B 21/00181* (2013.01); *A63B 21/0125* (2013.01); *A63B 21/154* (2013.01); *A63B 21/157* (2013.01); *A63B 21/225* (2013.01); *A63B 22/0007* (2013.01); *A63B 22/203* (2013.01); *A63B 2022/0623* (2013.01); *A63B 2022/0647* (2013.01); *A63B 2022/0652* (2013.01); *A63B 2024/0093* (2013.01); *A63B 2071/025* (2013.01); *A63B 2071/065* (2013.01); *A63B 2071/068* (2013.01); *A63B 2071/0625* (2013.01); *A63B 2071/0683* (2013.01); *A63B 2208/0204* (2013.01); *A63B 2220/51* (2013.01); *A63B 2225/09* (2013.01); *A63B 2225/093* (2013.01); *A63B 2225/20* (2013.01); *A63B 2225/50* (2013.01); *A63B 2225/685* (2013.01); *A63B 2230/06* (2013.01); *F03G 5/00* (2013.01); *F03G 5/06* (2013.01)

(58) Field of Classification Search
  CPC .......... A63B 23/035–03591; A63B 23/03575; A63B 23/03583; A63B 22/0007–0012; A63B 23/03591; A61H 1/0214
  See application file for complete search history.

(56) References Cited

U.S. PATENT DOCUMENTS

| | | | |
|---|---|---|---|
| D191,792 S | 11/1961 | Maratta | |
| 3,017,180 A | 1/1962 | Allan | |
| 3,213,852 A | 10/1965 | Zent | |
| 3,216,722 A | 11/1965 | Odam | |
| 3,572,699 A | 3/1971 | Nies | |
| 3,824,993 A | 7/1974 | Grant | |
| 3,964,742 A | 6/1976 | Carnielli | |
| 3,991,749 A * | 11/1976 | Zent | A61H 1/02 601/36 |
| 4,402,502 A * | 9/1983 | Peters | A61H 1/0214 482/139 |
| 4,436,097 A | 3/1984 | Cunningham | |
| 4,572,501 A | 2/1986 | Durham et al. | |
| 4,589,656 A | 5/1986 | Baldwin | |
| 4,612,447 A | 9/1986 | Rowe | |
| 4,618,141 A | 10/1986 | Ashworth, Jr. | |
| 4,688,791 A * | 8/1987 | Long | A63B 22/001 482/112 |
| 4,712,789 A | 12/1987 | Brilando | |
| 4,842,269 A | 6/1989 | Huang | |
| 4,846,156 A | 7/1989 | Kopnicky | |
| 4,934,692 A | 6/1990 | Owens | |
| 4,947,836 A * | 8/1990 | Laenger | A61N 1/36003 482/2 |
| 4,976,426 A | 12/1990 | Szabo et al. | |
| 5,145,479 A | 9/1992 | Olschansky et al. | |
| 5,242,179 A | 9/1993 | Beddome et al. | |
| 5,242,339 A | 9/1993 | Thornton | |
| 5,318,487 A | 6/1994 | Golen et al. | |
| 5,330,402 A | 7/1994 | Johnson | |
| 5,336,147 A * | 8/1994 | Sweeney, III | A63B 22/0012 482/57 |
| 5,342,262 A | 8/1994 | Hansen | |
| 5,449,334 A | 9/1995 | Kingsbury | |
| 5,569,128 A | 10/1996 | Dalebout | |
| 5,595,557 A | 1/1997 | Lambert et al. | |
| 5,601,515 A | 2/1997 | Matsumoto | |
| 5,857,943 A | 1/1999 | Murray | |
| 5,906,563 A | 5/1999 | Pittari | |
| 5,980,431 A | 11/1999 | Miller, Jr. | |
| 6,036,623 A * | 3/2000 | Mitchell | A63B 23/03575 482/57 |
| 6,135,923 A * | 10/2000 | Stearns | A63B 22/001 482/51 |
| 6,328,676 B1 | 12/2001 | Alessandri | |
| 6,454,679 B1 | 9/2002 | Radow | |
| 6,840,892 B1 * | 1/2005 | Wu | A63B 21/00181 482/51 |
| 6,902,515 B2 | 6/2005 | Howell et al. | |
| 6,960,155 B2 | 11/2005 | Chien et al. | |
| 7,510,512 B1 | 3/2009 | Taggett | |
| 7,789,808 B2 * | 9/2010 | Lee | A63B 22/0007 482/57 |
| 7,862,483 B2 | 1/2011 | Hendrickson et al. | |
| 8,075,450 B2 | 12/2011 | Fabbri et al. | |
| 8,113,996 B1 | 2/2012 | Allen | |
| 8,118,715 B2 | 2/2012 | Greene et al. | |
| 8,206,269 B2 | 6/2012 | Fabbri et al. | |
| 8,328,214 B2 | 12/2012 | Yang | |
| 8,409,060 B2 | 4/2013 | Hsu | |
| 8,676,170 B2 | 3/2014 | Porrati et al. | |
| 9,305,141 B2 | 4/2016 | Fabrizio | |
| D788,792 S | 6/2017 | Alessandri et al. | |
| 9,824,110 B2 | 11/2017 | Giudici et al. | |
| 2002/0061804 A1 | 5/2002 | Hasegawa | |
| 2004/0097341 A1 | 5/2004 | Alessandri et al. | |
| 2004/0259693 A1 * | 12/2004 | Chien | A61H 1/0214 482/62 |
| 2006/0003871 A1 * | 1/2006 | Houghton | A63B 22/001 482/57 |
| 2008/0085819 A1 | 4/2008 | Yang | |
| 2008/0254949 A1 * | 10/2008 | Fernandes | A63B 22/001 482/62 |
| 2010/0222182 A1 | 9/2010 | Park | |
| 2010/0234179 A1 | 9/2010 | Cronje | |
| 2012/0264569 A1 | 10/2012 | Escobedo et al. | |
| 2014/0243160 A1 | 8/2014 | Lim | |
| 2015/0157895 A1 | 6/2015 | Bettini | |

(56) References Cited

U.S. PATENT DOCUMENTS

| | | |
|---|---|---|
| 2018/0111023 A1 | 4/2018 | Cei et al. |
| 2018/0229065 A1 | 8/2018 | Leonardi et al. |

FOREIGN PATENT DOCUMENTS

| | | |
|---|---|---|
| WO | WO-2009/014330 A1 | 1/2009 |
| WO | WO-2016/093596 A1 | 6/2016 |

OTHER PUBLICATIONS

International Search Report and Written Opinion regarding Application No. PCT/US2016/034344, dated Aug. 31, 2016, 16 pps.

Liszewski, Andrew, "EcoMill Treadmill Generates Its Own Power", Jun. 1, 2009, http://www.ohgizmo.com/2009/06/04/ecomill-treadmill-generates-its-own-power/, 1 page.

NASA, "International Space Station: Combined Operational Load Bearing External Resistance Treadmill (COLBERT)", Jul. 19, 2017, https://www.nasa.gov/mission_pages/station/research/experiments/765.html, 4 pages.

NASA, "International Space Station: Do Tread on Me", Aug. 19, 2009, https://www.nasa.gov/mission_pages/station/behindscenes/colbert_feature.html, 2 pages.

NASA, "International Space Station: Treadmill with Vibration Isolation and Stabilization System (TVIS)", May 17, 2018, https://www.nasa.gov/mission_pages/station/research/experiments/976.html, 5 pages.

NASA, "Space Shuttle Mission STS-128: Racking Up New Science", Press Kit, Aug. 2009, 116 pages.

Owners Manual, Force 1, Nov. 29, 2007, 44 pages.

Southern Research et al., "AIMTech Project Brief", Oct. 20, 2015, 2 pages.

Southern Research et al., "Resist Force-Induced Treadmill", 2 pages.

Woodway, "Introducing the All New EcoMill Self Powered", published to YouTube on Mar. 25, 2010, https://www.youtube.com/watch?v=NcPH92DAArc.

\* cited by examiner

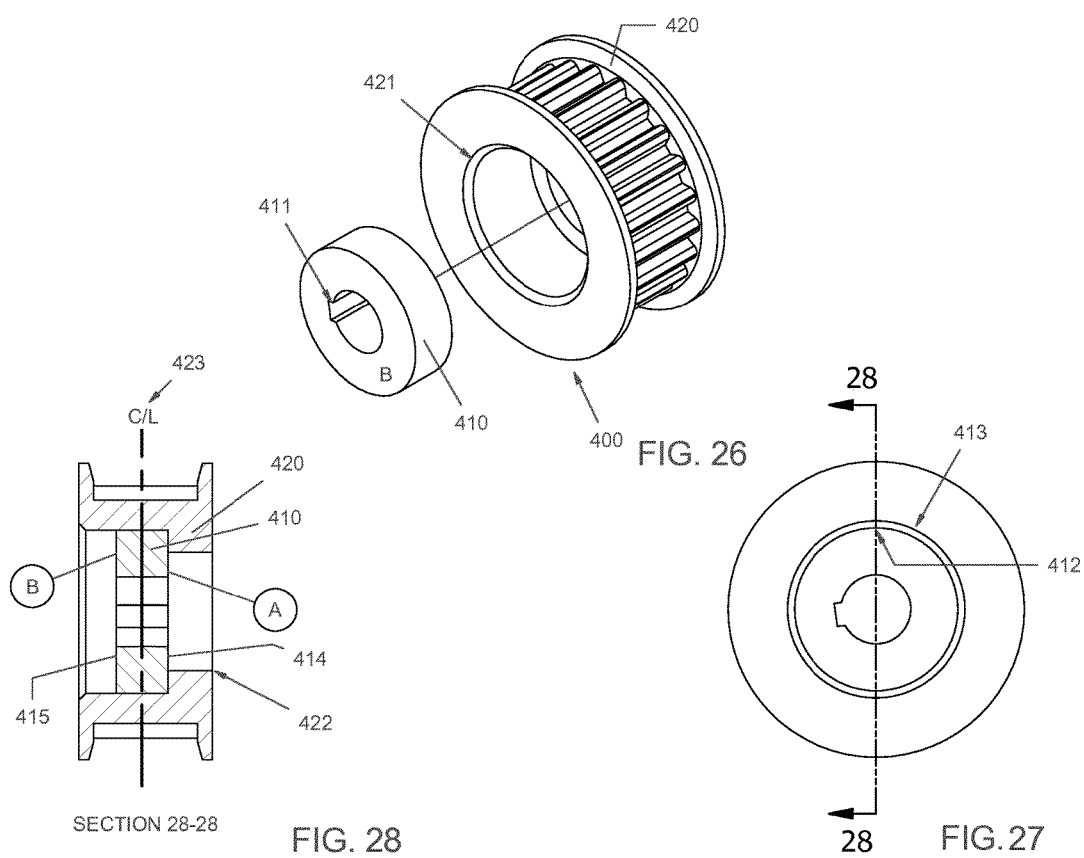

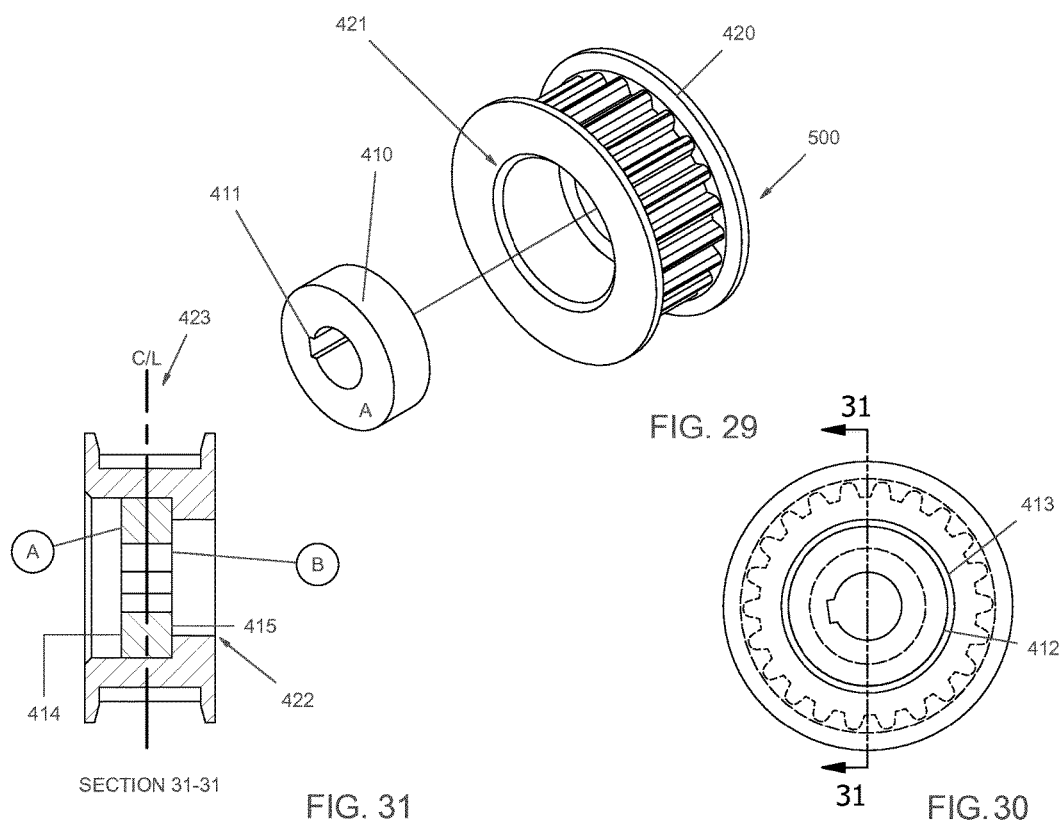

SECTION 34-34

SECTION 35-35

SECTION 38-38

SECTION 39-39

SECTION 57-57

SECTION 58-58

FIG. 59
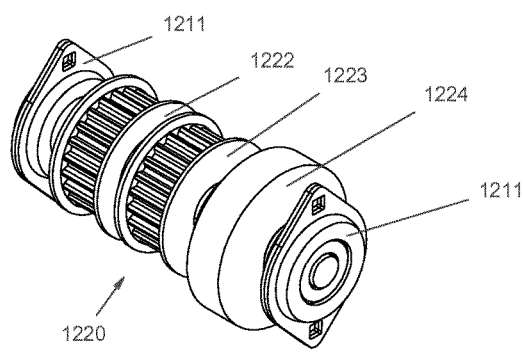
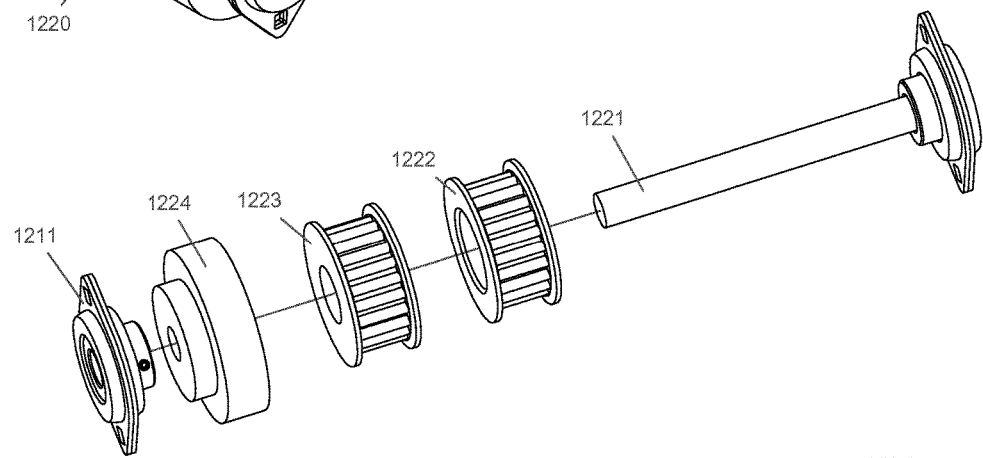
FIG. 60

US 10,478,660 B2

RECUMBENT THERAPEUTIC AND EXERCISE DEVICE

CROSS-REFERENCE TO RELATED APPLICATION

This application claims the benefit of U.S. Provisional Patent Application No. 62/167,108 entitled "RECUMBENT THERAPEUTIC AND EXERCISE DEVICE," filed May 27, 2015, which is incorporated herein by reference in its entirety.

TECHNICAL FIELD

The present disclosure relates to therapeutic and exercise devices. More particularly, the present disclosure relates to a recumbent style therapeutic and exercise device having a hand actuation or crank system and a foot actuation or crank system.

BACKGROUND

Therapeutic devices are used in a variety of manners: from assistive medical devices (e.g., hearing aids, etc.) to physical therapy equipment that is often used to rehabilitate injuries. Such physical therapy equipment often relates to equipment intended to work joints and muscles that may be plagued from injury and/or illness. Often, coordinated exercises and in some cases the physical therapy equipment is used to work, stretch, and strengthen the affected body areas. For example, a person with a rotator cuff injury may be instructed to do thirty arm circles twice a day to stretch and strength the affected rotator cuff. Over time, that person may be instructed to begin to do shoulder presses (i.e., holding a dumbbell and lifting the dumbbell from the person's shoulder to an overhead position) with a relatively low weight to strength the shoulder. The objects of the exercises are to reduce recovery time and to put the person back to a position that they would have been but for the injury. Physical therapy equipment can include walking aids (e.g., walkers and crutches, etc.), exercise devices intended to manipulate or work certain body areas (e.g., a stationary bicycle, etc.), resistance bands, treadmills, and the like.

While physical therapy equipment is primarily intended to rehabilitate injuries or counteract debilitating illnesses, exercise equipment is typically intended to promote the fitness and health of a person. Of course, like physical therapy equipment, exercise equipment is typically directed towards specific muscle groups, such as a bench press being directed to pectoral muscles of a user. Such exercise equipment may be similar to and even include various physical therapy equipment such as treadmills, resistance bands, elliptical machines, a bench press, a squat rack, etc. While some physical therapy equipment can serve as exercise equipment and vice versa, a need exists for an easy-to-use, multi-user accommodating device that can simultaneously serve a therapeutic and exercise purpose.

SUMMARY

One embodiment relates to a recumbent therapeutic and exercise device. The recumbent therapeutic and exercise device includes a frame; a hand crank system coupled to the frame, the hand crank system including a hand crank rotatable by a user, wherein the hand crank is adjustable in a substantially vertical plane closer to and further from a support surface for the frame; and a foot crank system coupled to the frame, the foot crank system including a foot crank rotatable by the user, wherein the foot crank is adjustable in a substantially horizontal plane relative to the support surface for the fame.

Another embodiment relates to a recumbent therapeutic and exercise device. The recumbent therapeutic and exercise device includes a frame; a hand crank system coupled to the frame, the hand crank system including a hand crank rotatable by a user, wherein the hand crank is adjustable in a substantially vertical plane closer to and further from a support surface for the frame; a foot crank system coupled to the frame, the foot crank system including a foot crank rotatable by the user, wherein the foot crank is adjustable in a substantially horizontal plane relative to the support surface for the frame; and, a generator configured to generate electrical energy from rotational energy caused from rotational movement of at least one of the hand crank and the foot crank.

Still another embodiment relates to a recumbent therapeutic and exercise device. The recumbent therapeutic and exercise device includes a frame; a foot crank system coupled to the frame, the foot crank system including a pair of foot cranks, wherein the pair of foot cranks are movable in a substantially horizontal plane relative to the frame; a hand crank system coupled to the frame, the hand crank system including a pair of hand cranks, wherein the pair of hand cranks are movable in a vertical plane closer to and further from the foot crank system; a generator coupled to the frame and configured to generate electrical energy from rotational movement from at least one of the pair of foot cranks and the pair of hand cranks; and a substantially upright chair configured to a receive a user of the recumbent therapeutic and exercise device, wherein the substantially upright chair is movable in a horizontal plane closer to and further from the foot crank system.

BRIEF DESCRIPTION OF THE DRAWINGS

FIG. 26 is an exploded assembly view of a one-way bearing and pulley assembly used in the combination hand crank and foot crank exercise and rehabilitation device of FIG. 1, according to an exemplary embodiment.

FIG. 27 is a front view of an assembled one-way bearing and pulley assembly of FIG. 26.

FIG. 28 is a cross-sectional view of the one-way bearing and pulley assembly of FIG. 27 taken along line 28-28.

FIG. 29 is an exploded assembly view of one-way bearing and pulley assembly used in the combination hand crank and foot crank exercise and rehabilitation device of FIG. 1, according to another exemplary embodiment.

FIG. 30 is a front view of an assembled one-way bearing and pulley assembly of FIG. 29.

FIG. 31 is a cross-sectional view of the one-way bearing and pulley assembly of FIG. 30 taken along line 31-31.

FIG. 59 is a perspective view of a drive shaft assembly for the combination hand crank and foot crank exercise and rehabilitation device of FIG. 47, according to an exemplary embodiment.

FIG. 60 is an exploded assembly view the drive shaft assembly of FIG. 59.

DETAILED DESCRIPTION

Figure 1:
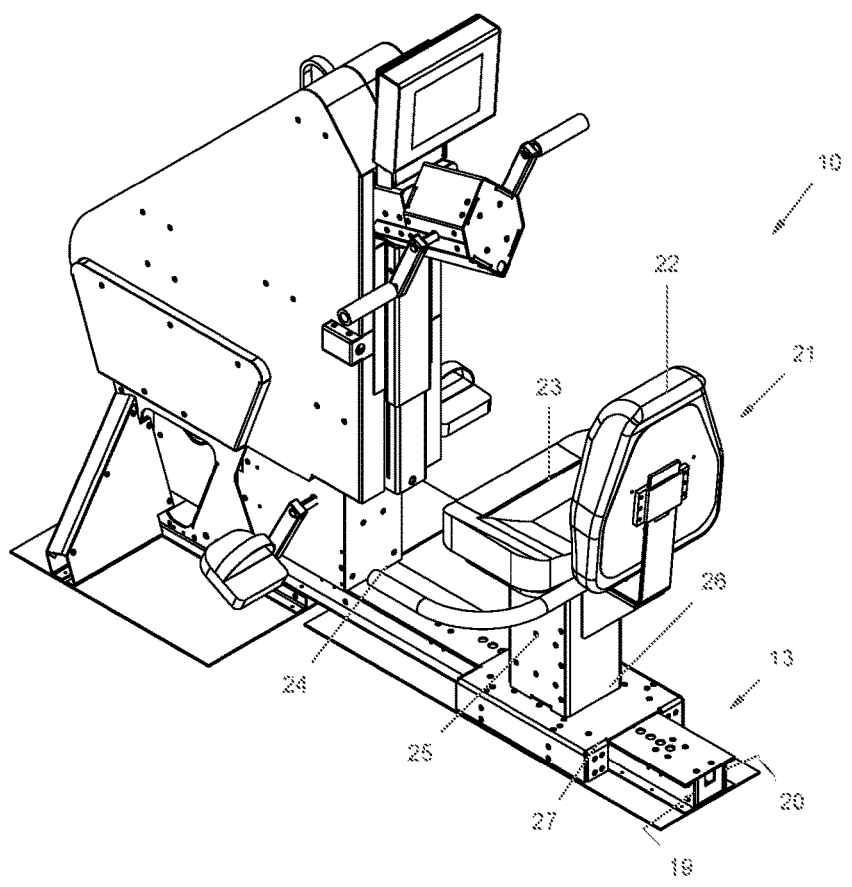
FIG. 1 is a perspective view of an exemplary embodiment of a combination hand crank and foot crank exercise and rehabilitation device.
Figure 2:
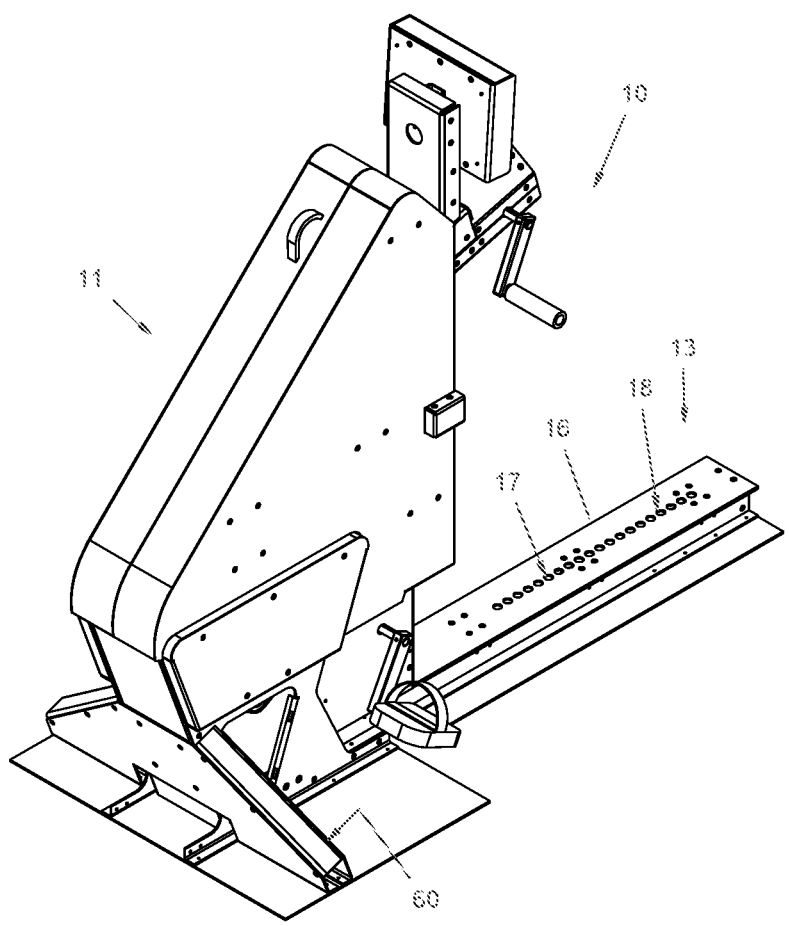
FIG. 2 is another perspective view of the combination hand crank and foot crank exercise and rehabilitation device of FIG. 1 with a chair for the device removed.

Referring to the Figures generally, an exercise and therapeutic device (the "device") having a hand actuation or crank system and a foot actuation or crank system is shown according to various embodiments herein. Generally speaking, the device includes a frame attached to a center body, the center body attached to each of a hand crank system and a foot crank system, a display (e.g., for a user to track their progress along a specific workout program, etc.), and a generally upright seat that is movable both fore and aft relative to the frame. While a position adjustment mechanism of the seat may tailor the device to a user, to provide enhanced relative positioning adjustments, the foot crank system is translatable in a horizontal or a lateral plane with respect to the seat while the hand crank system is translatable in a substantially vertical plane with respect to the seat frame. By providing two adjustment mechanisms in combination with the horizontal adjustment of the chair, the device of the present disclosure is operable with users of a variety of builds (e.g., leg length-to-torso length-to-arm length).

In use and still generally speaking, a user sits in the generally upright seat, extends their legs to engage their feet with opposing pedals of the foot crank system, and moves their legs in a bicycle-like motion to operate the foot crank system. In this regard, the foot crank system in combination with the seat act like a recumbent style bicycle. Simultaneously, or independent of operation of the foot crank system (or vice versa), the user extends their arms to engage their hands with opposing handles of the hand crank system. Analogous to the circular or bicycle motion utilized by their legs with the foot crank system, the user operates the hand crank system using a similar circular motion with their arms. Advantageously, the user may simultaneously rehabilitate or exercise their upper body (e.g., joints and muscles in their upper body including shoulders, rotator cuffs, arms in general, etc.) and their lower body (e.g., joints and muscles in their lower body including legs, feet, hip flexors, etc.) while also aerobically exercising while using the device. Further, the user's abdomen and back may also be engaged to hold themselves in the engaged position (e.g., able to operate at least one of the hand crank and foot crank systems), which provides additional exercise and therapeutic or rehabilitation benefit to the user.

According to one embodiment, the foot crank system and hand crank system are rotatably coupled to each other such that the foot cranks and hand cranks rotate in sync. However, in other embodiments, a clutch may be intermediately positioned between the hand crank system and the foot crank system to provide independent operation of each system. Thus, with a clutch, a user may rotate the hand cranks clockwise while the foot cranks are rotated counterclockwise, or simply rest their hands or feet on one of the systems, which remains stationary, while operating the other system. These and other features of the device of the present disclosure are described more fully herein.

Referring now collectively to FIGS. 1-5, a therapeutic and exercise device 10 (the "device") is shown according to an exemplary embodiment. The device 10 generally includes a housing 11, a seat frame 13 extending from the housing 11, a chair 21 moveably mounted to the seat frame 13, a display 30 supported in front of the chair 21, a frame 60 positioned adjacent the housing, a center body 200 positioned primarily inside the housing 11, a foot crank system 100 and a hand crank system 300 both of which are positioned in front of the chair 21.

The housing 11 forms an enclosure to at least partially house, shield, or cover the foot crank system 100, the center body 200, the hand crank system 300, and sub-components thereof. The housing 11, including the seat frame 13 and support member 25 and seat plate 26, may be constructed from any material. In one embodiment, the housing 11 is constructed from metal and metal alloys. In another embodiment, the housing 11 is constructed from plastic and rubber materials in order to decrease weight. In still another embodiment, the housing 11 is constructed from a combination of metal, plastic, rubber, and any other materials. Those of ordinary skill in the art will immediately recognize the wide range of the materials that may be used for construction of the housing 11, with all such materials intended to fall within the spirit and scope of the present disclosure.

The chair 21 is slidably coupled to the seat frame 13 and configured to receive a user of the device 10. The chair 21 includes a back rest 22, a seat 23 adjacent the back rest 22, handlebars 24 adjacent the seat 23, a support member 25 projecting down from the seat 23, a plate 26, and a pair of parallel slides 27 that are attached to parallel edges or sides of the plate 26. The support member 25 is shown as a generally rectangular column coupled to the seat 23 and back rest 22. The support member 25 is also coupled to the plate 26. The plate 26 is a generally planar rectangular or square structure that couples to both the support member 25 and the slides 27. Coupling may be via any type of fastener (e.g., bolts, etc.) or bonding technique. In certain embodiments, one or more of the components of the chair 21 may be of unitary construction. Further, the back rest 22 and seat 23 may include any type of cushioning to increase the comfort of the user. Similarly, while FIG. 1 depicts a front portion of the seat 23 (proximate the housing 11) to be substantially planar or flat across, in other embodiments, the seat 23 may define two frontward cutouts (e.g., w-shaped) to accommodate each of the user's legs. In still further embodiments, the handlebars 24 may be replaced with arm rests for the user (when the user desires to only use the foot crank system 100 of the device 10).

Figure 5:
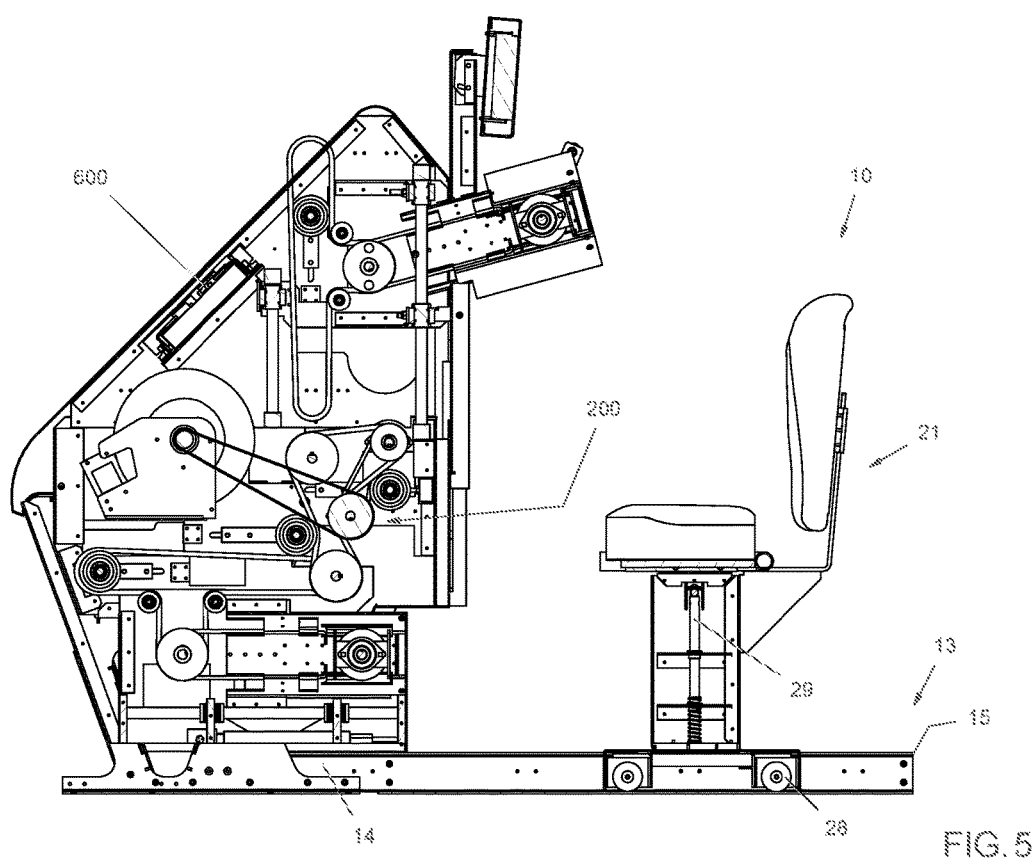
FIG. 5 is a left side wireframe view of the combination hand crank and foot crank exercise and rehabilitation device of FIG. 1.

In one embodiment, the support member 25 includes a vertical height 93 adjustment mechanism 29 (see FIG. 5). In this regard and as shown, the support member 25 may define a plurality of openings (e.g., holes, voids, etc.) spaced vertically apart on the support member 25. Coupled to a bottom part of the seat 23 is a projection or member that fits within the support member 25 and has openings that can align with the openings of the support member 25. Accordingly, a user may raise or lower the seat 23 relative to the support member 25. When a desired height of the seat 23 is obtained, a user may insert a pin into the aligned openings in the support member 25 and the seat member 29. The cooperation of the pin in the openings then holds the chair at a desired height for the user. In this example, a telescoping mechanism 29 is used to adjust the vertical height of the seat 23 (or, chair 21 more generally). Advantageously, this height adjustment mechanism of the chair 21 may increase the accommodation ability of the device 10 with users of a differing heights.

As shown, the seat frame 13 is configured as an elongated body with a first end 14 and a second end 15. The seat frame 13 includes a top plate 16 attached to a left side channel 19 and a right side channel 20. In other embodiments, the top plate 16 and left and right side channels 19, 20 may be of integral construction. The first end 14 is fixedly coupled to the frame 60 when the device 10 is assembled. This couples the seat frame 13 to the frame 60. The top plate 16 is a substantially planar and rectangular component that includes a plurality apertures 17 (e.g., holes, voids, etc.) and a plurality of holes 18. As shown, the plurality of holes 18 are positioned in various locations longitudinally across the top plate 16. The plurality of holes 18 are structured to receive fasteners (e.g., bolts, etc.) to couple the top plate 16 to the left and right side channels 19, 20. The plurality of apertures 17 are disposed longitudinally down a center (or substantially center) of the top plate 16. The plurality of apertures 17 function as half a chair retaining mechanism for the chair 21. The other half of the chair retaining mechanism is disposed on the chair 21 as a retainer (e.g., releasable bolt, pin, etc.). The retainer may be spring-loaded and be at least partially received in one of the plurality of apertures 17 after the chair 21 is positioned in its desired horizontal position relative to the housing 11. In operation, a user may remove the retainer from the aperture and slide the chair 21 closer to or further from the housing 11 along the top plate 16. This substantially horizontal movement is shown in regard to reference number 96 with a first direction 97 (closer to the housing 11) and a second direction 98 (further from the housing 11). When the desired relative position of the chair 21 is found, the user releases or engages the retainer with one of the apertures 17 to secure or lock the chair 21 in a desired horizontal position.

The pin-style retainer mechanism is only one type of horizontal position chair retaining mechanism. In other embodiments, a brake system may be used as the chair retaining mechanism. In this example, a user may actuate a lever to apply a compression force to the left and right slides 27 to move the slides into a high friction relationship with the channels 19, 20. In another example, actuation of the lever or switch may apply a compression force from the channels 19, 20 that are moved into the high friction relationship with the left and right slides 27. Actuation of the channels 19, 20 and/or slides 27 may be mechanical in nature, hydraulic, pneumatic, and the like.

In still further embodiments, the chair retaining mechanism may be configured as a brake system for wheels (e.g., wheels 28) included with the slides 27. Thus, because the horizontal chair movement mechanism may encompass a variety of mechanisms, the chair retaining mechanism may also include a wide range of mechanisms with all such possibilities intended to fall within the spirit and scope of the present disclosure.

As mentioned above, the chair 21 is substantially horizontally movable relative to the seat frame 13. While chair retaining mechanism is used to securably lock the chair 21 position relative to the frame 13, a movement mechanism or horizontal chair movement mechanism is used to provide movement of the chair 21 relative to the seat frame 13. In the example of FIGS. 1-5, the left side channel 19 and the right side channel 20 are shown as u-shaped channels that are complementary in shape to the slides 27. In this regard, the slides 27 are shown to be prism-shaped. In use, via the u-shape of the left channel 19 and right channel 20 are structured to receive the slides 27. When engaged or received, the channel structure of the slides 27 substantially prevents vertical direction 93 movement of the chair 21 relative to the seat frame 13. As shown in FIG. 5, the slides 27 include one or more wheels 28 (e.g., casters, rollers, etc.) that are received in the channels 19, 20 when the slides 27 are received in the channels. The wheels 28 roll on the channels 19, 20 to permit relatively easy movement of the chair 21 relative to the seat frame 13. However, in other embodiments, the wheels 28 may be excluded and the slides 27 simply slide or translate within the channels 19, 20.

Further, while the movement mechanism is shown as a u-shaped channel with a corresponding prism slide having wheels 28, many other movement mechanisms for the chair 21 relative to the seat frame 13 are contemplated. For example, in other embodiments, the movement mechanism may include wheels on the chair 21 but the chair 21 is tethered to the housing 11. In this regard, the seat frame 13 may be excluded from device 10. In operation of this example embodiment, a user can wheel the chair fore and aft relative to the housing 11 and engage a brake on the wheels to hold the chair in a desired position relative to the housing 11. Accordingly, while a wheeled mechanism for the chair 21 on the seat frame 13 is shown in the Figures, it should be understood that many other movement mechanisms (e.g., a slide mechanism, etc.) may be used with the device 10 with all such variations are intended to fall within the spirit and scope of the present disclosure.

Figure 3:
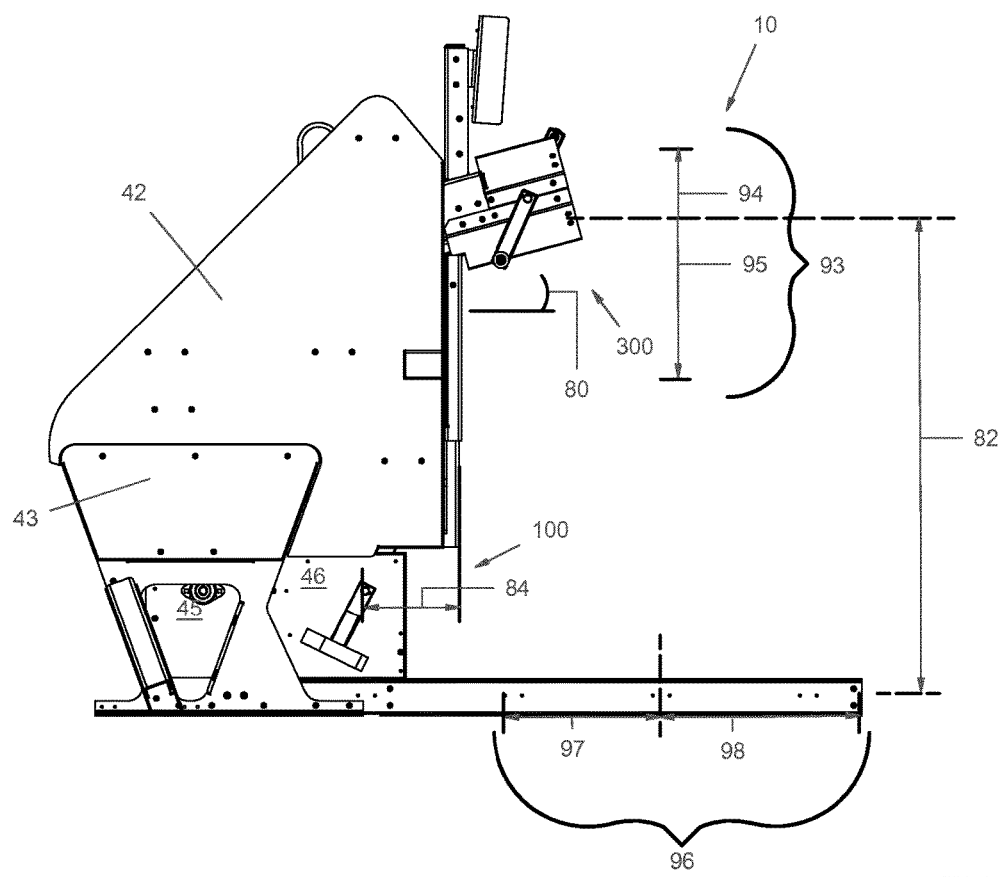
FIG. 3 is a left side view of the combination hand crank and foot crank exercise and rehabilitation device of FIG. 2.
Figure 4:
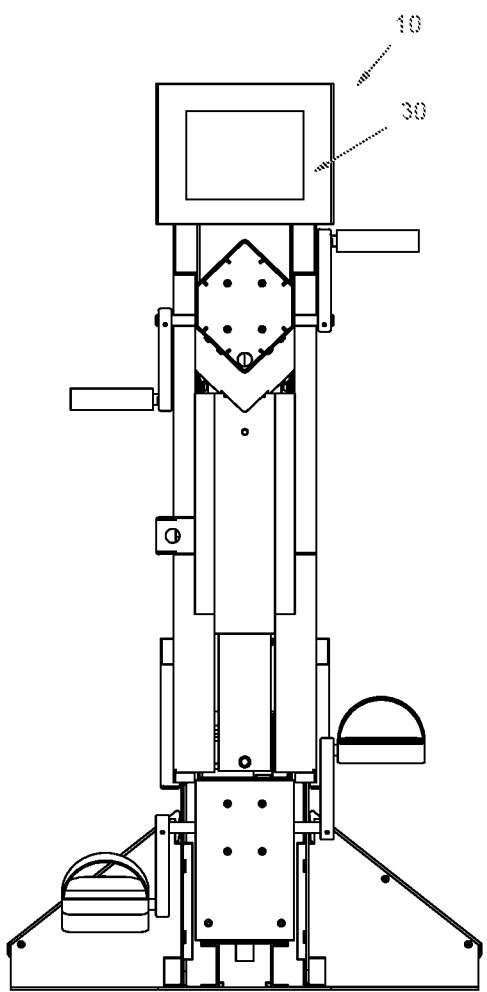
FIG. 4 is a front view of an exemplary embodiment of the combination hand crank and foot crank exercise and rehabilitation device of FIG. 2.
Figure 13:
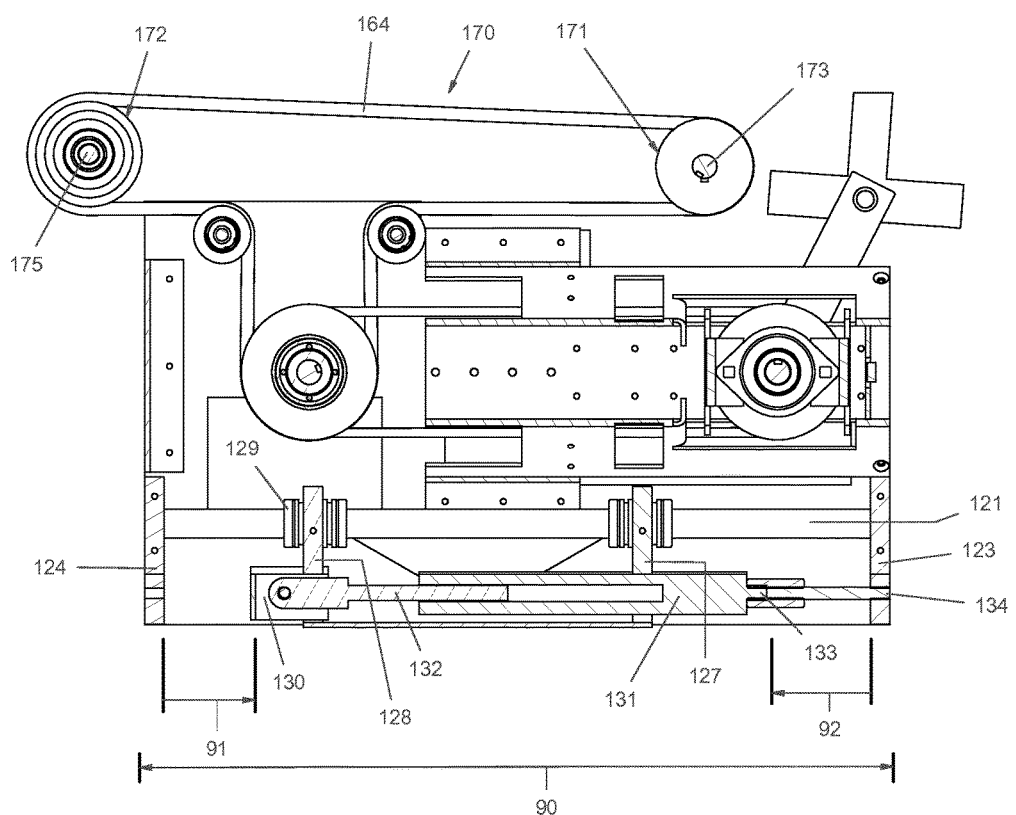
FIG. 13 is a left side section view of the portion of the foot crank system of FIG. 10.
Figure 14:
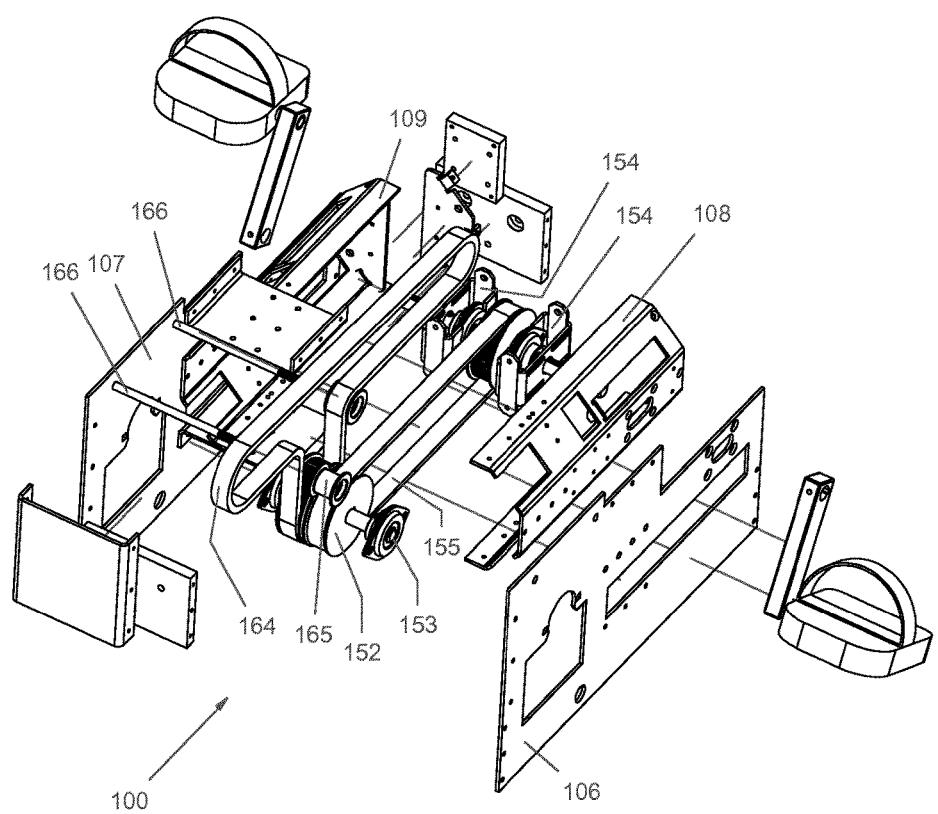
FIG. 14 is an exploded assembly view of the portion of the foot crank system FIG. 10 with the position adjustment mechanism removed.

As mentioned above, the device 10 also includes a foot actuation or crank system 100 and a hand actuation or crank system 300. While each of these systems are explained in greater detail below herein, FIGS. 1-5 and 13 depict some of the relative movement characteristics of each system 100, 300. For example, FIG. 13 shows that the foot crank system 100 is movable in a horizontal direction 90. In this regard, the foot crank system 100 can be moved to adjust the pedal position closer to the chair 21 in a first direction 92 or further from the chair 21 in a second direction 91. As shown and described herein, the movement of the foot crank system 100 is in a substantially straight horizontal plane. In this regard, the chair 21 and foot crank system 100 each move in a substantially horizontal plane. In comparison and in one embodiment, as also shown in FIG. 3, the hand crank system 300 is movable in a substantially vertical direction 93 both closer to the foot crank system 100 in a downward direction 95 and further from the foot crank system 100 in an upward direction 94. Thus, the vertical direction 93 movement of the hand crank system 300 is in a plane substantially perpendicular to the horizontal direction 90 movement of the foot crank system 100 (see FIGS. 3 and 13). According to one embodiment, as shown in FIG. 3, the user may adjust the hand crank system 300 from a height 82 of approximately thirty-two (32) inches to a height 82 of approximately thirty-nine (39) inches relative to a ground surface (approximately indicates plus-or-minus two (2) inches). As shown in FIG. 3, the height 82 is from a ground surface to the shaft 351 of the front shaft assembly 350 of the hand crank system 300. According to another embodiment, the user may adjust the foot crank system 100 from a minimum distance 84 relative to a front of the housing 11 of three (3) inches to a maximum distance 84 (furthest from the front of the housing 11) of approximately seven (7) inches (approximately indicates plus-or-minus two (2) inches). Of course, these ranges are for illustrative purposes only. It should be understood that in other embodiments, the ranges of movement for each of the hand and foot crank systems may differ from what the aforementioned ranges. Further, in some embodiments the hand and foot crank systems have the same amount of movement. In still other embodiments, one or both of the foot crank and hand crank systems 100, 300 may be fixedly positioned in the housing 11 (i.e., no horizontal movement for the foot crank system and no vertical movement for hand crank system). Accordingly, a wide range of movement configurations are contemplated by the present disclosure.

Furthermore, while translatable movement is shown for each of the hand crank system 300 and foot crank system 100, it should be understood that a pivot rotation may also be included in at least one of the hand crank 300 and foot crank systems 100. For example, in regard to the hand crank system, the arm assembly 390 of the hand crank system 300 is at an angle 80 relative to a horizontal plane in FIG. 3. In this regard, the arm assembly 390 may rotate about the rear shaft assembly 360. A user may adjust the tilt (e.g., adjust angle 80) of the arm assembly of the hand crank system 300 to further refine the relative positions of the chair 21, foot crank system 100, and hand crank system 300 in order to achieve a comfortable operating position.

According to an alternate embodiment, the hand crank system 300 may be translatable in a horizontal plane and the foot crank system 100 may be translatable in a vertical plane. In this configuration, each of the hand crank 300 and foot crank system 100 may include vertical, horizontal, and tilt adjustment mechanisms. As can be appreciated there, the device 10 may provide for a wide range of relative positions for each of the foot crank system 100, hand crank system 300, and chair 21. The multiple degrees of freedom of these components function to accommodate a relatively wide range of body types relative to conventional systems. Advantageously, this level of accommodation may be beneficial to many users who are using the device 10 for rehabilitation due to various injuries. For example, a user may have been in a car accident and suffered a broken femur along with a rotator cuff injury. The broken femur requires a cast where the user's leg is maintained substantially straight and each injury has healed at different rates. The user may sit on the chair 21, maintain the straightness of the injured leg (e.g., rest the leg on a nearby stool), and still adjust the relative positions of the hand crank system 300, foot crank system 100, and chair 21 to use the hand crank system 300 to rehabilitate the rotator cuff injury.

Still referring to FIGS. 1-5, the display 30 (e.g., screen, monitor, etc.) is powered by a generator 210 mounted in the center body 200 and the display 30 is structured to provide a visual or audio-visual display to the users of the device 10. The display 30 may include an input mechanism (e.g., touch screen, buttons, voice-command receiving means, a remote, etc.) for the user to interact with the control system 600 of the device 10. The device 10 may include one or more input jacks (e.g., a USB input, an HDMI input, etc.) that receive an electronic device of the user (e.g., mobile phone, etc.) such that the display 30 may broadcast media content from that electronic device. The one or more input jacks may also enable bi-directional communication, such that a user may download their workout or exercise summary to their electronic device for tracking purposes. In still further embodiments, power meters may be included with the hand cranks and foot cranks for a user to track the power, via the display 30, that they are outputting. Accordingly, the display 30 may facilitate a plurality of beneficial uses with the device 10.

Further, and as briefly described above, the control system 600 may be configured to control various components within the device 10 and include the functionality described above. The control system 600 may include one or more modules that include exercise and/or rehabilitation programs/workouts that are provided to the display 30 for a user or medical professional (e.g. physical therapist) to choose. The control system 600 may track and maintain workout and rehabilitation progress for a user via a memory device. The control system 600 may selectively control the generator 210 to increase or decrease the resistance (i.e., braking force) applied by the generator 210 to imitate or mimic uphill or downhill traversals for the device 10. The control system 600 may also include processing electronics (described below) that receive internal and/or externally-provided data and output the data or other determinations based on the data to at least one of the display 30 and a user's device (e.g., a mobile phone that is connected via a wireless or wired protocol to the device 10). For example, a pulse-tracking device may be included on the handlebars that acquires data indicative of a pulse of a user. The pulse rate data is received by the control system 600 and transmitted to the display 30 for observation by the user or a medical professional. In another example, a speed sensing device may acquire data indicative of a speed of at least one of the foot crank or hand crank. The control system 600 receives the speed data and determines a desired unit of speed (e.g., revolutions-per-minute, miles-per-hour, etc.) for at least one of the hand crank and foot cranks that may be provided to the display 30. In still another example, strain gauges or power sensing devices may be included with at least one of the foot cranks and hand cranks that are configured to acquire data regarding the force applied to the at least one foot cranks and hand cranks. Such force data may be provided to the control system 600 where the control system 600 provides the force data (or makes one or more determinations based on the force data that may also be provided) to the display 30. It should be understood that the above list is not meant to be exhaustive as the control system 600 may include many other or different functionality than that described above.

Accordingly, to accomplish or facilitate accomplishment of at least some of the above-stated functions, the control system 600 may include processing electronics that includes at least one processing device and at least one memory device. The at least one processing device may be implemented as a general-purpose processor, an application specific integrated circuit (ASIC), one or more field programmable gate arrays (FPGAs), a digital signal processor (DSP), a group of processing components, or other suitable electronic processing components. The one or more memory devices (e.g., RAM, ROM, Flash Memory, hard disk storage, etc.) may store data and/or computer code for facilitating various processes, such as those described above. Thus, the one or more memory devices may be communicably connected to the at least one processing device and provide computer code or instructions to the at least one processing device for executing the various processes. Moreover, the one or more memory devices may be or include tangible, non-transient volatile memory or non-volatile memory. Accordingly, the one or more memory devices may include database components, object code components, script components, or any other type of information structure for supporting the various activities and information structures described at least herein. In certain embodiments, the control system 600 may include one or more modules (e.g., within the one or more memory devices) that are structured to facilitate execution of at least the aforementioned processes. A module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of computer readable program code may be a single instruction, or many instructions, and may even be distributed over several different code segments, among different programs, and across several memory devices. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

As mentioned above, the control system 600 may also receive data from one or more sensors or other data-acquiring devices. Accordingly, example and non-limiting elements include sensors, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements. Furthermore, communication between and among the components of the device 10 may be via any type of wired protocol (e.g., a serial cable, a fiber optic cable, a CAT5 cable, etc.) or wireless protocol (e.g., Internet, Wi-Fi, cellular, radio, etc.). Thus, the control system 600 of the present disclosure may be broadly structured in order to provide robust functionality to the device 10 of the present disclosure.

Figure 6:
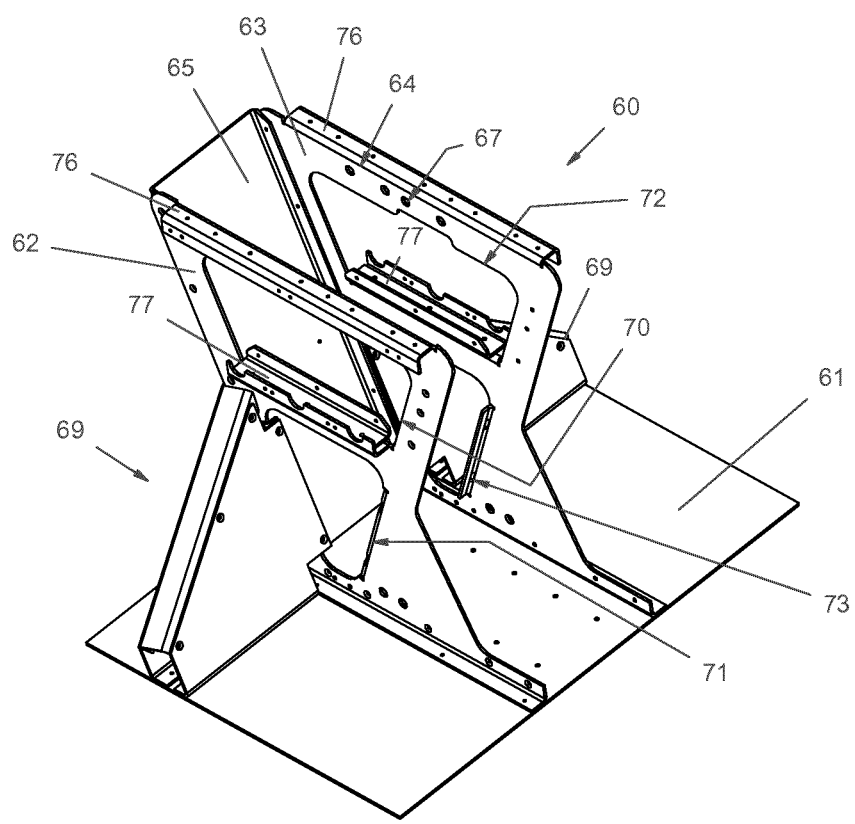
FIG. 6 is a top perspective view of a frame for the combination hand crank and foot crank exercise and rehabilitation device of FIG. 1, according to an exemplary embodiment.
Figure 7:
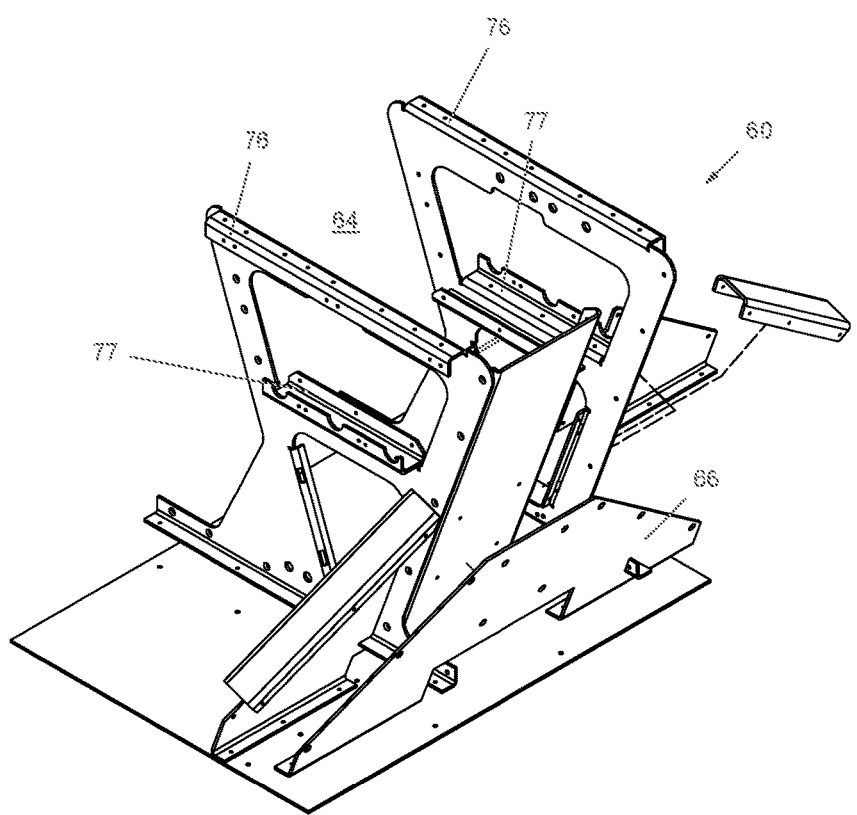
FIG. 7 is another perspective, partially exploded view of the frame of FIG. 6.
Figure 8:
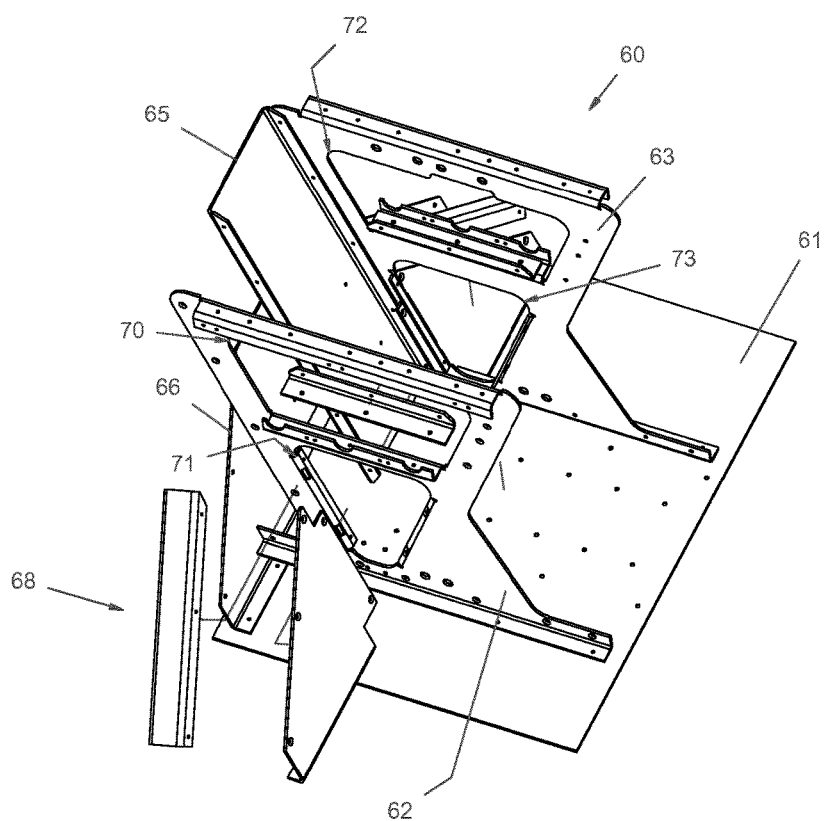
FIG. 8 is still another perspective, partially exploded view of the frame of FIG. 6.

Referring now to FIGS. 6-8, a frame 60 (e.g., base, base member, etc.) for the device 10 is shown according to an exemplary embodiment. The frame 60 is structured to couple to one or more pieces of the housing 11, to couple to the seat frame 13, and to generally provide additional stability to the device 10 (e.g., to resist tipping of the device 10). The frame 60 generally includes parallel and opposing left and right side brackets 62, 63 coupled to and extending vertically above a plate 61. Each of the brackets 62, 63 include a plurality of holes 67, where the holes 67 are configured to receive fasteners (e.g., bolts, screws, etc.) to fasten or couple the brackets 62, 63 to the housing 11. Advantageously, the frame 60 increases the width of a rear portion of the device 10 (distal from the chair 21) to promote stability of the device 10 when in use and when not in-use. For example, due to the size of the plate 61 and the structure of the brackets 62, 63, if a person were to lean up against the housing 11, one of the brackets and the plate 61 would provide a counter force to the force provided by the user to prevent the housing from substantially leaning and, thereby, reducing the likelihood of a tipping event.

As shown, the left side bracket 62 is oriented parallel and spaced apart from the right side bracket 63 to define a space 64 (e.g., opening, void, volume, etc.) there between. In use, at least part of the foot crank system 100 (e.g., housing 101 of the foot crank system 100) is sized and shaped to at least partly fit within the space 64 defined by the brackets 62, 63. The frame 60 also provides a support structure for the foot crank system 100 and center body 200. In this regard, the center body 200 is supported by upper and lower brackets 76, 77, while the foot crank system 100 is coupled to the seat frame 13 that is in turn coupled to the plate 61.

The frame 60 also includes a rear cover 65, a bottom plate 66, a left bracket assembly 68, and a right bracket assembly 69. The rear cover 65 is coupled to each of the left and right brackets 62, 63. Positioned below the rear cover 65 (e.g., proximate the plate 61) is the bottom plate 66, which is coupled to the left and right brackets 62, 63 as well as the plate 61. The bottom plate 66 and rear cover 65 substantially cover one end of the space 64 (i.e., a rear end furthest from the chair 21 when the device 10 is assembled). In this regard and advantageously, a rear portion of the housing 11 is substantially covered for protection.

The left bracket assembly 68 is coupled to a lower portion of the left bracket 62. The left bracket assembly 68 is also coupled to the plate 61 and includes a left side portion of the bottom plate 66 (see FIG. 8). A triangular or trapezoidal support structure is created on the left side of the left bracket 62 via the left side assembly 68. In a similar fashion, the right bracket assembly 69 is coupled to the a lower portion of the right bracket 63. The right bracket assembly 69 is also coupled to the plate 61 and includes a right side portion of the bottom plate 66. As shown, a triangular or trapezoidal support structure is created on the right side of the right bracket 63 via the right side assembly 69. Accordingly, the brace-providing bottom plate 66 extends across the space 64 to form a part of each of the left and right side assemblies 68, 69 and functions to provide a stabilizing brace to each of the brackets 62, 63 to increase the structural integrity of the frame 60.

As shown, each of the left and right brackets 62, 63 define at least one cutout (e.g., space, opening, etc.). In the example embodiment depicted, the left bracket 62 defines an upper cutout 70 and a lower cutout 71, wherein the lower cutout 71 is positioned proximate the plate 61. Similarly, the right bracket 63 defines an upper cutout 72 positioned above a lower cutout 73, where the lower cutout 73 is proximate the plate 61. The cutouts 70-73 function to reduce the weight of the frame 60 and also provide access to components located within the space 64 of the device 10. In this regard, technicians or other users may relatively easily access the components of the device 10 that are proximate the frame 60. While only two cutouts are depicted per bracket 62, 63, it is contemplated that the exact number, size, and position of the cutouts is highly variable. Accordingly, many other configurations are possible. Similarly, in an alternate embodiments, the cutout(s) may be excluded from the frame 60. All such variations are intended to fall within the spirit and scope of the present disclosure.

As shown, the bottom plate 66 has a substantially trapezoidal shape while the rear cover 65 is rectangular in shape. Further, each of the left and right brackets 62, 63 have an hour-glass shape. The shapes and relative sizes of the frame 60 and components thereof is intended for exemplary purposes only. As a wide range shapes, sizes, and analogous structures for the frame 60 may be used to provide additional support to the housing 11, the frame 60 as shown in FIGS. 6-8 is meant to be broadly interpreted to cover other structures used to couple to a lower portion of the housing 11 to function as a brace.

In certain embodiments, wheels (e.g., casters, etc.) or other motion-facilitating devices may be included with the device 10 to facilitate easy movement. For example, in one embodiment, wheels are attached to the frame 60 (e.g., extending rearward from the rear cover 65). In this configuration, a user may lift up on the seat frame 13 to lift up the frame 60 at angle to engage the wheels with a ground surface and roll the device 10 around by holding the seat frame 13. In other embodiments, wheels may be included in any other place desired that facilitates movement of the device 10.

Figure 9:
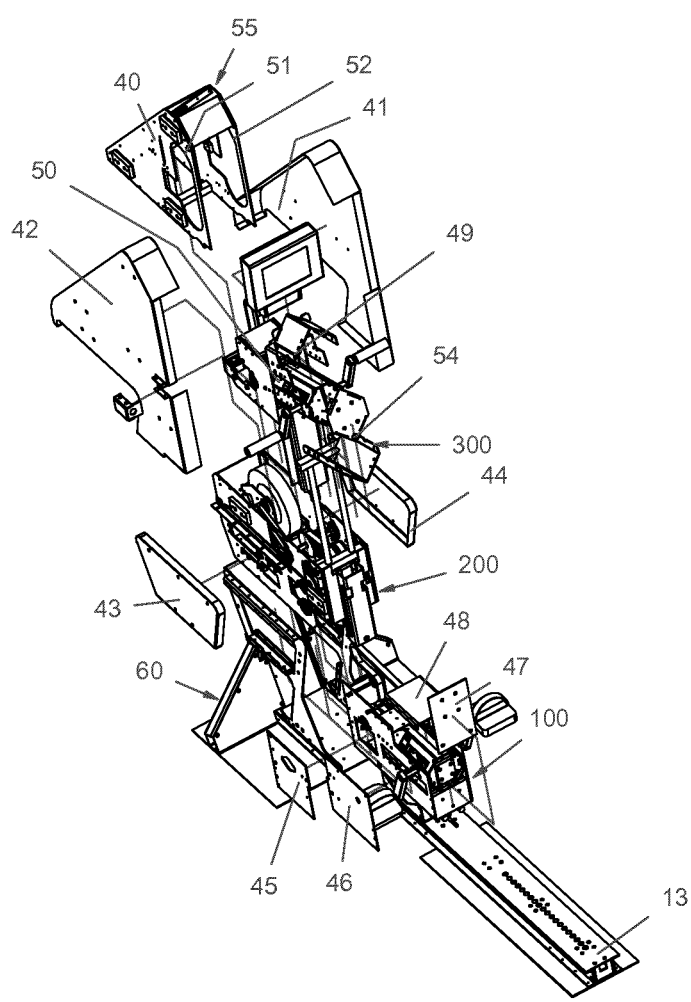
FIG. 9 is an exploded assembly view of the combination hand crank and foot crank exercise and rehabilitation device of FIG. 2, according to an exemplary embodiment.
Figure 10:
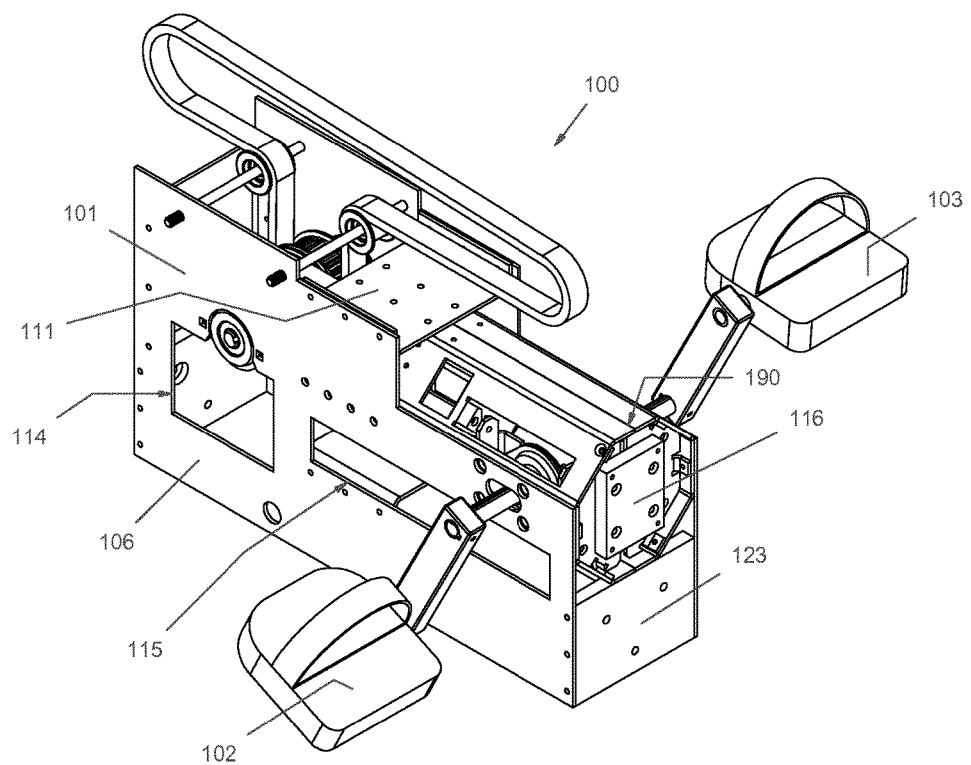
FIG. 10 is a top perspective view of a portion of a foot crank system for the combination hand crank and foot crank exercise and rehabilitation device of FIG. 1, according to an exemplary embodiment.

Referring now to FIG. 9, an exploded assembly view of the device 10 is shown according to an exemplary embodiment. As shown and briefly described above, the device 10 includes the foot crank system 100 proximate the seat frame 13, the center body 200 positioned vertically above the foot crank system 100, and the hand crank system 300 positioned vertically above the center body 200. As shown, the housing 11 includes a several covers (e.g., shrouds, panels, etc.) that are configured to shield a user from the components of the device 10. Starting at the top, the housing 11 includes an upper housing 40 defining a left a cutout 51 and a right cutout 52, an upper left panel 42, an upper right panel 41, a mid-body left panel 43, a mid-body right panel 44, a left rear lower panel 45, a left front lower panel 46, analogous right front lower and right back lower panels (not shown), lower upper panels 47 and 48, upper brackets 49 and 50, and a front cover 54. In one embodiment, the panels, covers, and brackets are constructed from a metal alloy to provide strength to the device 10. In another embodiment, the panels, covers, and brackets are constructed from one or more types of plastic or other materials. In still further embodiments, the panels, covers, and brackets are constructed from a combination of materials (e.g., plastic, metal, rubber, etc.). As shown and described herein, coupling or attachment of various components to the housing 11 may be via any number of fasteners (e.g., screws, nails, bolts, etc.) or other bonding techniques (e.g., bonding pastes, welding, brazes, etc.). In certain embodiments, while at least some of the components are shown removably attachable to the housing 11, certain components (e.g., panels) may be integral with the housing. For example, while the housing 11 is shown to include several covers, shrouds, or panels, one or more of the covers, shrouds, and panels may be of integral or unitary construction. Advantageously, as separate components, technicians or assembly personnel may find convenience in the ability to relatively quickly assemble and disassemble the housing for servicing and/or distribution. Further, a reduced number of components may facilitate easier inventory management.

With reference to FIG. 3, each of the panels 45, 46, 47 and 48 are sized and structured to cover at least a portion of the foot crank system 100. At least part of at least one of panels 45 and 46 are accessible via the lower cutout 71 (see FIG. 8). The panels 45 and 46 (and analogous panels on the right side of the device 10) may be coupled to at least one of the frame 60 (e.g., left and right brackets 62, 63, and plate 61) and the seat frame 13. As mentioned above, the cutout 71 provides access to the panels 45 and 46 to facilitate their removal and to permit maintenance work on, repair, adjustment, and the like on the foot crank system 100. The upper panels 47 and 48 are structured to protect or cover an upper portion of the foot crank system 100.

The mid-body left and right panels 43, 44 are structured to partially cover left and right sides of the center body 200. As shown in FIG. 3, the mid-body left panel 43 is disposed over the upper cutout 70 of the left bracket 62 of the frame 60 (see FIG. 6). The mid-body right panel 44 has a similar position on the right side of the device 10. The mid-body left and right panels 43, 44 may be coupled to the frame 60 (e.g., the left bracket 62 and right bracket 63 respectively).

Moving to the upper portion of the housing 11, the upper right and left panels 41, 42 are sized to substantially cover the center body 200 and the hand crank system 300. As shown in FIG. 3, the upper left panel 42 surrounds (on two sides) the left mid-body panel 43. The upper right and left panels 41, 42 are coupled to at least one of the center body 200 and the frame 60. As shown, one or more fasteners may be used to attach the housing 40 to the panels 41 and 42. According to one embodiment, the housing 40 is coupled to the center body 200. In other embodiments, the housing 40 may be coupled to the frame 60 or any other component that supports the housing 40 in a generally upright position. Furthermore and as shown in FIG. 5, the housing 40 provides a support structure for the control system 600. The upper brackets 49 and 50 and front cover 54 are structured to at least partially cover various portions of the hand crank system 300. The cutouts 51 and 52 provide openings that the rear shaft assembly 360 (see, e.g., FIG. 44) may be disposed through, in, and/or near such that due to the cutouts, the housing 40 does not interfere with the upward and downward translation (or tilting) of the hand crank system 300.

With the above description of the device 10 in general, a more specific description of the foot crank system 100, center body 200, hand crank system 300, and operation of each is now presented.

Referring now to FIGS. 10-15, a foot crank system 100 (also referred to herein as a "foot crank assembly") for the device 10 is shown according to an exemplary embodiment. As shown, the foot crank system 100 generally includes a housing 101, a left pedal 102, a right pedal 103, a left arm 104, a right arm 105, an arm assembly 190, a slide system 120 for translational or sliding movement of the arm assembly 190, and a rotational system for receiving the rotational force from a user operating the pedals 102, 103. Collectively, the left pedal 102 and left arm 104 are referred to as the "left foot crank" and the right pedal 103 and right arm 105 are referred to as the "right foot crank" herein.

The housing 101 is structured to support (e.g., attach or couple to, etc.) and at least partially support the arm assembly 190. The housing 101 may include one or more panels (e.g., covers, shrouds, shielding, etc.) or be of integral construction. As shown, the housing 101 is constructed from several pieces or components and includes a left panel 106, a right panel 107, a front mounting bracket 123, a rear mounting bracket 124, a bottom cross member 110, and a top cross member 111. In one embodiment, the left and right panels 106, 107 are mirror-images of each other. Accordingly, each of the panels may define one or more cutouts, such as cutouts 114 and 115, that reduce the weight of the housing 101 and permit relatively easy access to the components located within the housing 101 (e.g., the arm assembly 190). As shown, each of the bottom and top cross-members 110, 111 are fastened or coupled to each of the left and right panels 106, 107. Assembly of the cross-members to the panels provides structure to the housing 101 (i.e., to form an enclosure) and permit attachment of other components to and within the housing 101, such as the arm assembly 190. In one embodiment, the bottom cross-member 110 is positioned above the slide assembly 120 and may, advantageously, function to shield the assembly or part thereof. Furthermore and as shown, each of the bottom and top cross-members 110, 111 are also coupled to the left and right brackets 108 and 109 of the arm assembly 190.

The arm assembly 190 (also referred to herein as the "lower arm assembly") is coupled to the housing 101 and is horizontally translatable via the slide assembly 120. The arm assembly 190 is coupled to the housing 101 (e.g., via panels 106, 107), such that movement of the housing 101 and arm assembly 190 is contemporaneous. The arm assembly 190 includes the left and right foot cranks, a front shaft assembly 150, a rear shaft assembly 160 rotatably coupled to the front shaft assembly 150, and a casing for the arm assembly 190. The casing includes a left bracket 108, a right bracket 109, a left cover 112, and a right cover 113. The left and right brackets 108, 109 are shown to be substantially octagonal in shape and are sized to substantially surround the front shaft assembly 150. Positioned near a front part of the foot crank system 100 (e.g., proximate the chair 21), a left cover 112 that is half-octagonal shaped is configured to be received in an end of the left bracket 108. In comparison, the right cover 113 that is half-octagonal shaped is configured to be received in an end of the right bracket 109. A cover 116 is fastened or coupled to each of the left and right covers 112, 113 to join the left and right brackets 108, 109.

Position adjustment of the foot crank system 100 (more particularly, the arm assembly 190) to accommodate a user (e.g., leg length, relative position with respect to hand crank system 300, etc.) may be accomplished via a variety of different methods or movement mechanisms. Such mechanisms may be referred to herein as a position adjustment mechanism, a position adjustment device, a movement mechanism, and a movement device. In the example shown in FIGS. 10-13 and 15 and as mentioned above, the position adjustment mechanism is configured as slide assembly 120. The slide assembly 120 permits sliding or movement of the arm assembly 190 (and the components attached thereto) along the rails 121, 122 both towards and away from the user along the substantially horizontal direction 90. The slide assembly 120 includes parallel rails 121, 122 (e.g., guide rails, guide poles, rods, etc.) supported by mounting brackets 123, 124 on opposite ends of the rails 121, 122, an assistive device 125 with a bracket 130, a bottom bracket 126, a front block 127, a back block 128, and four bearings 129.

The twin parallel rails 121, 122 extend the length of the housing 101 (i.e., panel 106 or panel 107). As shown, the rails 121, 122 are positioned in the same horizontal plane and are structured as substantially cylindrical rods. However, in other embodiments, more or less than two rails may be used; if multiple rails are used, one or more of the rails may be disposed in a different plane from the others; the rail(s) may have a shape different from cylindrical; etc. The front and back blocks 127, 128 are shown to define two openings (one for each rail 121, 122). The front and back blocks 127, 128 are structured to receive a bearing 129 in each of the four openings. The bearings 129 may be coupled to the blocks 127, 128 via a flange relationship, an interference fit, one or more fasteners, etc. The bearings 129 define an opening that is sized to surround each of the rails 121, 122. In use, the bearings 129 in connection with the blocks 127, 128 support the rails 121, 122 to prevent or substantially prevent flexion. Accordingly, the bearings 129 may be structured as any type of shaft or rail supporting bearing including, but not limited to, a plain bearing, a self-aligning bearing, a bushing, and/or two-piece bearings (e.g., bearings including roller elements, such as ball bearings, roller bearings, etc.). In one embodiment, the bearings 129 are configured as self-aligning bearings for a ⅝" diameter rod (e.g., rail 121 and rail 122). In other embodiments, the size and structure of the bearings 129 may differ framed upon size and shape of the rails 121, 122.

As shown in FIG. 13, the blocks 127, 128 are attached to opposing ends of the bottom bracket 126 (e.g., via one or more fasteners such as a bolt, via welds, etc.). In this regard, the bottom bracket 126 supports the blocks 127, 128. In comparison, the front bracket 123 is coupled to each of the left and right panels 106, 107 near a front portion of the housing 101 while the back bracket 124 is coupled to each of the left and right panels 106, 107 near a back portion of the housing 11. According to one embodiment, the bottom bracket 126 is also fixedly attached to the frame 60 (i.e., plate 61) (see FIG. 9). Thus, the bottom bracket 126 remains fixed during position adjustment of the arm assembly 190.

As also shown, each of the brackets 123, 124 define upper apertures 135. The apertures 135 are sized to receive each of the rails 121, 122, or a projection thereof. Via the reception, the rails 121, 122 couple to the brackets 123, 124. In turn, the rails 121, 122 also couple to the panels 106, 107 and the components attached thereto, such as the arm assembly 190. It should be understood that the coupling between the rails 121, 122 and the brackets 123, 124 may be via any type of coupling mechanism (e.g., an interference fit relationship between the apertures 135 and the rails 121, 122, one or more fasteners, a bonding agent, etc.), such that the depicted embodiment is not meant to be limiting. Because the brackets 123, 124 are also coupled to the left and right panels 106, 107, which are coupled to the other components located within the housing 101, movement of the rails 121, 122 causes linear or horizontal movement of the housing 101 and arm assembly 190 (e.g., in a horizontal direction 90). Therefore and advantageously, a substantially horizontal direction 90 force applied to the housing 101 and/or arm assembly 190 causes the arm assembly 190 to move via a sliding movement of the rails 121, 122 within the bearings 129 relative to a stationary or fixed bottom bracket 126.

The bracket 130 is structured to interface or engage with the bracket 124 when the arm assembly 190 is at a maximum allowed forward direction 91 movement. In comparison, the bracket 123 is structured to interface or engage with the cylinder 131 upon a maximum allowed backward direction 92 movement. As shown, a lower aperture 134 of the bracket 123 receives an axial projection from the cylinder 131. As described below, this interaction may restrict movement in the backward direction 92 but also cause movement in the forward direction 91, when desired. In one embodiment, the maximum allowed forward direction 91 movement is equal or substantially equal to the maximum allowed backward direction 92 movement. In other embodiments, the permissible movement amounts differ.

While the slide assembly 120 is shown as the movement mechanism for the lower arm assembly 190 in FIGS. 10-13 and 15, certain embodiments may exclude a movement mechanism while other embodiments may include a movement mechanism structured differently than the slide assembly 120. For example, the movement mechanism may be structured as wheels, an axially-extending screw mechanism, a pin-catch mechanism (analogous to movement of the chair 21 with respect to the seat frame 13), etc.

Moreover, in some embodiments and according to the device 10 depicted, an assistive device is provided for aiding users who desire to move the position of the arm assembly 190. In the example depicted, the assistive device 125 only functions to provide an assistive force in moving the arm assembly 190 in a forward direction 91. In certain other embodiment, the assistive device 125 only functions to provide an assistive force in the backward direction 92. In still other embodiments, the assistive device 125 may provide an assistive force in each direction 91, 92.

In the example shown, the assistive device 125 is structured as a gas-spring assist device. The gas-spring includes a cylinder 131 with a concentric rod 132. The gas-spring assist device utilizes a fluid (e.g., gas, hydraulic fluid, etc.) to cause relative movement between the cylinder 131 and rod 132. In operation, a user presses a button to force fluid (e.g., gas) into the cylinder 131, which causes the rod 132 and cylinder 131 to axially move away from each other. However, due to the bracket 130 coupled to the bottom bracket 126, the rod 132 has limited or no axial movement. In comparison, the cylinder 131 does not engage with a movement constraining device. Rather, the cylinder 131 engages with the bracket 123, particularly the lower aperture 134 via a projection of the cylinder 131, to "push" the bracket 123 and, consequently, the housing 101 in a forward direction 91 towards the user. When the button (or other triggering device) is released, the fluid pressure transmitted to the gas-spring assist device is released. In this regard, a person may simply push the housing 101 or arm assembly 190 in a backward direction 92 without having to counter the force provided by the gas-spring assist device. Additionally, the assistive device 125 provides a holding force once the arm assembly 190 has been put into a desired position.

While a gas-spring assist device is shown in FIGS. 10-13 and 15, it should be understood that other embodiments may utilize different assistive devices. For example, certain embodiments may utilize a screw coupled to a crank where rotation of the crank in a first rotational direction causes the screw to rotate and push the housing out in a forward direction 91 and rotation of the crank in an opposite direction causes the screw to pull the housing in a backward direction 92. In another example, the assistive device may be structured as spring-loaded wheels with a locking mechanism. In this case, rotation of the wheels in one direction causes tension in the spring to effectively limit translation to a certain point. Rotation of the wheels in the other direction then "unwinds" the tension to permit movement in the other direction. Thus, as can be appreciated, many different assistive devices or mechanism may be used with all such variations intended to fall within the spirit and scope of the present disclosure.

Still referring to FIGS. 10-15, with some of the components of the foot crank system 100 and movement thereof explained, the components of the force translation aspect may now be explained. As mentioned above, the arm assembly 190 includes a front shaft assembly 150 and a rear shaft assembly 160. The front shaft assembly 150 is rotatably coupled to the arm assembly 190 near a front end (e.g., proximate the chair 21) of the arm assembly 190. The rear shaft assembly 160 is also rotatably coupled to the arm assembly 190 but near a back end (e.g., furthest from the chair 21). The front shaft assembly 150 includes a left pedal 102 attached to a left arm 104, where the left arm 104 is attached on one end of a shaft 151. The front shaft assembly 150 also includes a right pedal 103 attached to a right arm 105, where the right arm 105 is attached to an opposite end of the shaft 151. The shaft 151 extends outside of the housing 101 (e.g., left and ride panels 106, 107) to permit the feet of a user to engage with the pedals 102, 103. In use, a user may engage their feet with each of the pedals 102, 103 and provide a cyclical or bicycle-like motion that applies a torque to the shaft 151, via the arms 104 and 105, to rotate the shaft 151.

Disposed within the housing 101 and casing of the arm assembly 190 is a pulley 152 disposed on the shaft 151, a pair of bearings 153, and a pair of brackets 154. One of the brackets 154 is fixedly coupled to an interior portion of the left bracket 108 while another of the brackets 154 is fixedly coupled to an interior portion of the right bracket 108 of the arm assembly 190. The brackets 154 are used to support and couple to each of the bearings 153. In this regard and as shown, the bearings 153 are structured as flange bearings to permit coupling. However, the bearings 153 may be structured as any bearing type that permits rotation of the shaft 151 while also supporting the shaft 151 to reduce flexion that may be caused from an uneven application of force to the left and right foot cranks. Accordingly, the bearing 153 may include a ball bearing, a self-aligning bearing, a bushing, a plain bearing, etc.

The pulley 152 is interconnected with the shaft 151 (e.g., directly mounted to shaft 151). A drive belt 155 is at least partially disposed over the pulley 152 and a pulley 162 of the rear shaft assembly 160. Accordingly, the drive belt 155 rotatably couples the front shaft assembly 150 to the rear shaft assembly 160. Turning now to the rear shaft assembly 160, the rear shaft assembly 160 is shown to include a rear shaft 161, the pulley 162, another or second pulley 163, a bearing 153 mounted to the left panel 106, another bearing 153 mounted to the right panel 107, a timing belt 164, and a pair of tensioner assemblies having rollers 165 interconnected to studs 166. Similar reference numerals are used to indicate similar components as that of the front shaft assembly 150 with the exception of the pulleys 152, 162, and 163 which use different reference numerals for clarity in explaining the components.

Figure 11:
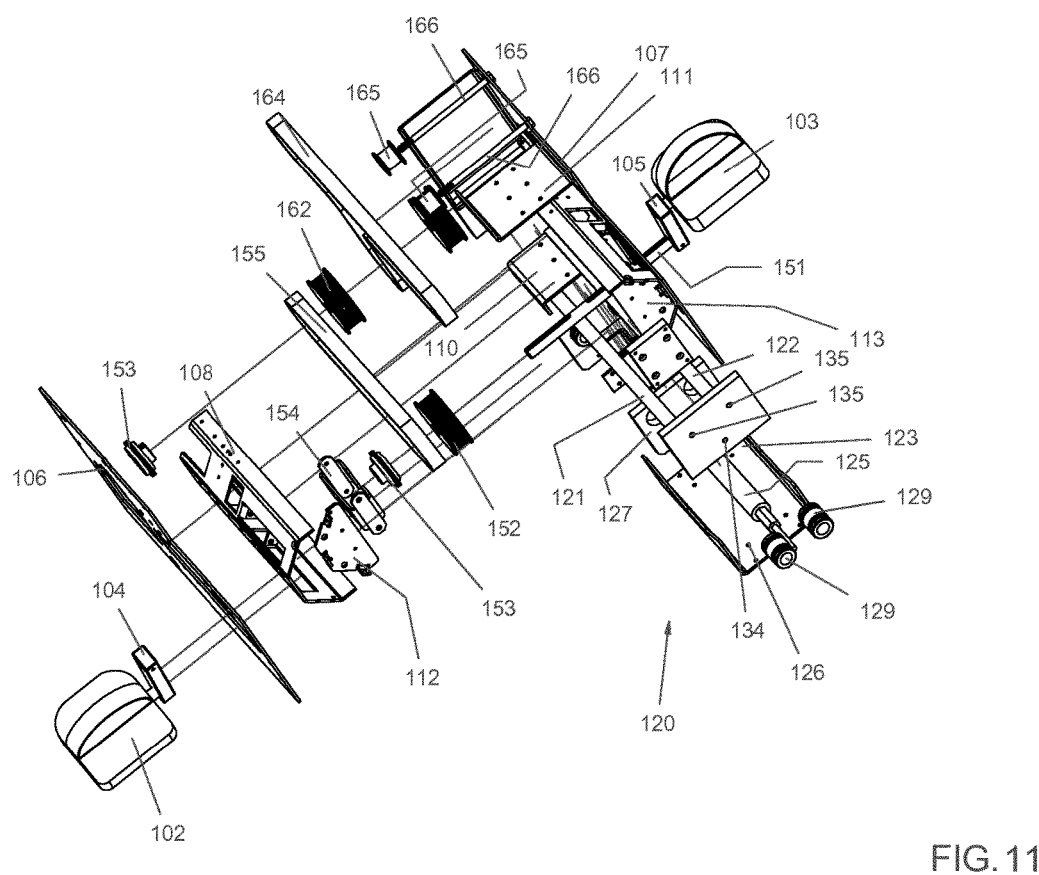
FIG. 11 is an exploded assembly view of the portion of the foot crank system FIG. 10.
Figure 12:
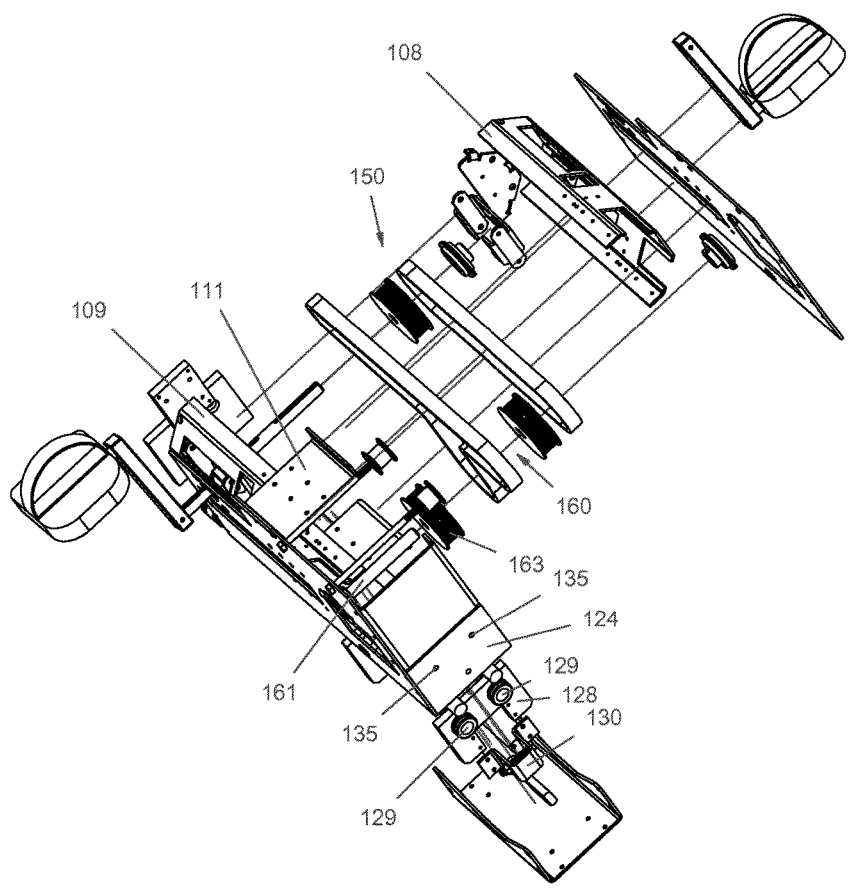
FIG. 12 is another exploded assembly view of the portion of the foot crank system of FIG. 10.

The drive belt 155 transfers rotational energy to the pulley 162 of the rear shaft assembly 160. The pulley 162 is interconnected with the rear shaft 161 (e.g., directly mounted on), such that rotation of the pulley 162 causes rotation of the rear shaft 161. As shown in FIG. 11, a pair of bearings 153 are mounted to each of the left panel 106 and right panel 107. The bearings 153 support the rear shaft 161 and permit free rotation of the rear shaft 161. Proximate the right panel 107, the second pulley 163 is disposed on (e.g., interconnected with, directly mounted on) the rear shaft 161. Thus, rotation of the pulley 162 on the rear shaft 161 causes rotation of the second pulley 163. A timing belt 164 is at least partially disposed over the pulley 163, such that rotation of the pulley 163 drives the timing belt 164.

Figure 15:
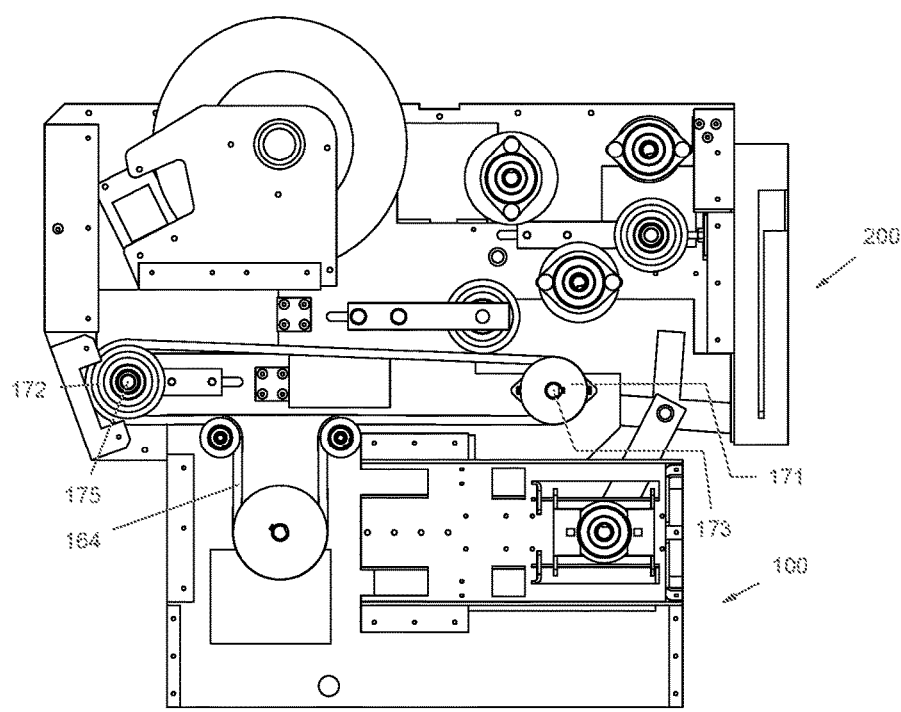
FIG. 15 is a left side view of a portion of the foot crank system and the center body of the combination hand crank and foot crank exercise and rehabilitation device of FIG. 1 with the paneling removed, according to an exemplary embodiment.

A coupling system 170 rotatably couples the foot crank system 100 to the hand crank system 300 via the center body 200. The coupling system 170 transfers mechanical rotational energy from the foot crank system 100 to the center body 200 and, eventually to the hand crank system 300. A lower part of the coupling system 170 is depicted in FIGS. 10-13. The lower part of the coupling system 170 in relation to center body 200 is shown in FIG. 15, according to an exemplary embodiment. The lower part of the coupling system 170 includes a front shaft assembly having a front shaft 173, a front pulley 171 disposed on the front shaft 173 (e.g., directly mounted to), and a coupling pulley 174 also disposed on the front shaft 173 (e.g., directly mounted to). The lower part of the coupling system 170 also includes a rear shaft assembly having a rear shaft 175 with a rear pulley 172 disposed on the rear shaft 175 (e.g., directly mounted to). Each of the shafts 173, 175 are fixedly attached to the housing 201 of the center body 200 (see, e.g., FIG. 15). As shown, the timing belt 164 is disposed on and rotatably couples the pulley 163 to the rear pulley 172 and front pulley 171. The timing belt 164 is disposed vertically above the housing 101 and rearward of the arm assembly 190. The timing belt 164 extends towards a bottom portion of the housing 101 to wrap partially around a lower part of the pulley 163. In operation, rotation of the timing belt 164 drives the pulleys 171, 172 to transfer the rotational energy from the foot crank system 100 (e.g., operation of the pedals 102, 103) to, e.g., the center body 200 as well as interconnecting operation of the foot crank system 100 with the hand crank system 300.

Due to the coupling system 170, the foot crank operates at the same or substantially the same rotational velocity as the hand crank. However, as described further herein, other mechanisms may be used to provide functionality where the hand crank and foot crank may or may not operate at the same rotational velocity (e.g., different sized pulleys in the coupling system 170, a clutch mechanism, etc.) or in the same rotational direction. The upper part of the coupling system 170 and operation thereof is explained more fully in regard to FIGS. 40-44.

As shown, tensioner assemblies are included with the foot crank system 100 and are structured to provide tension to the timing belt 164 (e.g., prevent droop, etc.) during fore and aft movement of the arm assembly 190 (e.g., via the slide assembly 120) and during use of the foot crank system 100 in general. The tensioner assemblies include a rear tension assembly and a front tension assembly. The front tension assembly is positioned proximate the chair 21 while the rear tension assembly is positioned distal the chair 21. Each tension assembly includes a roller 165 interconnected or directly mounted on a stud 166. The timing belt 164 is at least partially disposed over each of the rollers 165. The stud 166 is coupled to each of the left and right panels 106, 107, with the rollers 165 disposed between the panels 106, 107 (e.g., at least partially within the housing 101) (see FIG. 10). In one embodiment, the studs 166 are structured as hexagonal bolts that are fixedly coupled to each of the panels 106, 107 (e.g., no rotation capability). In this configuration, the rollers 165 may include a bearing to permit relative rotation of the rollers 165 with respect to the studs 166; or, in another instance, the rollers 165 may also be fixedly coupled to the studs 166, such that the timing belt 164 simply wraps partially over the roller. In the latter configuration, the rollers 165 may have a surface of relatively low friction that the timing belt 164 is disposed over to reduce wear of the timing belt 164. In another embodiment, the studs 166 may be configured as a shaft or rod with the rollers 165 directly mounted or interconnected to the studs 166. In this configuration, four bearings (e.g., bearing 153) may be used to mount the shafts to the panels 106, 107 to permit rotation of the shaft. In each of these embodiments, the timing belt 164 is at least partially disposed over the rollers 165, where the rollers 165 may be stationary or have free rotation, and wherein the rollers 165 provide tension to the timing belt 164.

With the aforementioned description in mind, operation of the foot crank system 100 may be described as follows. First, the user may adjust the position of the arm assembly 190. The user may use the assistive device 125 to pull the arm assembly 190 closer to them. With reference to FIG. 13, the bottom bracket 126 (and components attached thereto) and the pulleys 171, 172 of the coupling system 170 remain stationary during the movement (the bottom bracket 126 is fixedly coupled to the seat frame 13 while the pulleys 171, 172 are fixedly coupled to the center body 200). While the arm assembly 190 slidably moves via the slide assembly 120, the tensioner assemblies also move their relative positions with regard to each of the pulleys 171, 172 to maintain an adequate or sufficient amount of tension in the belt 164. Second, the desired position is then achieved and the user may the begin operation of the left and right foot cranks. Rotation of the left and right foot cranks transfers rotational energy via the front shaft 151 to the pulley 152 to drive the drive belt 155. The drive belt 155 transfers the rotational energy to the rear shaft 161 and to the pulley 163. The pulley 163 then provides the rotational energy via the timing belt 164 to each of the pulleys 171, 172 and the shafts or rods coupled thereto.

In the example depicted, each of the pulleys 152 and 162 on the front and rear shaft assemblies 150, 160 are of the same diameter. In this regard, each pulley 152, 162 has the same rotational velocity. The same is true for the pulley 163. However, in other embodiments, different sized pulleys may be used with the front and rear shaft assemblies 150, 160. In a similar manner, while each of the pulleys 171, 172 (and 174) are shown to be of the same diameter, other embodiments may utilize different sized pulleys 171, 172. In those embodiments, different sized pulleys may be used to either increase or decrease the relative rotational velocity generated from the foot crank system 100 to that of hand crank system 300. In still another embodiment, the pulley systems shown in regard to the front and rear shaft assemblies 150 may be replaced with a gear and sprocket systems. In this situation, analogous to a multi-gear bicycle, a user may adjust or shift gears to increase or decrease resistance in pedaling.

According to one embodiment, the belts 155 and 164 are structured as toothed or ribbed belts. However, in other embodiments, any type of belt structure may be used. For example, the belt may include, but is not limited to, a v-belt, a wedge-shaped belt, a cogged v-belt, a v-ribbed belt, etc. Further, the belts may be constructed from any type of material. In the toothed belt configuration, the pulleys 152, 162, 163, 171, 172, and 174 are structured as matching or complementary toothed or ribbed pulleys.

In some embodiments, a speed sensing device may be included with the foot crank system 100. For example, a magnet speed sensor may be mounted proximate the pulley 152 to record the rotational speed of the pulley 152 on the front shaft assembly 150. The data acquired via the speed sensor may be provided to the control system 600, where the control system translates this rotational speed into a desired speed unit (e.g., miles-per-hour, etc.). This information may then be displayed via the display 30 and tracked via the control system 600 for a user to keep track of their progress. In other embodiments, any type of speed sensing device may be used to acquire data indicative of a rotational speed of the front shaft 151 (more generally, the rotation speed that the user is operating the left and right foot cranks).

Referring now to FIGS. 16-25, a center body 200 (also referred to herein as a "generator assembly 200", "generator system 200", or "mid-body 200") for the device 10 is shown according to an exemplary embodiment. As shown, the center body 200 generally includes a housing 201, a generator 210, and a rotational system for transferring the kinetic mechanical energy (e.g., rotational force) from at least one of the foot crank system 100 and hand crank system 300 to the generator 210 to transform the kinetic energy input into an electrical energy output. The features and operation of the center body 200 are described herein below.

Figure 16:
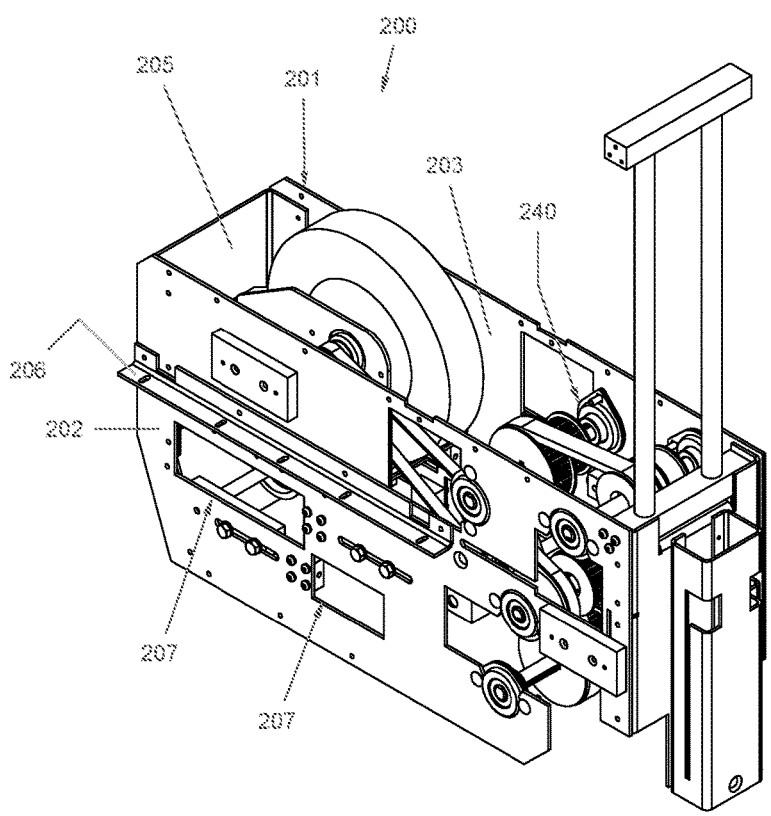
FIG. 16 is a top perspective view of a center body for the combination hand crank and foot crank exercise and rehabilitation device of FIG. 1, according to an exemplary embodiment.

The housing 201 is structured to form an enclosure to at least partially support and shield or cover the components located therein. The housing 201 is also structured to couple to the frame 60 (on left and right brackets 62, 63, see FIGS. 6 and 9) and to the housing 40 (see FIGS. 5 and 9). As shown, the housing 201 generally includes left and right panels 202, 203, front and back panels 204 and 205, and lower back panel 212. The panels 201-205 and 212 (e.g., shrouds, covers, etc.) are assembled as shown in FIG. 16 to define an interior volume. Each of the panels 202, 203 include longitudinally extending brackets 206. The brackets 206 provide a support structure for coupling the housing 201 to the frame 60 via engagement of the brackets 206 and brackets 77 of the frame 60. Further, a bottom edge of the panels 202, 203 (e.g., proximate the foot crank system 100 when the device 10 is assembled) is received and coupled to the lower brackets 77 of the frame 60. These two engagements function to securely fasten and hold the center body 200 to the frame 60. It should be understood that engagement may be via a type of coupling mechanism including, but not limited to, fasteners (e.g., bolts, screws, etc.), welds, brazes, snap engagements, pin and hole engagements, etc. As shown, the panels 202, 203 also define at least one cutout, such as cutouts 207, which function to provide access to the interior volume of the housing 201 and to reduce the overall weight of the housing 201. As also shown (see, e.g., FIG. 18), the back bottom bracket 212 is positioned vertically below the back panel 205 and attached to each of the left and right panels 206, 207. The back bottom panel 212 shields a back portion of the pulley 172 and shaft 175 assembly. In one embodiment, the housing 201 is constructed from metal and metal alloys. In another embodiment, the housing 201 is constructed from any type of material (e.g., plastic, rubber, etc.).

As shown and disposed within the housing 201 is a generator mounting bracket 208. The generator mounting bracket 208 is a predominately flat member and located in a horizontal plane. A bracket 209 is coupled to the generator mounting bracket 208. The bracket 209 is oriented in a substantially vertical plane (e.g., perpendicular relative to the bracket 208). The bracket 209 defines a hole (e.g., aperture, opening, space, void, etc.) for receiving and supporting a shaft of the generator 210 to hold and support the generator 210.

The generator 210 is driven via rotation of the shaft of the generator 210. In one embodiment, rotation of the generator 210 induces an electrical charge that is used to power the control system 600 and the display 30. The generator 210 may be structured as any type of power generator used in fitness and therapeutic devices. For example, the generator 210 may be structured as a resistance generator, an eddy current braking generator, etc. Further and advantageously, in one embodiment, the presence of the generator 210 eliminates the need for a battery to power the control system and display electronics (and any other electrically powered component on the device 10). However, in other embodiments, a battery or other energy storage device (e.g., capacitor, etc.) may be electrically coupled to the generator 210 and used to power the electronics in the device 10 when the device 10 is operated below a power threshold (e.g., rotation of the hand or foot cranks at a sufficient speed to power a component such as the display 30). Further, the energy storage device and/or generator 210 may be electrically coupled to a power output of the device 10, wherein the power output (e.g., an output port such as USB port, etc.) is configured to provide electrical power to a user device (e.g., mobile phone, portable music device, computing device, etc.). In some embodiments, the generator 210 may also receive power from a wall outlet to reduce the force needed to initiate the generator 210.

The generator 210 may also selectively function as a brake for the device 10. In this configuration, the induced generator charge is used to apply resistance to rotation of the shaft of the generator 210, which applies rotational resistance to the generator belt 265, which in turn applies rotational resistance to each of the hand crank system 300 and foot crank system 100. As an example, a user may choose a hilly workout program intended to imitate biking through rolling hills. The control system 600 then selectively adjusts the resistance applied by the generator 210 to make it more difficult on the user to travel uphill portions while reducing the resistance when a downhill portion is experienced. In this regard, the control system 600 via the generator 210 can provide varying resistance workout or rehabilitation programs to a user of the device 10.

In the embodiment depicted, the generator 210 only functions (i.e., generates electrical energy) during one rotational direction (i.e., the power rotational direction) of the shaft of the generator 210. Therefore, the rotational system shown and described herein below is structured to constantly rotate the generator 210 in the power rotational direction despite a user operating the hand or foot cranks in a rotational direction opposite to the power rotational direction. In other embodiments, the generator 210 may be bi-directionally rotationally driven such that the systems and apparatuses described herein may be excluded from the device 10.

The center body 200 is shown to include a variety of pulleys and shaft assemblies for translating rotational force to the generator 210 and between the foot crank system 100 and hand crank system 300. As shown, the general force translation system of the center body 200 includes two bi-directional shaft assemblies, shown as drive shaft assembly 220 and upper shaft assembly 230, the front and rear shaft assemblies for the lower part of coupling system 170, the middle or central part of the coupling system 170 shown as the coupling shaft assembly 240, and a pair of tension assemblies 250 and 255. The bi-directional shaft assemblies, drive shaft assembly 220 and upper shaft assembly 230, are structured to always facilitate power directional rotation for the generator 210 regardless of whether the hand crank or foot crank are operated in the non-power direction rotation. As such, the generator 210 is always powered while the foot crank and/or hand crank is being operated and regardless of operation of the hand crank or foot crank. Before turning to the intricacies of each assembly 220, 230, the coupling shaft assembly 240 and tension assemblies 250, 255 are first explained.

Figure 22:
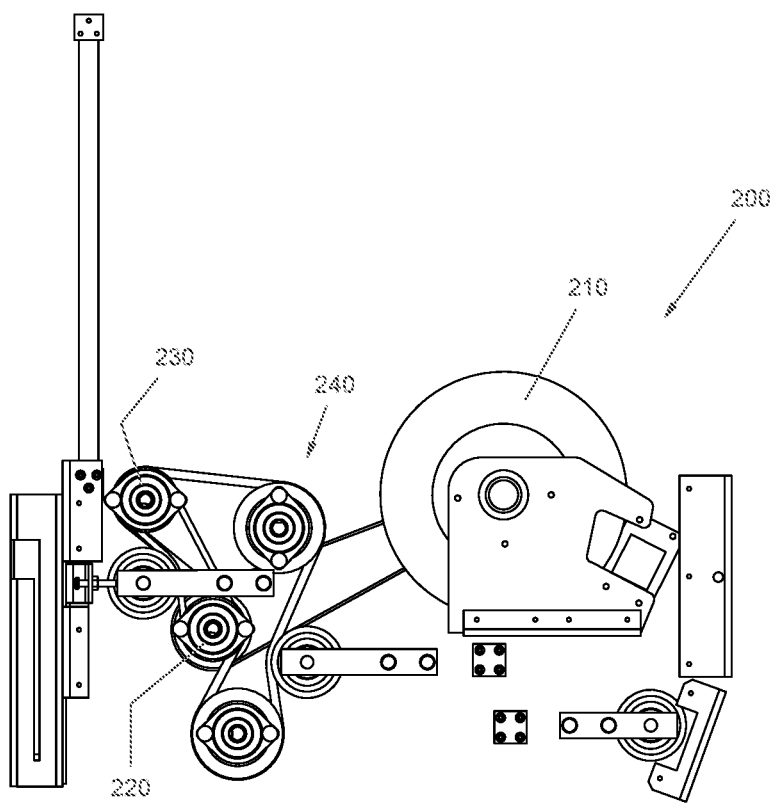
FIG. 22 is a right side view of the center body of FIG. 16 with the housing of the center body removed.
Figure 23:
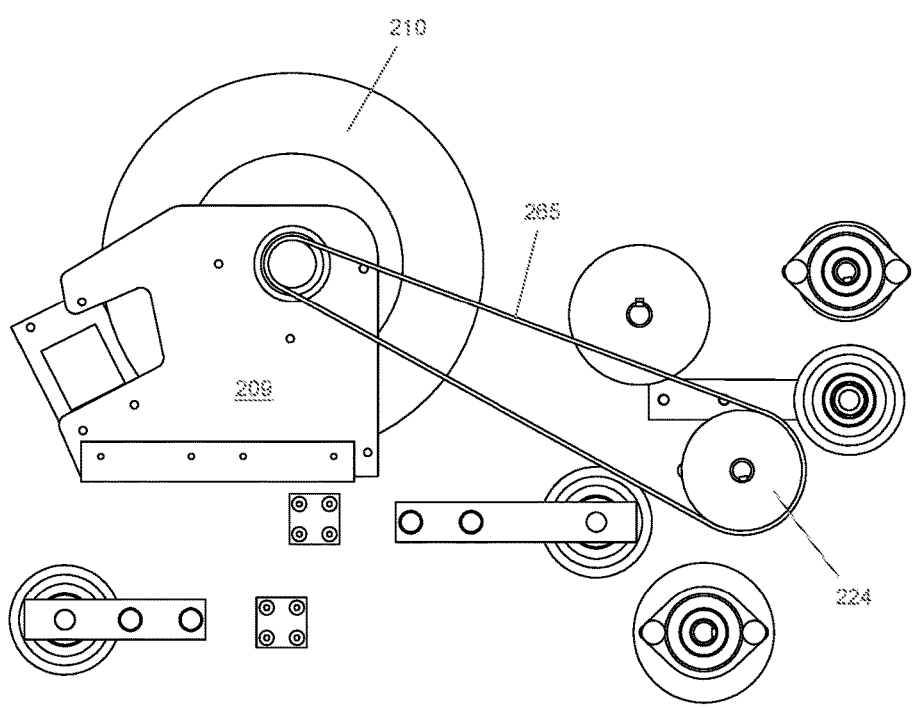
FIG. 23 is a left side view of the arrangement of the generator belt in the center body of FIG. 16, according to an exemplary embodiment.
Figure 24:
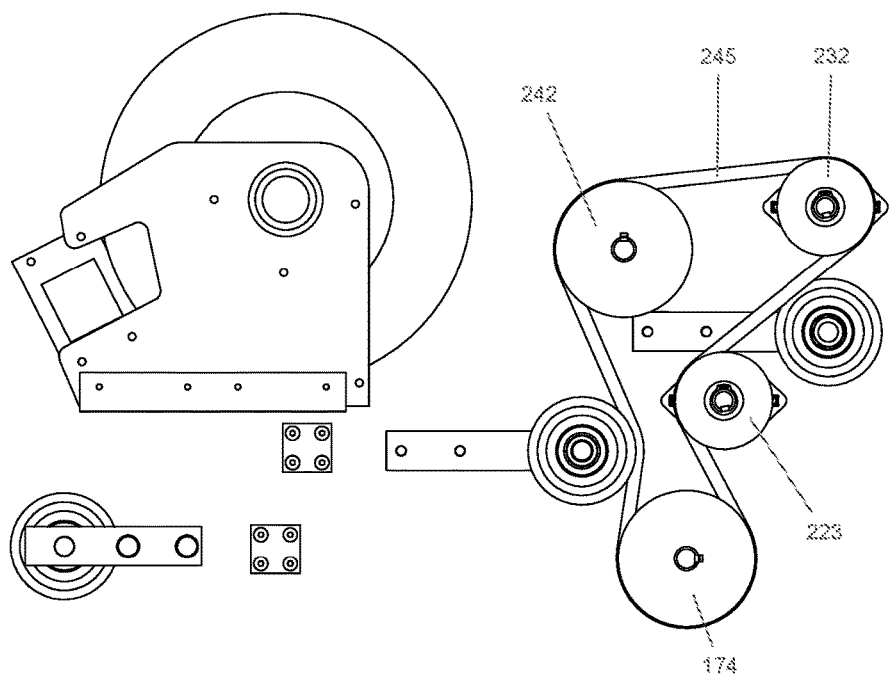
FIG. 24 is a left side view of the arrangement of the main drive belt in the center body of FIG. 16, according to an exemplary embodiment.
Figure 25:
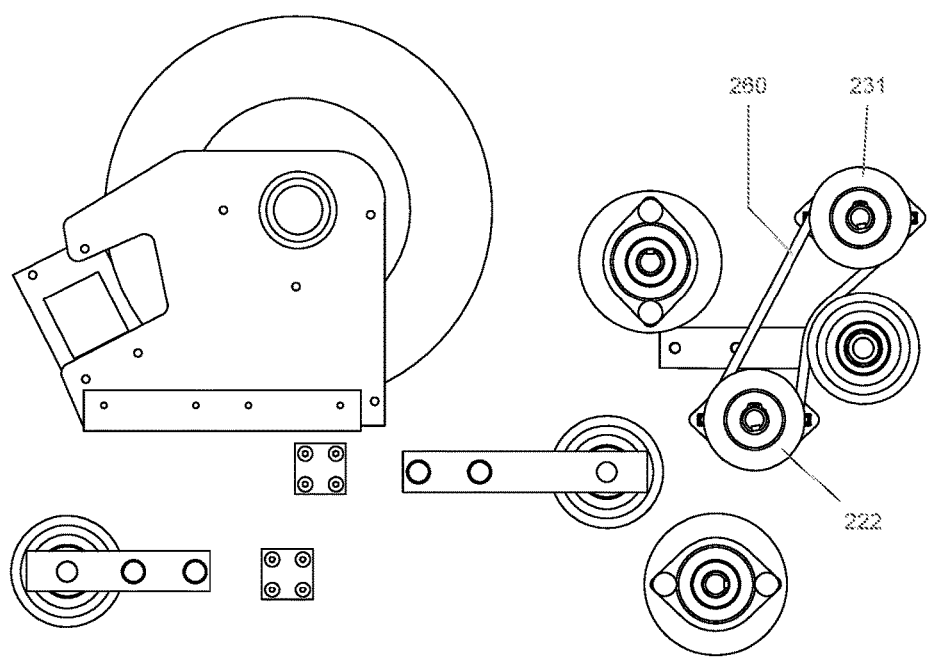
FIG. 25 is a left side view of the arrangement of the coupling belt in the center body of FIG. 16, according to an exemplary embodiment.
Figure 32:
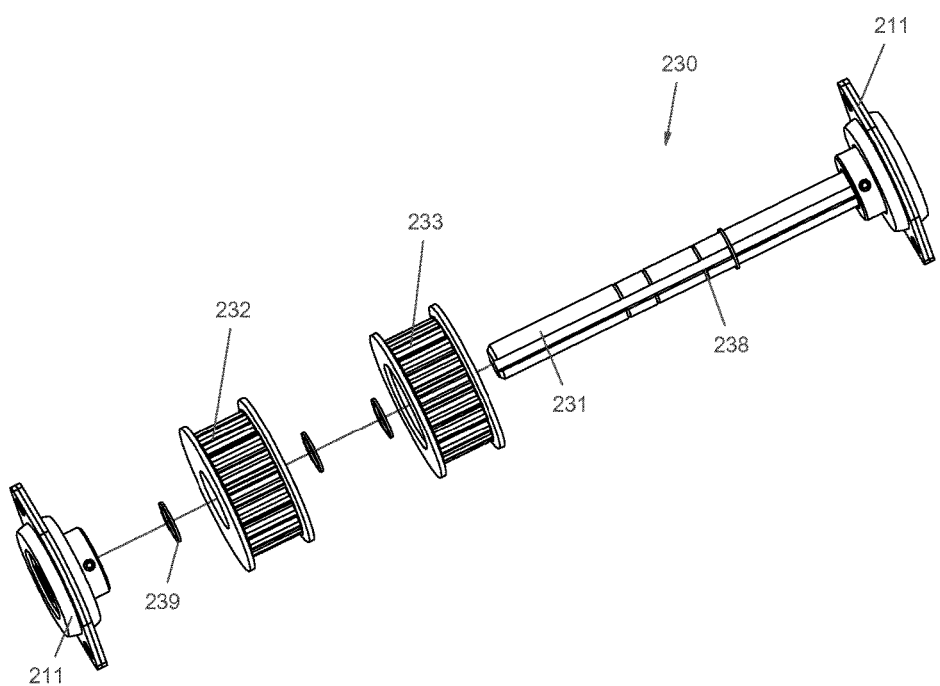
FIG. 32 is an exploded assembly view of an upper shaft assembly for the combination hand crank and foot crank exercise and rehabilitation device of FIG. 1, according to an exemplary embodiment.
Figure 33:
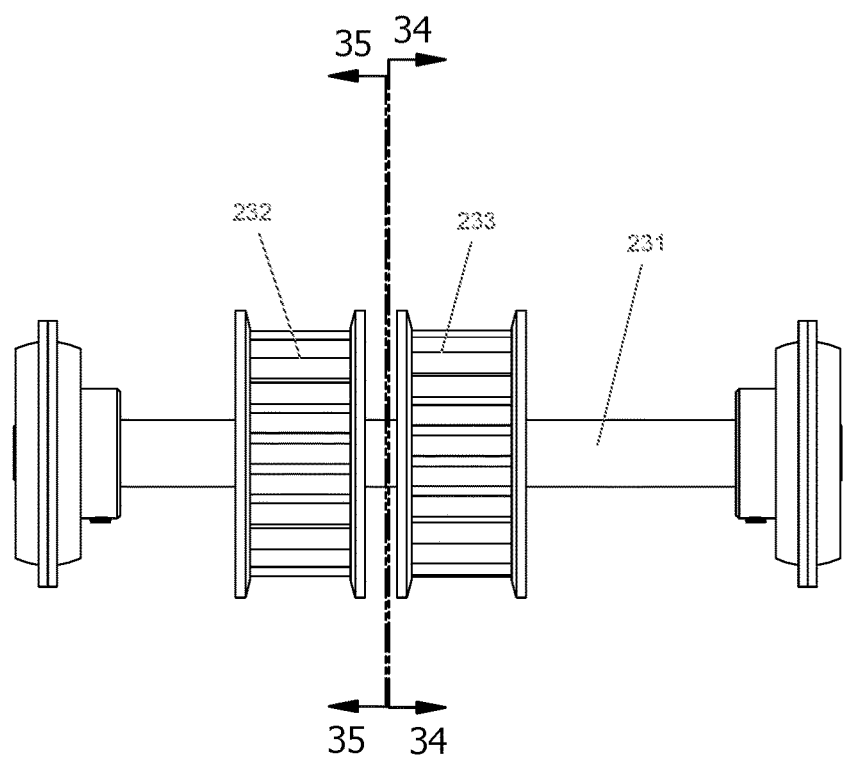
FIG. 33 is a front view of the assembled upper shaft assembly of FIG. 32.
Figure 34:
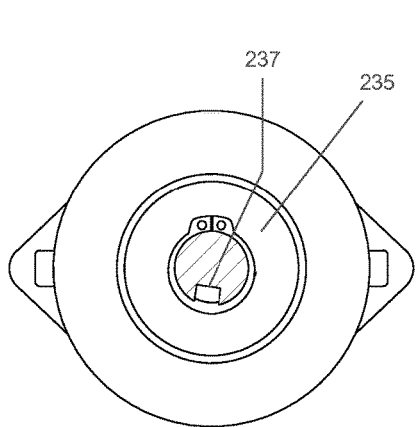
FIG. 34 is a cross-sectional view of the upper shaft assembly of FIG. 33 taken along line 34-34.
Figure 35:
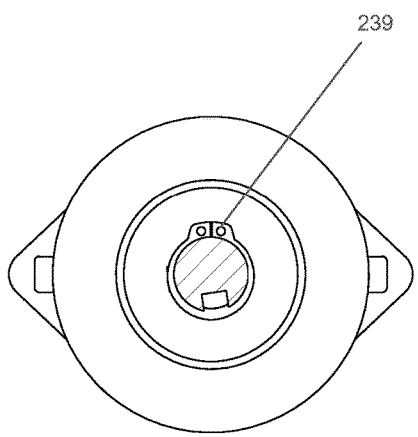
FIG. 35 is a cross-sectional view of the upper shaft assembly of FIG. 33 taken along line 35-35.
Figure 36:
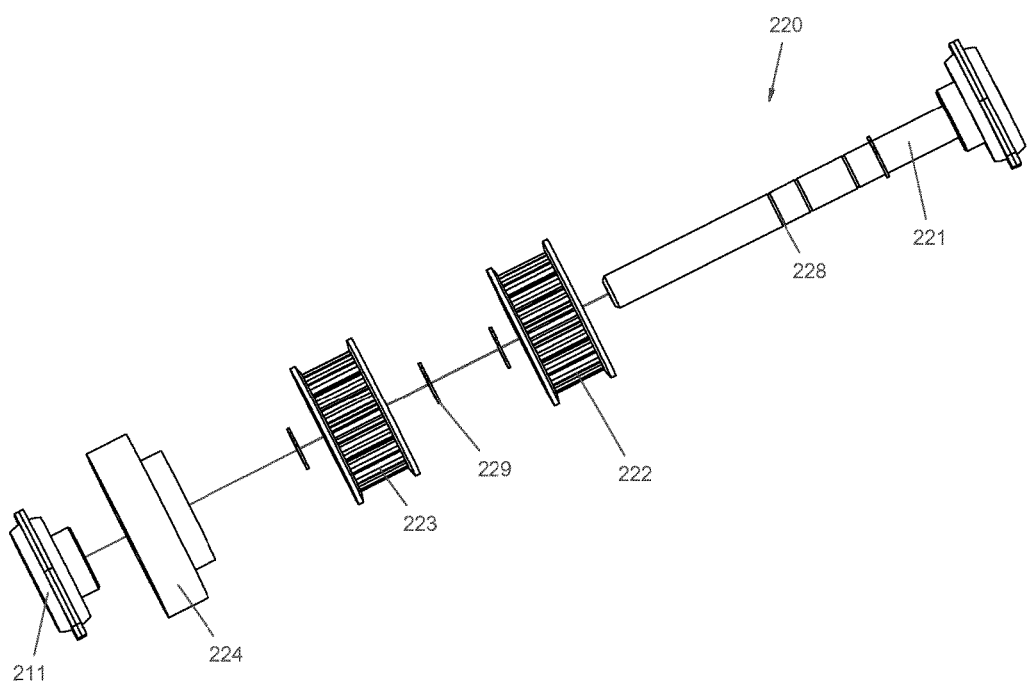
FIG. 36 is an exploded assembly view of a drive shaft assembly for the combination hand crank and foot crank exercise and rehabilitation device of FIG. 1, according to an exemplary embodiment.
Figure 37:
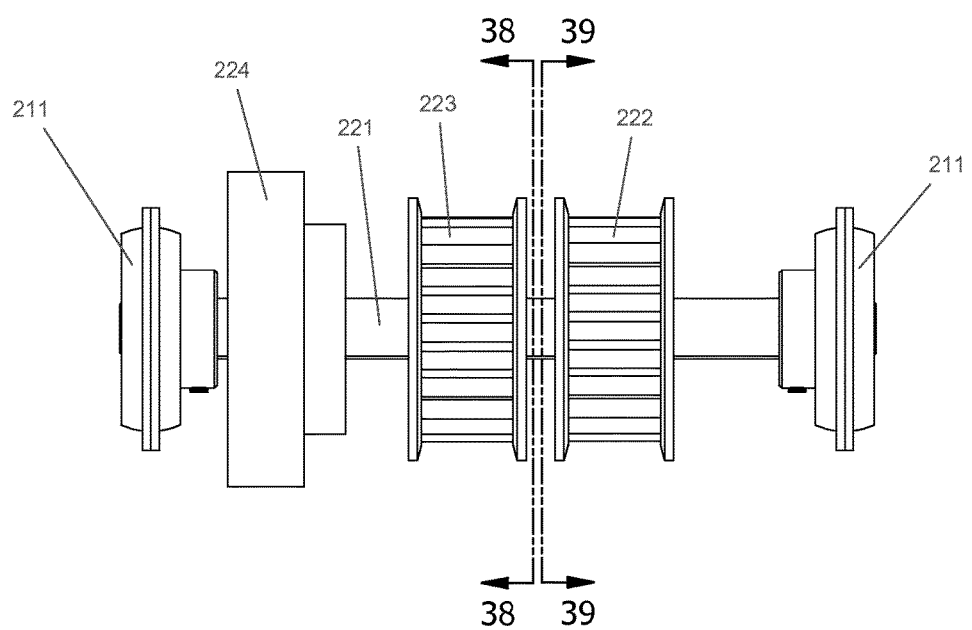
FIG. 37 is a front view of the assembled drive shaft assembly of FIG. 36.
Figure 38:
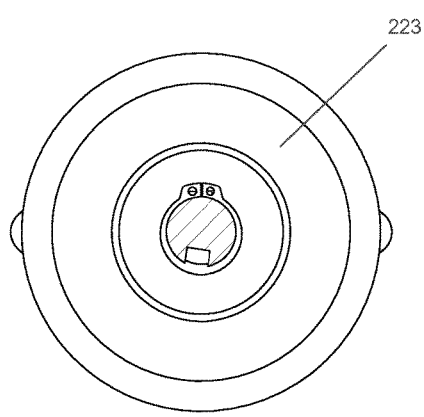
FIG. 38 is a cross-sectional view of the drive shaft assembly of FIG. 37 taken along line 38-38.
Figure 39:
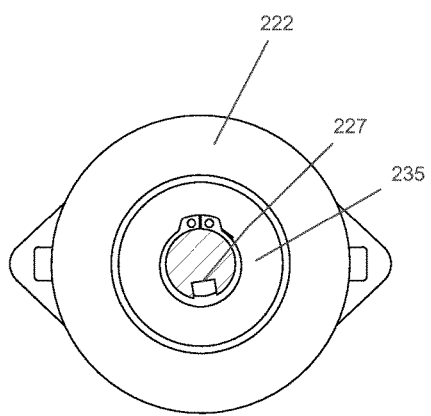
FIG. 39 is a cross-sectional view of the drive shaft assembly of FIG. 37 taken along line 39-39.
Figure 45:
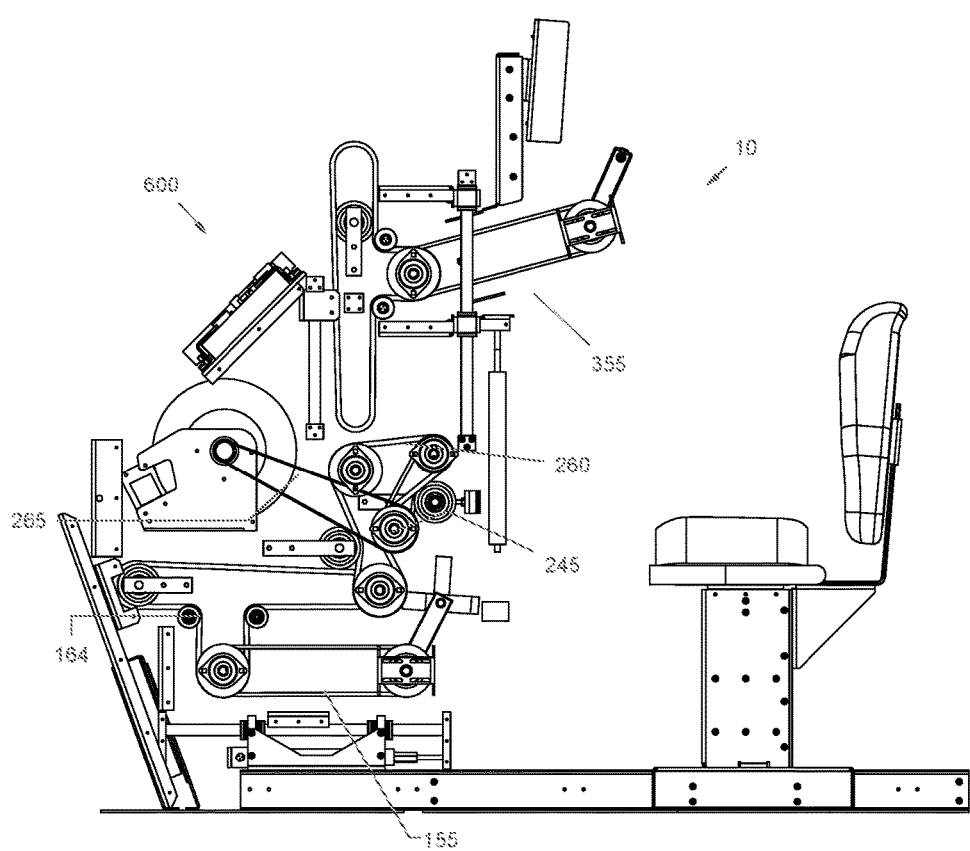
FIG. 45 is a left side view of the combination hand crank and foot crank exercise and rehabilitation device of FIG. 1 with the coverings removed to depict the rotational system of the device, according to an exemplary embodiment.

As seen in, e.g., FIGS. 22 and 45, the coupling shaft assembly 240 is part of the coupling system 170 and rotatably couples the hand crank system 300 with the center body 200 as well as with the foot crank system 100. The coupling shaft assembly 240 includes a shaft 241 supported by bearings 211 fixedly coupled to the left and right panels 202, 203 of the housing 201, a pulley 176 interconnected with the shaft 241 (e.g., directly mounted thereon), and a drive pulley 242 interconnected with the shaft 241. The main drive belt 245 is disposed at least partially over the drive pulley 242, such that rotation of the pulley 176 causes rotation of the shaft 241 and, consequently, the drive pulley 242 and main belt 245. The bearings 211 may have the same structure as described above in regard to the bearings 153 (e.g., a flange bearing that permits a fastener(s) to couple the bearings 211 and shaft 241 to the housing 201, etc.). Different reference numerals are used in regard to the center body 200 for clarity. In one embodiment, the main drive belt 245 is structured as a dual-sided toothed or ribbed belt such that either side can interface with the pulleys and rollers in the system 200. In other embodiments, any type of belt 245 may be used that is capable of being in driving communication with pulleys regardless of which side of the belt 245 is in contact with the pulley(s). Further, according to one embodiment, the drive pulley 242 and the coupling pulley 176 are of equal or substantially equal diameter. As a result, each pulley 242 and 176 rotates at the same rotational velocity. However, in other alternate embodiments, a different sized drive and coupling pulleys may be used to obtain a desired rotational velocity difference between the rotational kinetic energy generated by the hand crank system 300 and that of the foot crank system 100. For example, due a to a user's legs being potentially able to generate more power and a quicker rotational velocity, different sized pulleys may be used with the lower part of the coupling system 170 than with the central part of the coupling system 170 to down-speed the foot crank system rotational velocity to substantially not over power the hand crank rotational velocity.

As shown, each of the front and rear shaft assemblies of the lower part of the coupling system 170 (e.g., shafts 173 and 175, respectively) are rotatably coupled to a lower part of the housing 201 via bearings fixedly coupled to each of the panels 202, 203. The main drive belt 245 is at least partially disposed over the pulley 174 and the pulley 242 of the coupling shaft assembly 240. Because the pulley 171 is also disposed on the front shaft 173, rotation of the pulley 171 rotates the shaft 173, which rotates the pulley 174 and the main drive belt 245, and in turn the pulley 176. Further operation of the coupling system 170 relative to the other systems in the device 10 are described more fully herein following the description of the hand crank system 300.

The tension assemblies 250, 255 are structured to apply tension to the belts in the center body 200. In operation, the tension assemblies 250, 255 apply tension to the main drive belt 245 (via tension assembly 255) and coupling belt 260 (via tension assembly 250) to prevent or substantially prevent the belts 245, 260 from skipping when the user operates the hand crank system 300 and/or foot crank system 100. In other words, due to the toothed nature of the belts 245, 260, if inadequate tension is applied, then one or more teeth can skip in the pulleys. This would cause inefficient operation. Accordingly, the tension assemblies 250, 255 are structured to constantly apply a sufficient amount of tension to each of the belts 245, 260. As shown, the tension assembly 255 is positioned relatively lower than the tension assembly 250 (e.g., proximate seat frame 13) and proximate the generator 210. In comparison, the tension assembly 250 is positioned proximate the front cover 204 and vertically above and at an angle from the tension assembly 255. Each tension assembly 250 is shown to include a tension rod 251 interconnected with a pulley 252. One or more tension blocks 253 may be used to couple the rod 251 to the housing 201. As shown, each tension assembly 250, 255, via blocks 253, are mounted to the housing 201. In one embodiment, the pulleys 252 are free to rotate with respect to the tension rod 251. In another embodiment, the pulleys 252 are stationary such that the belts 245, 260 simply slide over them. All such variations are intended to fall within the spirit and scope of the present disclosure.

Turning now to the bi-directional shaft assemblies, the upper shaft assembly 230 includes a shaft 231 supported on each end by a bearing 211. Each bearing 211 is fixedly attached to the left and right panels 202, 203, such that the shaft 231 extends between the panels 202, 203. As shown, the bearings 211 are structured as self-aligning flange bearings, like bearings 153, for supporting the shaft 231 and permitting bi-directional rotation of the shaft 231.

The upper shaft assembly 230 includes two one-way pulley assemblies (also referred to as a unidirectional torque transmitting device), shown as main drive pulley 232 and pulley 233. The main drive belt 245 is at least partially disposed over the main drive pulley 232 while the coupling belt 260 is at least partially disposed over the pulley 233. As described herein, the one-way pulley assemblies are configured to engage the shaft 231 to cause rotation during a first rotational direction and freewheel (i.e., not cause rotation of the shaft 231) during a second rotational direction that is opposite the first rotational direction. Thus, the one-way aspect or feature of the pulleys 232, 233 constrain each of the pulleys 232, 233 to only one torque-transmitting rotational direction.

While many unidirectional torque transmitting devices may be used for each pulley 232, 233, in the example depicted, one-way bearings 235 are mounted to each of the pulleys 232, 233 and the shaft 231. The one-way bearings and pulley assemblies are shown in greater detail in regard to FIGS. 26-31. The one-way bearings function to couple the pulley to the shaft and limit torque transmission from outside-to-inside (pulley-to-bearing-to-shaft) and inside-to-outside (shaft-to-bearing-to-pulley) in only one rotational direction. In one embodiment, and as described herein below, the torque transmitting direction is opposite whether the rotational force is provided from outside-to-inside or from inside-to-outside (e.g., a clockwise rotational force on the pulley transmits a clockwise torque to the shaft while a clockwise force on the shaft does not transmit to the pulley).

Accordingly, before explaining the function and operation of the bi-directional shaft assemblies overall, referring now to FIGS. 26-31, a unidirectional torque transmitting device, shown as a one-way bearing, is depicted in greater detail according to various exemplary embodiments. It should be understood that each one-way bearing and pulley assembly 400, 500 are constructed from the same components except that the one-way bearing 235 is oriented oppositely within the pulleys 420 in the assembly 400 versus the assembly 500. Accordingly, FIGS. 26-28 depict a one-way bearing and pulley assembly 400 that only allows torque transmission from the pulley 420 when the pulley 420 rotates in a counterclockwise direction while FIGS. 29-31 depict a one-way bearing and pulley assembly 500 that only allows torque transmission from the pulley 520 when the pulley 520 rotates in a clockwise direction. The above-description refers to an outside-to-inside torque transmitting direction.

Referring more particularly to FIGS. 26-31, an exploded assembly view for each assembly 400 and 500 is shown in FIGS. 26 and 29, respectively. The assemblies 400 and 500 generally include a one-way bearing 410 (e.g., unidirectional torque transmitting device, unidirectional rotation device, rotation constraining mechanism or device, etc.) received in a pulley 420. As shown, the pulley 420 defines a first opening 421 and a second opening 422, the second opening being relatively smaller than the first opening 421 and positioned on an opposite side of the opening 421. The openings 421, 422 provide a through-hole for the pulley 420. Because the one-way bearing 410 has a relatively larger diameter than the opening 422, the one-way bearing may only be received in the larger opening 421. In one embodiment, the one-way bearing 410 is press-fit in the opening 421 (e.g., via an arbor tool, etc.). In other embodiments, any type of joining technique for the bearing 410 to the pulley 420 may be used. As shown, the one-way bearing 410 is completely received within the pulley 420, which decreases the amount of occupying space for the assembly. The one-way bearing 410 is in communication with a shaft that extends through the pulley 420. The coupling may be via any type of shaft-to-bearing coupling mechanism (e.g., press-fit, etc.). In the example depicted, the one-way bearing 410 defines a keyway 411, which functions to couple the one-way bearing 410 to a shaft (e.g., shaft 231) via a matching key of the shaft.

The one-way bearing 410 includes an inner ring 412 and an outer ring 413 (e.g., inner and outer races, etc.). In one embodiment, the one-way bearing 410 may be structured as a sprag clutch. In this configuration, a plurality of sprags are disposed between the inner and outer rings 412, 413. The sprags are asymmetric and, thus, provide for torque transmission in one direction and prevent or substantially prevent torque transmission in an opposite direction depending on whether the torque is provided from the inside (the shaft and inner ring 412) or from the outside (the pulley and outer ring 413). In operation, the sprags become wedged between the inner ring 412 and outer ring 413 thereby preventing rotation of the inner ring 412 and the keyway 411 disposed therein.

With respect to assembly 400, outside-to-inside torque transmission occurs from rotation of the pulley 420 in a counterclockwise direction (as looking at face B of the bearing 410 in FIG. 26). Inside-to-outside torque transmission therefore occurs from rotation of the inner ring 412 (or shaft) in a clockwise direction. Thus, if the pulley 420 experiences a clockwise rotational force, the pulley 420 free spins or freewheels (i.e., does not transmit the clockwise torque to the inner 412 and shaft). If the inner ring 412 experiences a counterclockwise torque, the inner ring 412 does not transmit the counterclockwise torque to the pulley 420, such that the inner ring 412 and shaft freewheels.

With respect to the assembly 500, outside-to-inside torque transmission occurs from rotation of the pulley 420 in a clockwise direction (as looking at face A of the bearing 410 in FIG. 29). Inside-to-outside torque transmission therefore occurs from rotation of the inner ring 412 (or shaft) in a counterclockwise direction. Thus, if the pulley 420 experiences a counterclockwise rotational force, the pulley 420 free spins or freewheels (i.e., does not transmit the counterclockwise torque to the inner 412 and shaft). If the inner ring 412 experiences a clockwise torque, the inner ring 412 does not transmit the clockwise torque to the pulley 420, such that the inner ring 412 and shaft freewheels.

As mentioned above, this difference in functionality is based on whether the A-side or B-side of the bearing 410 is inserted into the opening 421 of the pulley 420. This is due to the asymmetric nature of the locking mechanism (e.g., sprags, trapped rollers, etc.) between the inner and outer rings 412, 413. Consequently, Applicant has discovered that this opposite functionality can also be achieved by the orientation of the assembly on the shaft. For example, and as described herein, each of the pulleys 232, 233 of the upper shaft assembly 230 are configured like the assembly 500 but face each other, such that the pulley 232 assembly transmits torque from the outside-to-inside from a clockwise rotational force and the pulley 233 transmits torque from the outside-to-inside from a counterclockwise rotational torque. This characteristic enables the pulley assemblies 400 and 500 to have the same functionality based on their orientation on the shaft.

To enhance the shaft-placement configuration of the assemblies 400, 500, the cavity defined by the opening 421 of the pulley 400 extends to a depth past the centerline 423 of the pulley 420, where the centerline 423 represents the middle or approximate middle of the pulley 420 between the openings 421, 422. Advantageously, when assembled, the bearings 410 are then offset from the centerline 423 within the pulley 420. While the relatively deeper insertion provides for a relatively more secure bond, the deeper insertion also creates a space-occupying difference. In this regard (after assembly), the distance from the opening 422 to the rear face 414 of the one-way bearing 410 is relatively smaller than the distance from the opening 421 to the front face 415. Accordingly, the rear sides of the each of the assemblies (proximate opening 422) can be positioned relatively closer to the support structure for the shaft (e.g., the bearings 211 and panels 206, 207) than the front sides (proximate opening 421) of each of the assemblies. Therefore, while the assembly 500 may replace the assembly 400 if opposite functionality is needed, a simple replacement like this may not always be possible due to space constraints. Applicant has recognized this feature to advantageously reduce the size of the bi-directional shaft assemblies by strategically using each assembly 400, 500. For example, and as mentioned above, rather than using each assembly 400 and 500 on the upper shaft assembly 230, to save space, two oppositely-oriented assemblies 400 are utilized. According to an alternate embodiment, the cavity defined by the opening 421 may approximate the centerline 423 of the pulley 420 such that this unequal space-occupying feature described above is eliminated. All such variations are intended to fall within the spirit and scope of the present disclosure.

Prior to turning to the drive and upper shaft assemblies 220, 230, it should be understood that while the unidirectional torque device is shown as a one-way bearing herein, other types of unidirectional torque devices may be used (e.g., freewheel clutch, etc.). It should also be noted that other styles of one-way bearings may be also be used such that the sprag clutch is not intended to be limiting. For example, in other embodiments, trapped roller bearings or other type of one-way bearing structures may be used (e.g., needle rollers, etc.).

Turning now to FIGS. 32-35 in combination with FIGS. 16-31, the upper shaft assembly 230 is shown according to an exemplary embodiment. Referring collectively to FIGS. 32-35, the shaft 231 includes a keyway 237 that engages with a key of each of the one-way bearings 235 for each of the pulleys 232, 233. A position retaining mechanism, shown as snap rings 239, are structured to engage with grooves 238 (e.g., notches, slits, slots, etc.) defined by the shaft 231 to hold the pulley and one-way bearing assemblies in their desired location on the shaft 231.

In comparison, turning to FIGS. 36-39 in combination with FIGS. 16-31, the drive shaft assembly 220 includes a shaft 221 supported by a pair of bearings 211 that are fixedly attached to the left and right panels 202, 203. The shaft 221 defines a keyway 227 that engages with a key of each of the one-way bearings 235 (one for each of the pulleys 222, 223) to rotatably couple the pulleys 222 and 223 to the shaft 221. Analogous to the shaft 231, the shaft 221 defines one or more grooves 228 structured to receive a retaining mechanism, shown as a snap ring 229, configured to hold the pulleys 222, 223 in their intended locations longitudinally on the shaft 221. The drive shaft assembly 220 is also shown to include a generator pulley 224. The generator pulley 224 is coupled with the generator 210 via a generator belt 265. In one embodiment, the generator pulley 224 is structured as a v-shaped pulley while the generator belt 265 is structured as a v-shaped belt. Rotation of the belt 265 in the power direction of rotation is structured to generate electricity via the generator 210 to power one more components in/on device 10 (or, via the device 10, such as a USB port).

As shown (see FIGS. 16-25), the main drive belt 245 is at least partially disposed about the main drive pulley 223, the pulley 232, the pulley 242, and the pulley 174. The coupling belt 260 is at least partially disposed about the pulley 222 and the pulley 231. In this regard, the main drive belt 245 rotatably couples the main drive pulley 223 to the pulley 232 to the pulley 242 to the pulley 174 while the coupling belt 260 rotatably couples the pulley 233 to the pulley 222. As also shown, an outside part of the main drive belt 245 is in contact with the main drive pulley 223. In this regard, the torque induced on the pulley 223 by the belt 245 is opposite to the rotation direction of the belt 245. In comparison, the torque induced by the belt 245 and coupling belt 260 on the other pulleys that the belts 245, 260 is equivalent to the rotational direction of each belt 245, 260.

Figure 46:
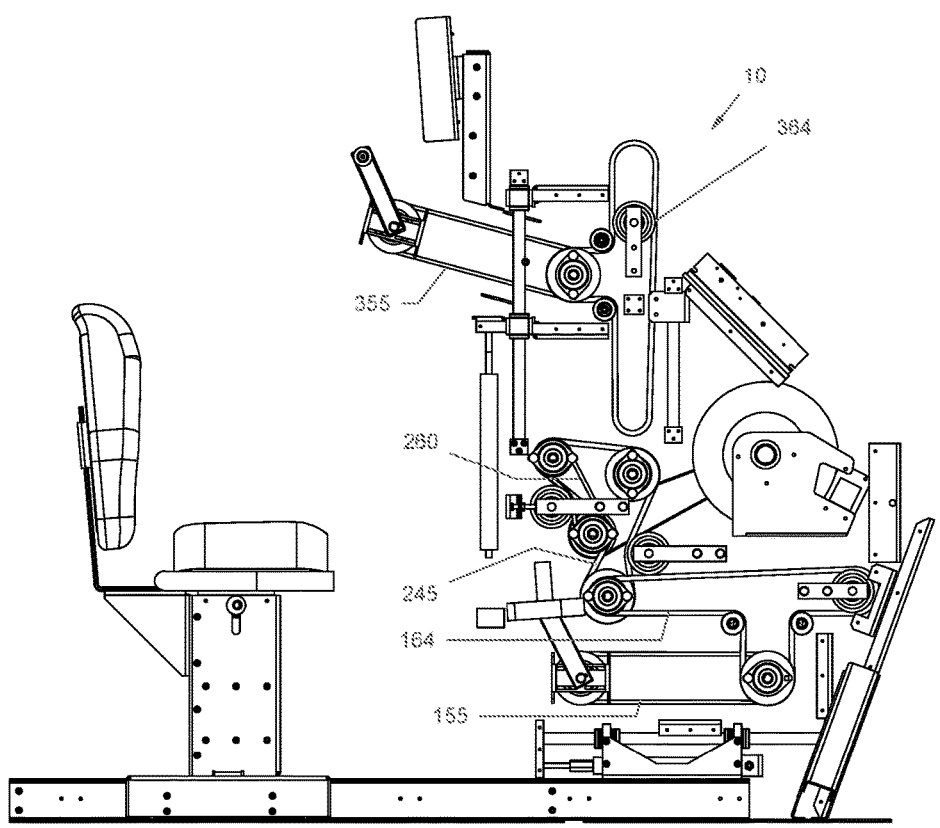
FIG. 46 is a right side view of the combination hand crank and foot crank exercise and rehabilitation device of FIG. 45.

As mentioned above, each of the pulleys 222, 223 on the drive shaft 221 and the pulleys 232, 233 on the upper shaft 231 include one-way bearings 235 to only transmit torque when operated in one rotation directional. This is due, at least in part, by the generator 210 only being driven or operable in one direction. In the example depicted in FIG. 46, the power rotation of direction corresponds with a clockwise direction. Accordingly, regardless of whether the hand cranks or foot cranks are operated in a clockwise or counterclockwise direction, the generator pulley 224 is always operated clockwise to drive the generator 210 clockwise as depicted in FIG. 46. However, in other embodiments, the power rotation of direction may correspond with a counterclockwise direction, such that the shaft assemblies 220 and 230 are configured to always drive the pulley 224 counterclockwise. In still other embodiments, the generator 210 may be driven in any rotational direction such that the intricate unidirectional torque transmitting assemblies 220, 230 may be modified and simplified. All such variations are intended to fall within the spirit and scope of the present disclosure.

In regard to the embodiment depicted in FIG. 46, the power rotation of direction corresponds with a clockwise direction and the configuration and operation of the shaft assemblies 220, 230 with the belts 245 and 260 may be described as follows. In regard to the upper shaft assembly 230, each of the pulleys 232, 233 may be configured like the pulley assembly 500, but with the pulley 232 facing the pulley 233. In this regard, the pulley 232 transmits torque to the shaft 231 (i.e., outside-to-inside) when the belt 245 is driven clockwise and the pulley 232 freewheels (i.e., spins freely with no torque transmission) when the belt 245 is driven counterclockwise. Due to the opposite orientation, the pulley 233 transmits torque to the shaft 231 upon a counterclockwise torque and the shaft 231 transmits torque to the pulley 233 upon a clockwise torque from the shaft 231. Thus, each of the pulleys 232, 233 are structured like the assembly 500 but oriented oppositely. In comparison and in regard to the drive shaft assembly 220, the pulley 223 may be configured like the pulley assembly 500, such that a counterclockwise torque causes the pulley 223 to freewheel and a clockwise torque causes the pulley 223 to transmit the torque to the shaft 221. In comparison, the pulley 222 may be configured like the assembly 400, such that a clockwise torque causes the pulley 222 to transmit the torque to the shaft 221 and a counterclockwise torque causes the pulley 222 to freewheel.

With this in mind, operation of the shaft assemblies 220, 230 operating may be explained as follows. In the first configuration, the main drive belt 245 is driven clockwise (as shown in FIG. 46). From this rotation, the clockwise rotation causes a clockwise torque on the pulley 232 and a counterclockwise torque on the pulley 223. Thus, the pulley 223 freewheels while the pulley 232 transfers a clockwise torque to the shaft 231. Due to the clockwise rotation of the shaft 231, the clockwise torque is transmitted from the shaft 231 to the pulley 233 and the coupling belt 260 is driven clockwise. Due to the clockwise rotation of the coupling belt 260, the pulley 222 transmits the clockwise torque to the shaft 221. While the shaft 221 then free spins within the pulley 223, the clockwise rotating shaft 221 causes the generator pulley 224 to rotate clockwise, which drives the generator 210.

In the second configuration, the main drive belt 245 is driven counterclockwise (still from the FIG. 46 vantage point). This rotation causes a counterclockwise torque on the pulley 232, such that the pulley 232 does not transmit the counterclockwise torque to the shaft 231. In comparison, the belt 245 causes a clockwise torque on the pulley 223. This rotation causes the pulley 223 to transmit the clockwise torque to the shaft 221. The shaft 221 free spins in the pulley 233 but drive the generator pulley 224 clockwise to drive the generator 210. Therefore, the coupling belt 260 remains stationary during counterclockwise rotation of the belt 245.

In summary, counterclockwise rotation corresponds with only rotation of the main drive belt 245 while clockwise rotation of main drive belt 245 corresponds with rotation of both the main drive belt 245 and the other belt 265 (from the FIG. 46 vantage point). As a result, due to two belts being driven, a user experiences a relatively higher resistance during forward or clockwise rotation of at least one of the foot and hand cranks. However, the generator 210 remains driven regardless if the hand and foot cranks are operated counterclockwise or clockwise. During use, a user may advantageously operate the cranks backwards whenever he/she gets tired. Accordingly, the device 10 includes an inherent lower resistance operating mode.

According to the example embodiment illustrated, there are three pulleys (e.g., pulleys 223, 222, and 232) that transmit torque from a clockwise rotational force applied to the main drive belt and one pulley (e.g., pulley 233) that transmits torque from a counterclockwise rotational force applied to the main drive belt (based on an outside-to-inside torque transmitting direction). According to an alternate embodiment, there may be three pulleys that transmit torque from a counterclockwise rotation and one pulley that transmits torque from a clockwise rotational direction. This configuration would also ensure constant clockwise (power rotational direction) for the generator belt 265. Accordingly, the shaft 221 may be constantly driven in one rotation via three unidirectional torque devices configured identically and one unidirectional torque device oriented opposite those three.

Figure 40:
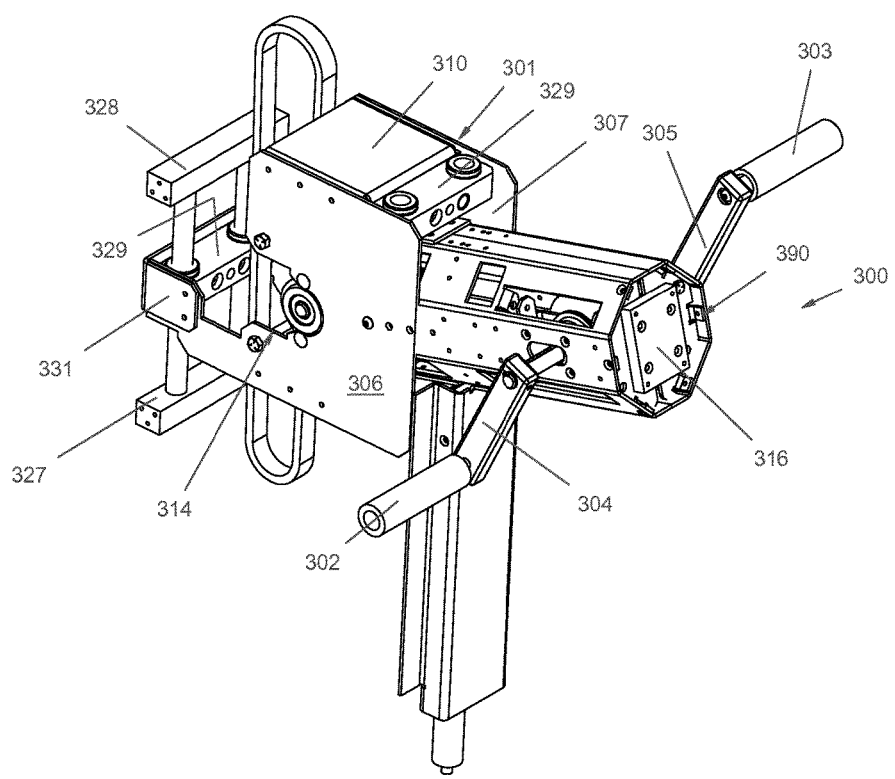
FIG. 40 is a top perspective view of a hand crank system for the combination hand crank and foot crank exercise and rehabilitation device of FIG. 1, according to an exemplary embodiment.
Figure 41:
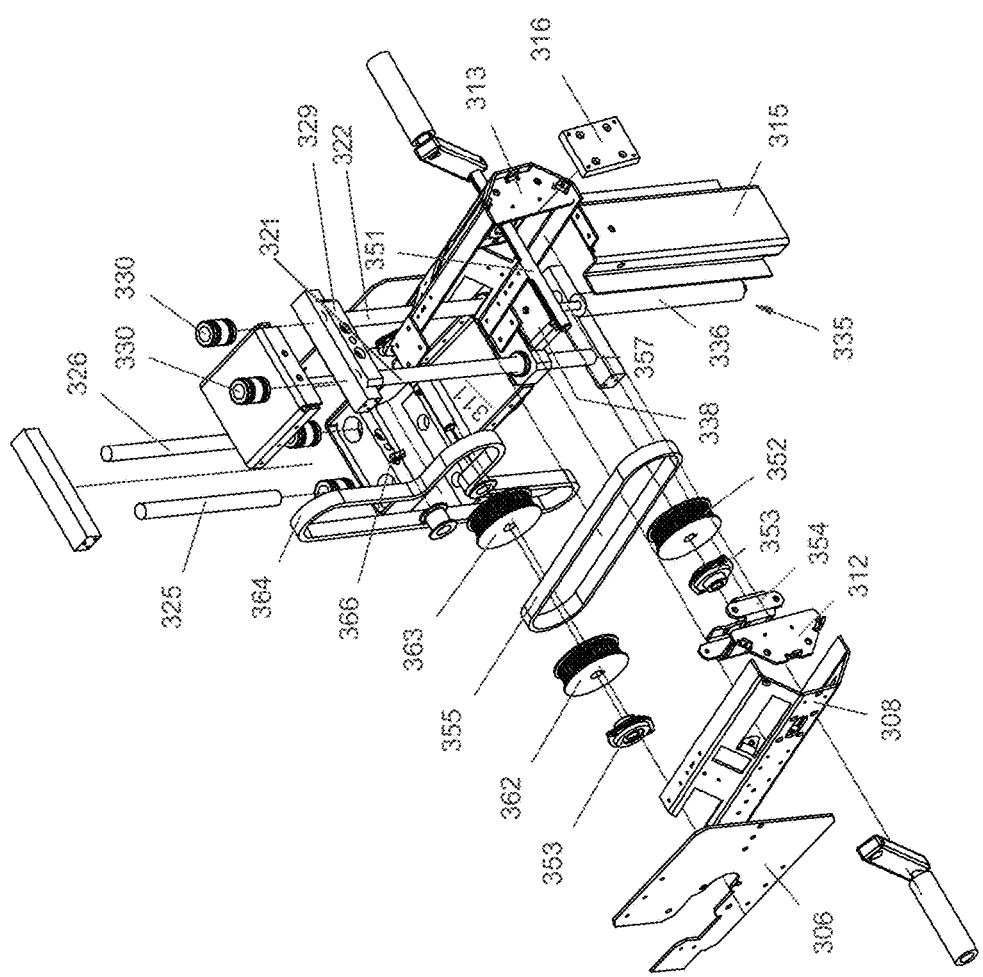
FIG. 41 is an exploded assembly view of the hand crank system of FIG. 40.
Figure 42:
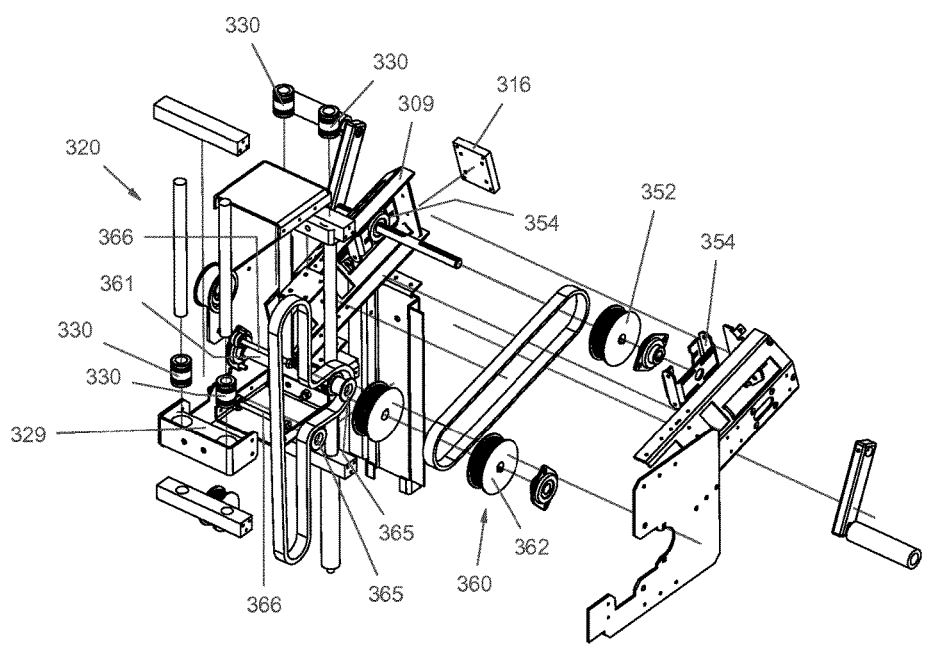
FIG. 42 is another exploded assembly view of the hand crank system of FIG. 40.
Figure 43:
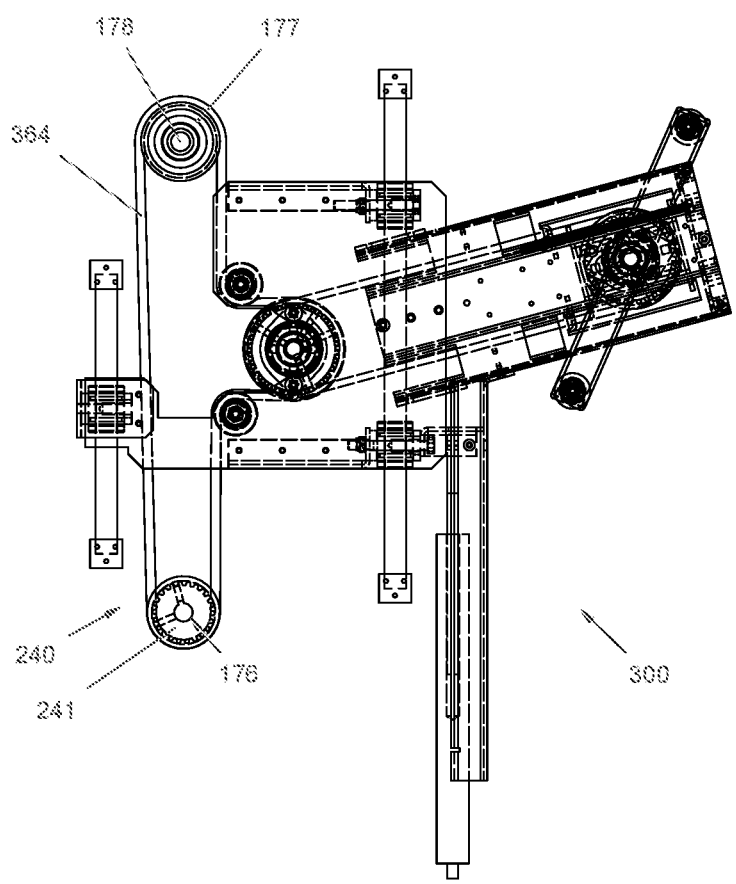
FIG. 43 is a wireframe side view of a portion of the hand crank system of FIG. 40.
Figure 44:
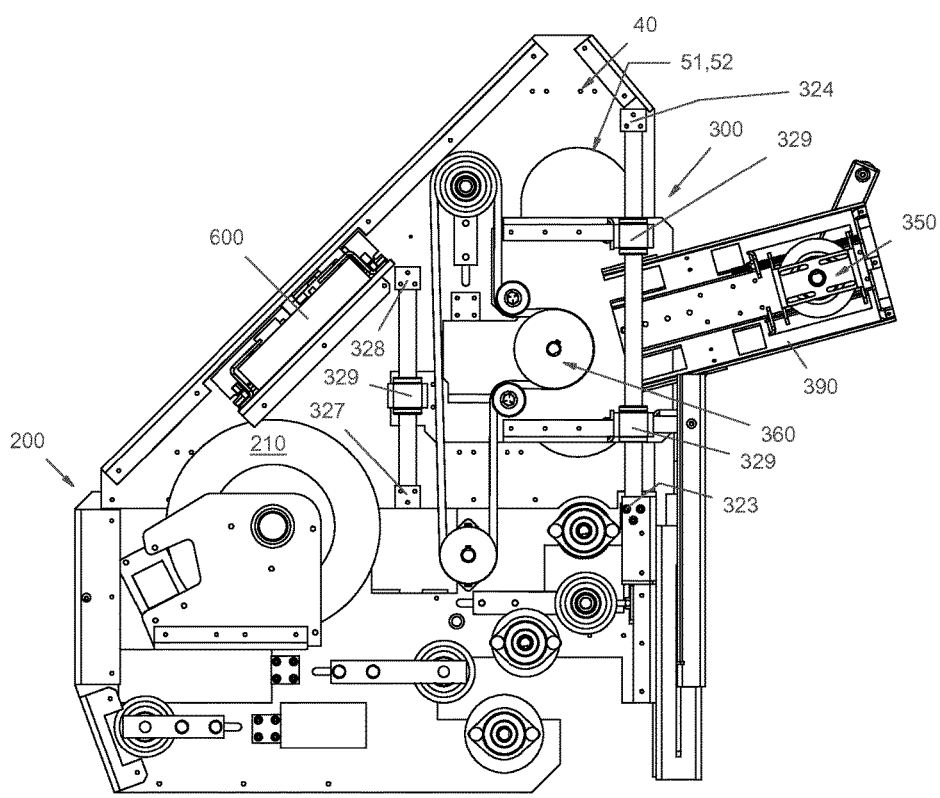
FIG. 44 is a left side view of the hand crank system and the center body of the combination hand crank and foot crank exercise and rehabilitation device of FIG. 1 with the side panel removed, according to an exemplary embodiment

Referring now to FIGS. 40-44, a hand crank system 300 (also referred to herein as a "hand crank assembly") for the device 10 is shown according to an exemplary embodiment. FIG. 40 depicts a top perspective view of the hand crank system 300; FIG. 41 depicts an exploded assembly view of the hand crank system 300; FIG. 42 depicts another exploded assembly view of the hand crank system 300; FIG. 43 depicts a side view of the hand crank system 300; and, FIG. 44 depicts a left side view of the hand crank system 300 coupled to the center body 200 (with most of the belts and various other components removed from each system for clarity). As shown, the hand crank system 300 generally includes a housing 301, a left hand grip 304 coupled to a left arm 304 (collectively referred to as the left hand crank), a right hand grip 303 coupled to a right arm 304 (collectively referred to as the right hand crank), an arm assembly 390, a position adjustment system for translational or sliding movement of the arm assembly, and a rotational system for receiving the rotational force from a user operating the left and right hand cranks.

The housing 301 is structured to support (e.g., attach or couple to, etc.) and at least partially cover the arm assembly 390. The housing 301 may include one or more panels (e.g., covers, shrouds, shielding, etc.) or be of integral construction. As shown, the housing 301 is constructed from several pieces or components and includes a left panel 306, a right panel 307, a top panel 310, and a bottom panel 311. As shown in the example depicted, the left and right panels 306, 307 are mirror-images of each other. As also shown, panel 306 defines a cutout 314 that extends from a first end of the panel 306 towards a second end of the panel 306, where the second end is proximate the left and right hand cranks. In addition to reducing weight of the housing 301 and providing relatively easy access to the components within the housing 301, the cutout 314 (and the analogous cutout define by the right panel 307) is structured to support a rear shaft assembly 360 of the hand crank system 300. As shown, each of the top and bottom panels 310, 311 are fastened or coupled to each of the left and right panels 306, 307 near an upper and lower part of the panels 306, 307, respectively. Assembly of the top and bottom panels 310, 311 to the left and right panels 306, 306 creates a substantially rectangular housing 301 of the hand crank system 300. Further, this assembly also permits attachment of other components to and within the housing 301. Moreover, the left panel 306, right panel 307, top panel 310, and bottom panel 311 also function to shield or substantially shield the components located within the housing 301 to protect them during use.

The arm assembly 390 (also referred to herein as the "hand crank assembly" or "upper arm assembly") is coupled to the housing 301 and is vertically translatable via a slide assembly 320. The arm assembly 390 is structured substantially identical to the lower arm assembly 190, except that the upper arm assembly 390 is vertically translatable. Accordingly, like the lower arm assembly 190, the upper arm assembly 390 is coupled to the housing 301 (e.g., via panels 306, 307), such that movement of the housing 301 and arm assembly 390 is contemporaneous. The arm assembly 390 includes the left and right hand cranks, a front shaft assembly 350, a rear shaft assembly 360 rotatably coupled to the front shaft assembly 350, and a casing for the arm assembly 390. The casing includes a left bracket 308, a right bracket 109, a left cover 312, and a right cover 313. The left and right brackets 308, 309 are shown to be substantially octagonal in shape and are sized to substantially surround the front shaft assembly 350. Positioned near a front part of the hand crank system 300 (e.g., proximate the chair 21), a left cover 312 that is half-octagonal shaped is configured to be received in an end of the left bracket 308. In comparison, the right cover 313 that is half-octagonal shaped is configured to be received in an end of the right bracket 309. A cover 316 is fastened or coupled to each of the left and right covers 312, 313 to join the left and right brackets 308, 309.

Position adjustment of the hand crank system 300 (more particularly, the arm assembly 390) to accommodate a user (e.g., torso length, relative position with respect to foot crank system 100, etc.) may be accomplished via a variety of different methods or movement mechanisms. These movement mechanisms may also be referred to as position adjustment mechanisms, position adjustment devices, movement devices, and similar nomenclature words or phrases. While many different position adjustment mechanisms may be used with the hand crank system 300, in the example depicted, a slide assembly 320 is used to cause upper and lower substantially vertical movement 94, 95 (see, e.g., FIG. 3) of the hand crank system 300 (particularly the arm assembly 390). Generally speaking, the slide assembly 320 includes a pair of front rails 321, 322 (e.g., guides, guide rails, etc.) that are fixedly coupled to a top and a bottom bracket 324, 323 and a pair of back rails 325, 326 (e.g., guides, guide rails, etc.) that are fixedly coupled to a top and a bottom bracket 328, 327. As shown, the bottom bracket 323 is fixedly coupled to the front cover 204 of the center body 200. Further, as shown in FIG. 5 for example, the bottom back bracket 327 is coupled to an upper mid-part of the housing 201 (i.e., to the panels 202, 203) of the center body 200. The brackets and rails not only permit vertical movement of the hand crank system 300 but also function to couple the hand crank system 300 to the center body 200. Each of the brackets 323, 324, 327, and 328 define two openings for receiving ends of two of the rails; however, in this embodiment, the openings are not configured as through-holes. In this regard, the brackets 323, 324, 327, and 328 are configured as end caps for the rails (i.e., support structures for the rails). Accordingly, the bracket 323 is fixedly coupled to a front upper portion of the center body 200 which functions to support the bottom of the rails 321, 322 to a front upper portion of center body 200 (see, e.g., FIG. 44). Similarly, the bracket 327 may be fixedly coupled to an upper mid-portion of the center body 200 to support the back rails 325, 326. As shown in FIG. 44, the top bracket 324 may be coupled to upper portions of the left and right sides of the housing 40. In this regard, the rails 321, 322 extend from the center body 200 past the hand crank system 300 to an upper portion of the housing 40 of the device 10. In comparison, while the bottom bracket 327 may be coupled to an upper mid portion of the generator system 200, the upper bracket 328 is coupled to a mid-height and mid-area portion of the housing 40. Thus, the front rails 321, 322 are relatively longer longitudinally than the back rails 325, 326.

To maintain or substantially maintain the vertical nature of the front rails 321, 322 and back rails 325, 326, aligning brackets 329 with bearings 330 may be used with the hand crank system 300. An aligning bracket 329 is coupled to each of the panels 306, 307 near the top and front portions of the panels 306, 307. Aligned vertically parallel is another bracket 329 (not shown) that is disposed near the bottom in the front portion of the panels (e.g., proximate the arm assembly 390). Another aligning bracket 329 is coupled to a back portion of the panels 306, 307 (e.g., furthest from the left and right arm cranks). Each of the aligning brackets 329 define openings that receive bearings 330. In one embodiment, the bearings 330 are structured as self-aligning bearings that prevent or substantially prevent flexion in the rails. The bearings 330 may be coupled to the brackets 329 via any conventional manner (e.g., press fit, fastened via flanges, etc.). Accordingly and as shown, each of the front rails 321, 322 are interconnected with bearings 330 disposed in the top and bottom front aligning brackets 329. In comparison, each of the back rails 325, 326 are interconnected with bearings 330 disposed in one bracket 329. As shown, a mounting bracket 331 is coupled to the bracket 329 disposed on the back rails 325, 326. The mounting bracket 331 is also coupled to the left and right panels 306, 307. In other embodiments, the mounting bracket 331 may be excluded and the left and right panels 306, 307 may couple directly to the bracket 329. In still other embodiments, the mounting bracket 331 and bracket 329 may be of integral construction. All such variations are intended to fall within the spirit and scope of the present disclosure.

With the above-construction in mind, the arm assembly 390 is structured to move substantially vertically upon the front rails 321, 322 and the back rails 325, 326. Due to the coupling of the arm assembly 390 to the housing 301, the housing 301 may also translate vertically. In operation, an assistive device is structured to provide a holding force to hold the hand crank system 300 in the desired position and to reduce the force needed to move the assembly 300. Further, while four rails are shown in this example embodiment, other configurations may use more or less rails. For example, a single rail that is disposed substantially centrally within the housing 301 may replace the four rails. In an alternate embodiment, the rails and/or assistive device may be replaced with other mechanisms that facilitate the vertical movement of the assembly 390 and provide a holding force for said assembly 390. For example, in other embodiments, a pin-and-catch mechanism may be used to provide the position-holding force for the assembly 390 (e.g., a user removes the pin from the catch and vertically positions the assembly 390 in a desired location and then inserts the pin in the nearest catch to lock the assembly 390 in that desired location). In another example, the front and back rails may be replaced with a rack-and-pinion mechanism, where interaction of the rack with the pinion holds the assembly 390 in its desired location. In this configuration, a user may operate a wheel to rotate the pinion to either move the assembly vertically higher or vertically lower. In still another example, the mechanical slide assembly may be replaced with fluid-driven cylinders (e.g., pneumatic, hydraulic, etc.) that not only provide the force to move the system 390 but also provide a holding force to lock the assembly 390 in a desired location. Accordingly, while the slide assembly 320 is shown and described herein, it should be understood that many other types of position adjustment mechanisms may be used with the upper arm assembly 390.

As mentioned above, in the example depicted, an assistive device is used to provide an assistive force to move the arm assembly 390 and hold the arm assembly 390 in a desired location. Analogous to the foot crank system 100, the assistive device of the hand crank system 300 is structured as a gas-spring assist device 335. In this regard, the gas-spring assistive device 335 has the same structure and function as the gas-spring assistive device 125. Further, like the gas-spring assistive device 125, the gas-spring assistive device 335 only provides an assistive force for upward direction 94 movement (see FIG. 3). For downward direction 95 movement, some of the fluid is evacuated from the device 335 to reduce the holding force and allow a user to relatively easily overcome the assistive force and move the assembly 390 in a downward direction 95. In other embodiments, the gas-spring device 335 may only provide an assistive force in the downward direction 95 while in still other embodiments, the gas-spring device 335 may provide an assistive force in each of the upward and downward directions 94, 95.

Figure 17:
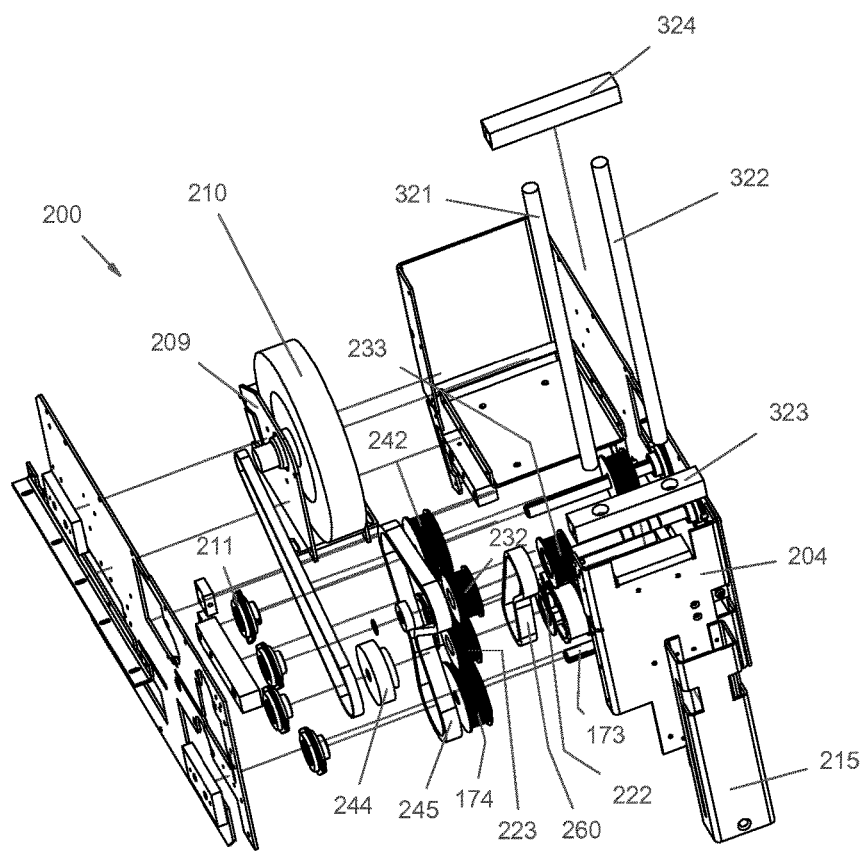
FIG. 17 is an exploded assembly view of the center body of FIG. 16.
Figure 18:
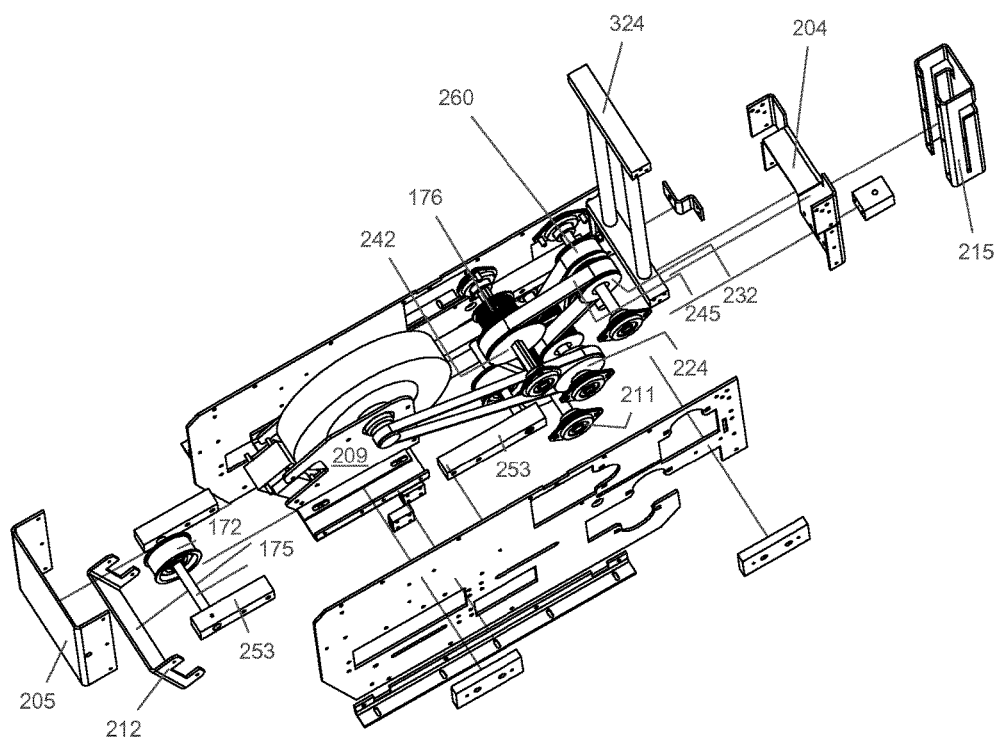
FIG. 18 is another exploded assembly view of the center body of FIG. 16.
Figure 19:
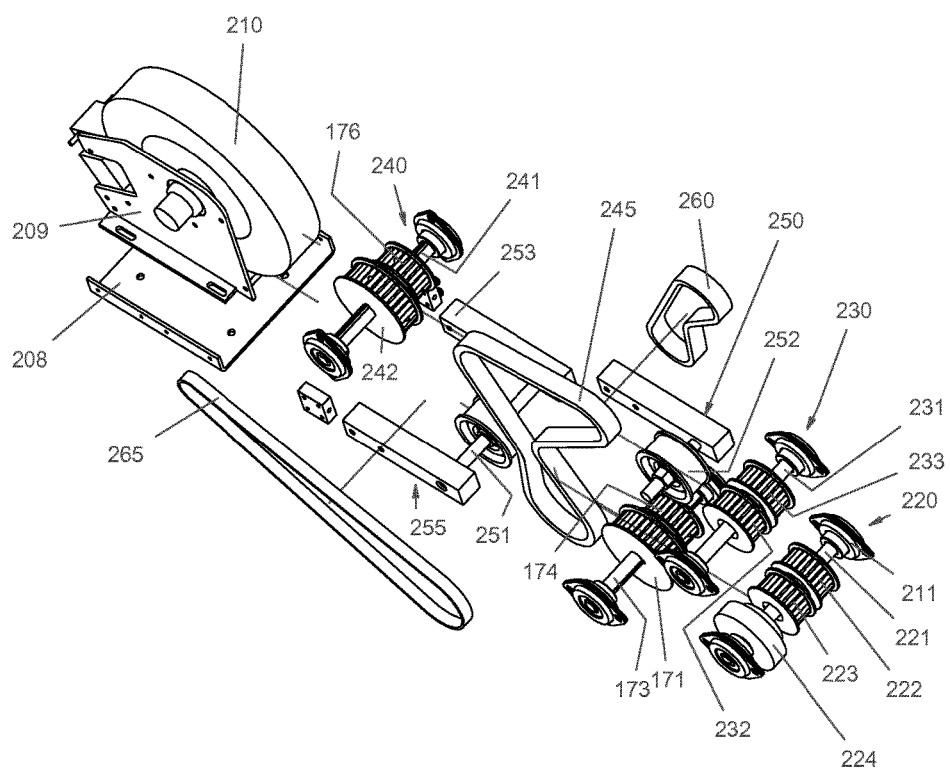
FIG. 19 is a perspective view of the coupling system and force translation system portions of the center body of FIG. 16.
Figure 20:
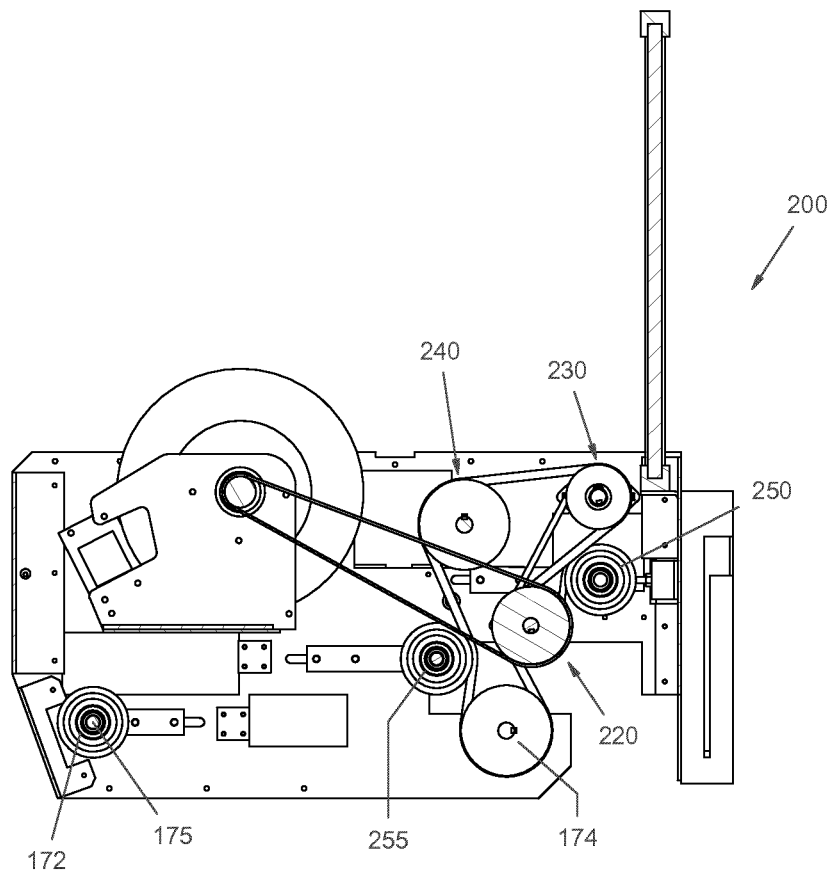
FIG. 20 is a partial cross-sectional left side view of the center body of FIG. 16.
Figure 21:
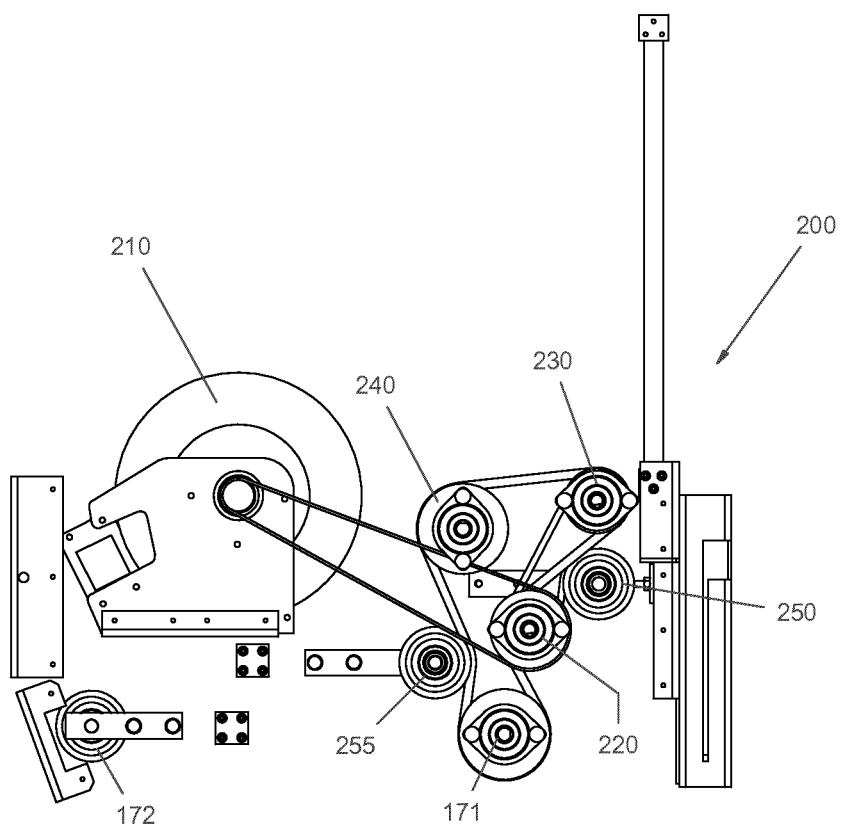
FIG. 21 is a left side view of the center body of FIG. 16 with the housing of the center body removed.

Accordingly, similar to the gas-spring device 125, the gas-spring device 335 includes a cylinder 336 with a concentric rod 337. The gas-spring assist device 335 utilizes a fluid (e.g., gas, hydraulic fluid, etc.) to cause relative movement between the cylinder 336 and rod 337. In operation, a user presses a button to force fluid (e.g., gas) into the cylinder 336, which causes the rod 337 and cylinder 336 to axially move away from each other. As shown in FIG. 41, an upper end of the rod 337 is coupled to a bracket 338 that is coupled to a bottom portion of each of the left and right brackets 308, 309. In comparison, as shown in FIG. 17, an end of the cylinder 336 is coupled to a bottom piece of the housing 215, which is used to at least partially shield the gas-spring assistive device 335. However, the center body 200 is a stationary component in the device 10. As such, actuation of the button or other triggering device causes fluid to expand the rod 337 in an upward direction 94 to push on the bracket 338 and move the arm assembly 390 upward. Release of the button or triggering devices causes the fluid to expel from the gas-spring device 325 such that a user may lower the arm assembly 390 in a downward direction 95.

Similar to the assistive device 125, while a gas-spring assist device is shown in FIGS. 40-44, it should be understood that other embodiments may utilize a different force-assist mechanism. For example, certain embodiments may utilize a screw coupled to a crank where rotation of the crank in a first rotation causes the screw to rotate and push the housing out in an upward direction 94 and rotation of the crank in an opposite direction causes the screw to pull the housing in a downward direction 95. In another example, the assist mechanism may be structured as spring-loaded wheels with a locking mechanism. In this case, rotation of the wheels in one direction causes tension in the spring to effectively limit translation to a certain point. Rotation of the wheels in the other direction then "unwinds" the tension to permit movement in the other direction. Thus, many different assist mechanisms may be used with all such variations intended to fall within the spirit and scope of the present disclosure.

Still referring to FIGS. 40-44, with some of the components of the hand crank system 300 and movement thereof explained, the components of the force translation aspect of the system 300 may now be explained. The user-force translation system includes a front shaft assembly 350, a rear shaft assembly 360, and an upper part of the coupling system 170 that is rotatably coupled to the rear shaft assembly 360. The front shaft assembly 350 is rotatably coupled to the arm assembly 390 near a front end (e.g., proximate the left and right hand cranks). The rear shaft assembly 360 is rotatably coupled to the housing 301 near a back end (e.g., furthest from the left and right hand cranks).

The front shaft assembly 350 includes the left hand crank (i.e., left hand grip 302 (e.g., handle) and left arm 304) rotatably coupled to one end of a shaft 351 and the right hand crank (i.e., right hand grip 303 (e.g., handle) and right arm 305) rotatably coupled to the opposite end of the shaft 351. In use, a user grips each handle 302, 303 and rotates the left and right hand cranks in a cyclical motion (e.g., a bicycle-like motion) to drive and rotate the shaft 351. As shown, the shaft 351 extends outside of the arm assembly 390 (e.g., left and ride panels 306, 307) to permit the hands of a user to engage with the grips 302, 303. Disposed within the arm assembly 390 on the shaft 351 and included with the front shaft assembly 350 is a pulley 352, a pair of bearings 353, and a pair of brackets 354. One of the brackets 354 is fixedly coupled to an interior portion of the left bracket 308 while another of the brackets 354 is fixedly coupled to an interior portion of the right bracket 308 of the arm assembly 390. The brackets 354 are used to support and couple to each of the bearings 353. In this regard and as shown, the bearings 353 are structured as flange bearings to permit coupling. However, the bearings 353 may be structured as any bearing type that permits rotation of the shaft 351 while also supporting the shaft 351 to reduce flexion that may be caused from an uneven application of force to the left and right foot cranks. Accordingly, the bearings 353 may include a ball bearing, a self-aligning bearing, a bushing, a plain bearing, etc. Thus, this construction is analogous to the front shaft assembly 150 of the foot crank system 100.

The pulley 352 is interconnected with the shaft 351 (e.g., directly mounted to shaft 351) and provides rotatable coupling with the rear shaft assembly 360 via a drive belt 355 disposed over a pulley 362 of the rear shaft assembly 360.

Accordingly, moving to the rear shaft assembly 360, the rear shaft assembly 360 is shown to include a rear shaft 361, the pulley 362, another or second pulley 363, a pair of bearings 353 mounted to the left and right panels 306, 307, a timing belt 364, and a pair of tensioner assemblies having rollers 365 interconnected to studs 366. The pair of bearings 353 support the rear shaft 361 and permit free rotation of the rear shaft 361. The second pulley 363 is positioned proximate the right panel 307 and disposed on the rear shaft 361 (e.g., interconnected with, directly mounted on). In operation, rotation of the front shaft 351 via operation of the left and right hand cranks transfers rotational force to the pulley 352 of the front shaft 351 and consequently, via the drive belt 355, rotational force is transferred to the pulley 362 of the rear shaft assembly 360. Rotation of the pulley 362 on the rear shaft 361 causes the rear shaft 361 to rotate, which also causes rotation of the second pulley 363.

Referring now more particularly to the upper part of the coupling system 170, as shown, the upper part of the coupling system 170 includes the second pulley 363, an upper pulley 177 mounted on an upper shaft 178, and a timing belt 364 at least partially disposed over the second pulley 363, the upper pulley 177, and the lower pulley 176 (see, e.g., FIG. 17). The upper shaft 178 (e.g., rod, stud, etc.) is fixedly attached to the housing 40 (see, e.g., FIG. 5) while the shaft 241 that supports the lower pulley 176 is fixedly attached to the housing 201 of the center body 200. Thus, the upper arm assembly 390 is vertically adjustable relative to the upper and lower pulleys 177, 176. The upper part of the coupling system 170 transfers mechanical rotational energy from the hand crank system 300 to the center body 200. In this regard, rotation of the timing belt 364 transfers rotational force from the rear shaft assembly 360 to the coupling shaft assembly 240 to, eventually, the generator 210 and the foot crank system 100.

It should be understood that the pulleys of the upper part of the coupling system 170 have been given different reference numerals relative to the pulleys of the front and rear shaft assemblies 350, 360 for clarity and ease of explanation. However, in one embodiment, the upper and lower pulleys 177, 176 have the same structure as the pulleys 352, 362, and 363 (e.g., same diameter, same configuration, etc.) such that the rotational velocity is constant throughout the hand crank system 300. However, in other embodiments, one or more of the pulleys may have different diameters to achieve a desired rotational velocity difference.

The tension or tensioner assemblies are structured to provide a tension to the timing belt 364 (e.g., to prevent droop, etc.) during upward and downward movement of the arm assembly 390. The tensioner assemblies include a lower tension assembly and an upper tension assembly. The upper tension assembly is positioned vertically above the lower tension assembly. Each tension assembly includes a roller 365 interconnected or directly mounted on a stud 366. The timing belt 364 is at least partially disposed over each of the rollers 365. The studs 366 are coupled to each of the left and right panels 306, 307, with the rollers 365 disposed between the panels 306, 307. In another embodiment, the studs 366 are only coupled to one of the panels 306, 307 with the rollers 365 attached to an end of the stud 366. Further, in one embodiment, the studs 366 are structured as hexagonal bolts that are fixedly coupled to each of the panels 306, 307 (e.g., no rotational capability). In this configuration, the rollers 365 may include a bearing to permit relative rotation of the rollers 365 with respect to the studs 366; or, in another instance, the rollers 365 may also be fixedly coupled to the studs 366, such that the timing belt 364 simply wraps partially over the roller. In the latter configuration, the rollers 365 may have a surface of relatively lower friction that the timing belt 364 is disposed over to reduce wear of the timing belt 364. In another embodiment, the studs 366 may be configured as a shaft or rod with the rollers 365 directly mounted or interconnected to the studs 366. In this configuration, four bearings (e.g., bearing 353) may be used to mount the shafts to the panels 306, 307 to permit rotation of the shaft. In each of these embodiments, the timing belt 364 is at least partially disposed over the rollers 365, where the rollers 365 may be stationary or have free rotation, and wherein the rollers 365 provide tension to the timing belt 364.

With the aforementioned description in mind, operation of the hand crank system 300 may be described as follows. First, the user may adjust the vertical position of the upper arm assembly 390. The user may use the assistive device 335 to position the arm assembly 390 in a comfortable location for operation. During adjustment, the upper arm assembly 390 slidably moves upon the front rails 321, 322 and the back rails 325, 326. The rails 321, 322 and 325, 326 remain stationary as well as the upper and lower pulleys 177, 176. During the movement, the tensioner assemblies move their position relative to the pulleys 177, 176 to maintain adequate tension on the timing belt 364. Second, once the desired position is obtained, the user may begin operation of the left and right hand cranks. Rotation of the left and right hand cranks transfers rotational energy via the front shaft 351 to the pulley 352 to drive the drive belt 355. The drive belt 355 then transfers the rotational energy to the pulley 362, which transfers the rotational energy to the rear shaft 361 and to the pulley 363. The pulley 363 then provides the rotational energy via the timing belt 364 to each of the pulleys 177, 176, where the pulley 176 transfers the rotational energy to the shaft 241 and to the drive pulley 242. As a result, the rotational force generated via the user is transferred to the main belt 245 of the center body 200 and, eventually, to the generator 210.

As shown, each of the pulleys 352, 362, and 363 on the front and rear shaft assemblies 350, 360 are of the same diameter. In this regard, each pulley 352, 362, and 363 has the same rotational velocity. However, in other embodiments, different sized pulleys may be used with the front and rear shaft assemblies 350, 360. In a similar manner, while each of the pulleys 371, 372 are shown to be of the same diameter, other embodiments, may utilize different sized pulleys 371, 372. In those embodiments, different sized pulleys may be used to either increase or decrease the relative rotational velocity generated from the front shaft assembly 350. In still another embodiment, the pulley systems shown in regard to the front and rear shaft assemblies 350, 360 may be replaced with a gear and sprocket systems. In this situation, analogous to a multi-gear bicycle, a user may adjust or shift gears to increase or decrease resistance in hand pedaling.

In still further embodiments, a speed sensing device may be included with the hand crank system 300. For example, a magnet speed sensor may be mounted proximate the pulley 352 to record the rotational speed of the pulley 352 on the front shaft assembly 350. The data acquired via the speed sensor may be provided to the control system 600, where the control system translates this rotational speed into a desired speed unit (e.g., miles-per-hour, etc.). This information may then be displayed via the display 30 and tracked via the control system 600 for a user to keep track of their progress. In other embodiments, any type of speed sensing device may be used to acquire data indicative of a rotational speed of the front shaft 351 (more generally, the rotation speed that the user is operating the left and right hand cranks).

With the aforementioned description above regarding each of the foot crank system 100, center body 200, and hand crank system 300, operation of the exercise and therapeutic device 10 may be described with reference to FIGS. 45-46. FIGS. 45-46 depict the device 10 with the housing 11 housing for each system 100, 200, 300 removed to depict the rotational aspects of the device 10.

The hand cranks and foot cranks may be operated in either a clockwise direction or a counterclockwise direction. A clockwise rotational direction may correspond with a forward direction for the device 10 while a counterclockwise rotational direction may correspond with a backwards direction for the device 10 as seen in FIG. 46. Furthermore and as mentioned above, the power rotational direction for the generator 210 may also correspond with a clockwise rotational directional. Therefore, a first mode of operation of the device 10 is a forward or clockwise rotational direction. Starting from the foot crank system 100, the user rotates the pedals 102, 103 clockwise, which turns the front shaft 151 clockwise, and the drive belt 155 clockwise. The drive belt 155 drives the pulley 162 of the rear shaft assembly 160 clockwise, which rotates the rear shaft 161 that rotates the second pulley 163 of the rear shaft assembly 160 clockwise. The second pulley 163 then drives the timing belt 164 clockwise, which drives the pulley 171 clockwise. The pulley 171 rotates the shaft 173 clockwise, which rotates the pulley 174 of the coupling system 170 clockwise. The pulley 174 drives the main belt 245 clockwise. The clockwise rotational of the main belt 245 drives the pulley 242 clockwise, which drives the shaft 241 clockwise, which drives the pulley 176 clockwise. Before turning to the hand crank system 300, still via the main belt 245, the main belt 245 transmits a clockwise rotational force onto to the pulley 232 of the upper shaft assembly 230. Via the one-way bearing 235, the pulley 232 transmits the clockwise rotational torque to the shaft 231. Via the one-way bearing 235, the clockwise rotating shaft 231 transmits a clockwise torque to the pulley 233, which drives the coupling belt 260 clockwise. On the drive shaft assembly 220, a counterclockwise torque is induced on the pulley 223. But, due to the one-way bearing 235, the pulley 223 free spins and does not transmit the counterclockwise torque to the shaft 221. Rather, the pulley 222, via the clockwise rotating coupling belt 260, transmits a clockwise torque to the shaft 221 to drive the shaft 221 and generator pulley 224. Accordingly, power is generated via the generator 210. As mentioned above, the lower pulley 176 is driven clockwise via the main belt 245. The lower pulley 176 drives the timing belt 364 in the hand crank system 300 clockwise. The clockwise rotating timing belt 364 drives the pulley 363, which drives the shaft 361, and the pulley 362 disposed on the shaft 361 of the rear shaft assembly 360 clockwise. The clockwise rotation of the pulley 362 drives the drive belt 355 clockwise, which drives the pulley 352 on the front shaft assembly 350, which drives the left and right hand cranks.

In regard to a second mode of operation of the device 10, a counterclockwise rotational direction for either of the hand cranks or foot cranks may be described as follows. The user rotates the hand cranks counterclockwise, which rotates the shaft 351 counterclockwise, which drives the belt 355 counterclockwise, which drives the pulley 362 of the rear shaft assembly 360 counterclockwise. The pulley 362 drives the shaft 361 counterclockwise, which drives the second pulley 363 counterclockwise, which drives the timing belt 364 counterclockwise. Counterclockwise rotation of the timing belt 364 drives the lower pulley 176 counterclockwise, which drives the shaft 241 and the pulley 242 counterclockwise. The pulley 242 drives the main belt 245 counterclockwise. Counterclockwise rotation of the belt 245 provides a counterclockwise torque to the pulley 232 of the upper shaft assembly 230 and a clockwise torque in the pulley 223 of the drive shaft assembly 220. Via the one-way bearings, the pulley 232 freewheels (does not transmit torque to the shaft 231) while the pulley 223 transmits a clockwise torque to the shaft 221, which transmits a clockwise torque to the generator pulley 224 to drive the generator 210. However, the shaft 221 free spins in the pulley 222, such that neither the pulley 222 nor the pulley 233 drive the coupling belt 260. Accordingly, in the backwards rotational direction, the coupling belt 260 remains stationary. The counterclockwise rotation of the main belt 245 drives the pulley 174 counterclockwise, which drives the shaft 173 and pulley 171 counterclockwise. The counterclockwise rotating pulley 171 rotates the timing belt 164 counterclockwise, which rotates the pulley 163 counterclockwise. The pulley 163 rotates the rear shaft 161 counterclockwise, which rotates the pulley 162 and drive belt 155 counterclockwise. The drive belt 155 drives the pulley 152, the shaft 151, and the left and right foot cranks counter clockwise.

Thus, the hand cranks and the foot pedals rotate in sync and transfer rotational energy between the systems 100 and 300. Due to a user's legs typically having more power than a user's arms, Applicants have considered the possibility of utilizing different sized pulleys in one or more of the systems to speed up the generated rotational velocity from the hand crank system 300 relative to that of the foot crank system 100.

Furthermore, while the above example illustrates that the hand cranks and foot pedals rotate in sync and at the same speed or substantially the same speed (e.g., if the same sized pulleys are used), other embodiments may utilize a clutch to control power transfer between the hand crank and foot crank systems. The clutch may be structured as any type of clutch including, but not limited to, multi-plate clutches, centrifugal clutches, wet or dry clutches, cone clutches, and any other belt-driven or shaft-driven clutch. The clutch may be operable in an engaged and a disengaged position. When in the engaged position, the hand cranks and foot pedals rotate in sync. When disengaged, the foot pedals and hand cranks can rotate independent of each other (e.g., the hand cranks may be rotated clockwise while the foot pedals are rotated counterclockwise, etc.). In the clutch configuration, the generator may receive power from the active system or systems. If the generator like used in FIGS. 1-46 is utilized, then one or more torque constraining devices may be used to ensure that the generator is always or substantially always driven in the power rotational direction. If a generator that may be driven in any direction is utilized, then a simple coupling (e.g., belt, gear, chain, etc.) may be used between the hand and foot cranks systems and the generator. Further, some embodiments may utilize an energy storage device (e.g., battery, capacitor, etc.) and/or external energy source (e.g., a wall socket, etc.) such that power is transmitted directly to the control system 600 and display 30. In this case, the unidirectional torque transmitting devices used to ensure that the generator is always driven in a power rotational direction may be removed from the device 10.

Certain embodiments also contemplate modifications to the device 10. For example, the arm assembly 390 may be adjustable vertically to accommodate a standing user. In this embodiment, the arm assembly 390 may be substantially larger than the lower arm assembly 190. In another example, the device 10 may be modified to be sold with only the hand crank or foot crank system. However, the modularity of the device enables the not included system to be added to the device at a later time. As an example, a user may choose to only purchase bike portion (i.e., foot crank system 100) of the device. Advantageously, the lower pulley 176 and the rest of the hand crank system 300 may simply be removed from the device 10. The bi-directional shaft assemblies 220, 230 can still permit constant power rotational direction for the generator 210. A user may add the hand crank system 300 to the housing 40 at a later date by including the hand crank system 300 and the lower pulley 176. Similarly, in regard to the foot crank system, the foot crank system may be excluded by removing the foot crank system 100 and the pulley 171. In another example, the generator may be excluded from the device, which may also remove one or more of the unidirectional torque devices as well. Accordingly, as can be appreciated, many modifications that still fall within the spirit and scope of the present disclosure are contemplated by the Applicants.

Moreover, in the example of FIGS. 1-46, the device 10 includes several belts for synchronizing rotation between the foot crank system 100 and hand crank system 300 as well as for driving the generator 210. More particularly, the device 10 includes two belts per each of the foot crank system 100 and hand crank system 300 and three belts in the center body 200 for a total of seven belts in the device 10. However, other embodiments may use utilize more or fewer than seven belts.

For example and referring now to FIGS. 47-53, a three-belt configuration for an exercise and therapeutic device 1000 having a foot crank system 1100 and a hand crank system 1300 (the "device 1000") is shown according to an exemplary embodiment. The device 1000 may be configured and structured in a substantially similar manner to the device 10. In this regard, the device 1000 may be used by users intended to rehabilitate an injury and/or exercise. The device 1000 is generally structured as a recumbent-style bicycle mechanically coupled with a hand crank system to facilitate full body exercise and/or rehabilitation.

As shown, the device 1000 generally includes a housing 1001, a seat frame 1020, a chair 1030, a display 1040, a control system 1050, a foot crank system 1100, a center body 1200, and a hand crank system 1300. The housing 1001 is structured as an enclosure to substantially house and cover the foot crank system 1100, the center body 1200, and the hand crank system 1300. The housing 1001 may be of integral construction or assembled from two or more structures (e.g., panels, covers, shrouds, shielding, brackets, etc.). In the example depicted, the housing 1001 is assembled from several components including a left upper panel 1002, a right upper panel 1003, a top cover 1004, a rear bracket 1005, a left lower panel 1006, a right lower panel 1007, a front lower cover 1009, and a pair of oppositely oriented brackets 1009. As shown, one or more of the panels may define cutouts (e.g., openings, apertures, voids, etc.) that reduce the overall weight of the housing 1001 and permit access to the interior space defined by the assembled housing 1001. As shown, the opposite oriented brackets 1009 are positioned vertically above and below the hand crank system 1300. In use, the brackets 1009 substantially shield the opening provided in the housing 1001 that the hand crank system 1300 extends through.

In the example of FIGS. 47-53, the chair 1030 and seat frame 1020 have the same structure and operational characteristics as the seat frame 13 and chair 21 in the embodiment of FIGS. 1-40. Accordingly, the chair 1030 is slidable on the seat frame 1020 both fore and aft relative to the housing 1001. Once a desired position is obtained, the chair 1030 may be securably locked via a retaining mechanism (e.g., a pin tethered to the chair 1030 that is received in a hole in the seat frame 1020, etc.) to the seat frame 1020 to prevent movement of the chair 1030 during usage of the device 1000. Further, if desired, the chair 1030 may be adjusted vertically to provide additional position adjustment enhancements.

The display 1040 may be structured like the display 30, such that the display 1040 may provide information to a user of the device 1000. The display 1040 may include an interactive display (e.g., a touchscreen, voice-activated, etc.) or any other type of display that can be used to receive inputs and display information regarding operation of the device 1000. In some embodiments, the display 1040 may be structured to provide information from an external source, such as a smartphone, a satellite or cable television signal, and the like. The control system 1050 may be powered from the generator and/or via a power cord that is selectively coupled to an outlet. The control system 1050 may be structured like the control system 600 and include one or more modules and any other electronics or actuating devices. Thus, the control system 1050 may include a memory with a processing circuit that executes one or more rehabilitation programs and/or exercise programs that are displayed on the display 1040 for the user to choose from. Via the control system 1050, the user may also adjust the resistance the generator applies to control the ease or relative hardness the user experiences in turning the hand cranks and/or foot cranks.

Despite not being shown, the device 1000 may also include a frame, such as the frame 60 shown in FIGS. 6-8. The frame may couple to a lower part of the housing 1001 in order to support and substantially prevent the likelihood of a tip event occurring. Further, one or more components of the device 1000 may also be coupled to the frame, such as the seat frame.

Similar to the device 10 of FIGS. 1-46, the device 1000 includes a horizontally adjustable foot crank system 1100 and a substantially vertically adjustable hand crank system 1300. Relative to the hand crank system 300, the hand crank system 1300 is oriented parallel or substantially parallel to a flat ground surface. However, in other embodiments, the hand crank system 1300 may be oriented at angle like the hand crank system 300.

According to one embodiment, each of the foot crank system 1100 and hand crank system 1300 are slidably or translatably moveable in a horizontal direction 1071 and a vertical direction 1070, respectively. The amount of translation may be analogous to that of the foot crank system 100 and the hand crank system 300. According to other embodiments, the foot crank system 1100 and hand crank system 1300 may be adjustable any user-defined amount. According to alternate embodiments, the hand crank system 1300 may be pivotable vertically closer to and further from the ground surface in addition to or in place of a vertical sliding movement.

Referring more particularly to FIGS. 47-53, the functionality of the foot crank system 1100, center body 1200, and hand crank system 1300 may be more fully explained. The foot crank system 1100 is shown to include a housing 1101 that encloses (e.g., shields, protects, covers, etc.) a front shaft assembly 1120, a support structure for the housing 1101, and an assistive device, shown as gas-spring assist device 1130, for providing horizontal movement of the foot cranks 1124, 1125. As shown, the housing 1101 is supported by a frame comprising a left and a right rail 1102, 1103. In the example depicted, the left and right rails 1102 are structured as u-channels. However, in other embodiments, the left and right rails 1102, 1103 may have a different configuration (e.g., I-beams, replaced with a square channel or conduit, etc.). The housing 1101 includes a projection 1110 that extends into the gap defined by the left and right rails 1102, 1103. In other words, the "u" portion of the rails 1102, 1103 are oriented facing each other. Attached to the projection 1110 are rollers 1111 (e.g., wheels, casters, etc.). The u-channel structure of the rails 1102, 1103 provide upper and lower surfaces that the rollers 1111 may engage with and roll upon. The gas-spring assistive device 1130 may be structured like the other gas-spring assist devices described herein in regard to FIGS. 1-46 (e.g., gas spring assist device 335). Accordingly, upon activation of a triggering mechanism (e.g., button, switch, etc.), the gas-spring assist device 1130 exerts a horizontal force to cause the housing 1101 move in a horizontal direction 1071 via the interaction of the rollers 1111 and the rails 1102, 1103. In one embodiment, the gas-spring assist device 1130 only exerts a force to push the housing 1101 closer to a user (e.g., towards the chair 1030). In another embodiment, the gas-spring assist device 1130 may be structured to exert a force a force to either push or pull the housing 1101 closer to or further or further from the user. In a turn, a user may place the foot cranks 1124, 1125 in their desired location.

The front shaft assembly 1120 includes a left foot crank 1124, a right foot crank 1125, a shaft 1121 coupled the left and right foot cranks 1124, 1125, and a pulley 1123. As shown, each of the left and right foot cranks 1124, 1125 include a pedal 1125 coupled to an arm 1126 that is rotatably or fixedly coupled to the shaft 1121. The pedals 1125 may freely rotate with respect to the arm 1126 and are sized and shape to receive a foot of the user. A bicycle-force applied to the pedals 1125 causes the shaft 1121 to rotate due to the coupling of the shaft 1121 to the arms 1126, which are coupled to the pedals 1125. The left and right foot cranks 1124, 1125 are positioned outside of the housing 1001. However, the shaft 1121 is supported by bearings 1122 (e.g., flange bearings, such as bearings 211) coupled to left and right sides of the housing 1101. The pulley 1123 is interconnected with the shaft 1121 (e.g., directly mounted on) and disposed within the housing 1101 (e.g., between the bearings 1122).

A main drive belt 1150 is disposed at least partially over the pulley 1123. As seen most clearly in FIGS. 50-51, the main drive belt 1150 interconnects the foot crank system 1100 with the center body 1200 and the hand crank system 1300. Thus, the main drive belt 1150 replaces the coupling systems of the embodiment of FIGS. 1-46. Advantageously, therefore, the device 1000 may be constructed using relatively fewer belts that may be prone to wear and tear during usage.

To maintain adequate tension for the main drive belt 1150 throughout the device 1000, several tension assemblies may be used. As shown most clearly in FIG. 51, a rear positioned roller 1140 and an upper pulley 1142 are coupled to the housing 1101 of the foot crank system 1100. Positioned rearward of the roller 1140 is a second pulley 1142 coupled to a tension arm 1160. The tension arm 1160 is fixedly coupled to the housing 1001 of the device 1000. Positioned above the housing 1101 is another tension arm 1160 rotatably coupled to a pulley 1142 (e.g., proximate the center body 1200). Thus, one tension arm 1160 and pulley 1142 are positioned near a front portion of the housing 1001 (e.g., toward the hand crank system 1300) while another tension arm 1160 and pulley 1142 are positioned near a back portion of the housing 1001 (e.g., near the generator). Each of the tension arm 1160 and pulley 1142 assemblies are fixedly coupled to the housing 1001. Thus, when the housing 1101 of the foot crank system 1100 moves, both the roller 1140 and pulley 1142 coupled to the housing 1101 also moves. However, tension in the belt 1150 is maintained via the pulleys 1142 and rollers 1140 that engage with the belt 1150.

The center body 1200 (also referred to as the generator assembly) is configured similarly to the center body 200. Accordingly, the center body 1200 includes a housing 1201 for at least partially supporting a generator 1210, an energy storage device 1215 (e.g., a battery, capacitor, etc.), and two bi-directional shaft assemblies shown as a drive shaft assembly 1220 and a front shaft assembly 1230. The energy storage device 1215 may be used to provide an initial force to the generator 1210 to reduce the starting torque.

The bi-directional shaft assemblies 1220, 1230 are configured to always maintain a power rotational direction for the generator 1210 regardless of the rotational directional of the hand or foot cranks, such that the bi-directional shaft assemblies 1220, 1230 may be analogous to the bi-directional shaft assemblies 220, 230. Accordingly, the bi-directional shaft assemblies 1220, 1230 may include one or more unidirectional torque transmitting devices (e.g., a one-way bearing, one-way freewheel clutch, freewheel, overrunning clutch, etc.). Like the embodiment of FIGS. 1-40, the device 1000 utilizes a one-way bearing as the unidirectional torque transmitting device.

Figure 48:
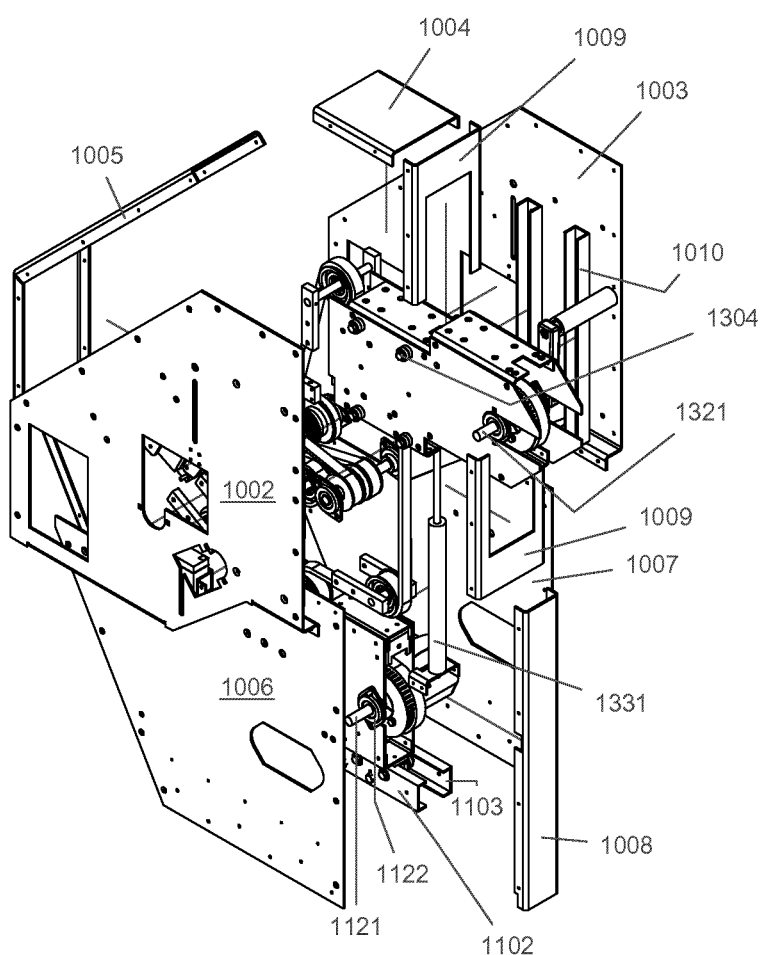
FIG. 48 is a left side partially exploded view of the combination hand crank and foot crank exercise and rehabilitation device of FIG. 47.
Figure 49:
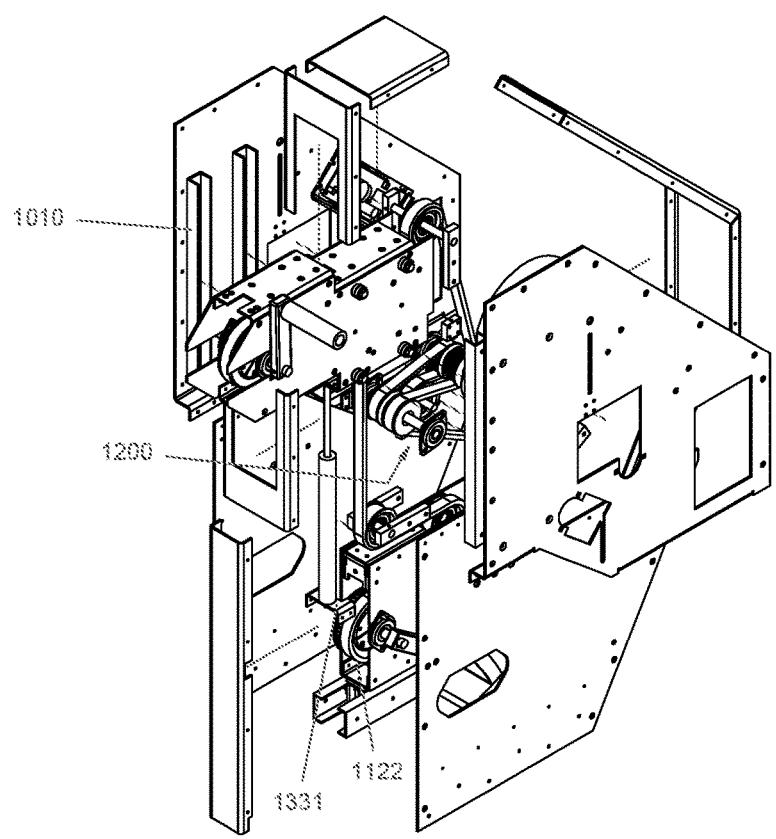
FIG. 49 is a right side partially exploded view of the combination hand crank and foot crank exercise and rehabilitation device of FIG. 47.
Figure 50:
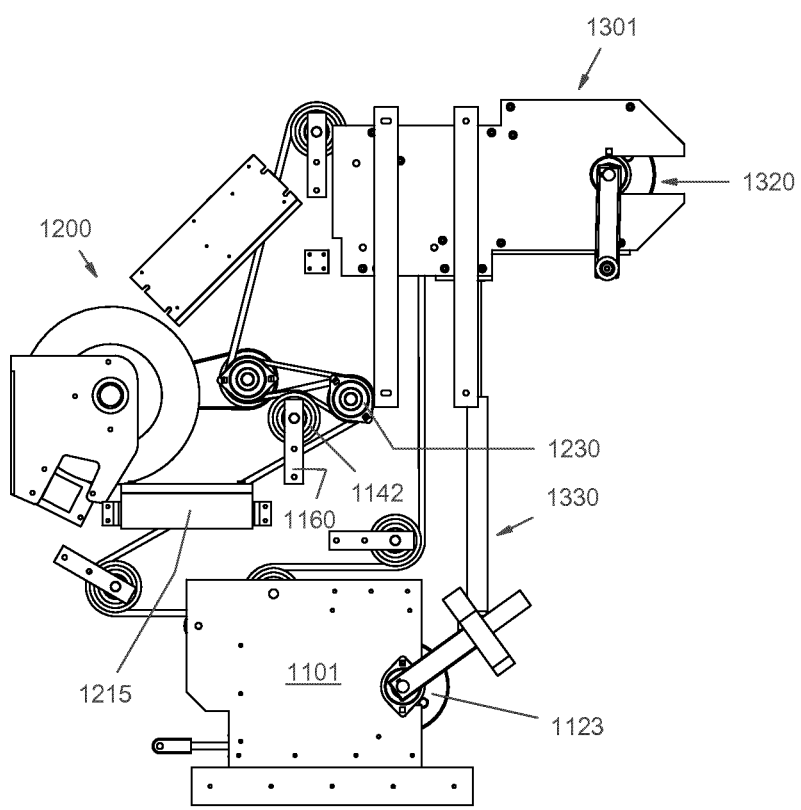
FIG. 50 is a left side view of the combination hand crank and foot crank exercise and rehabilitation device of FIG. 47 with the housing removed, according to an exemplary embodiment.
Figure 51:
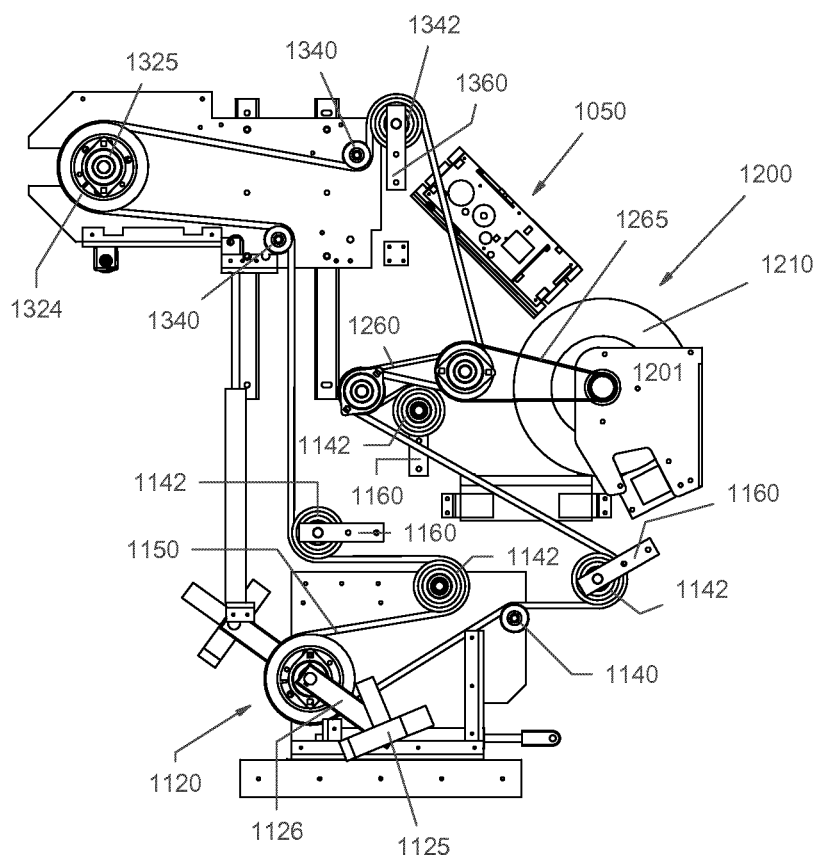
FIG. 51 is a right side view of the combination hand crank and foot crank exercise and rehabilitation device of FIG. 50.
Figure 52:
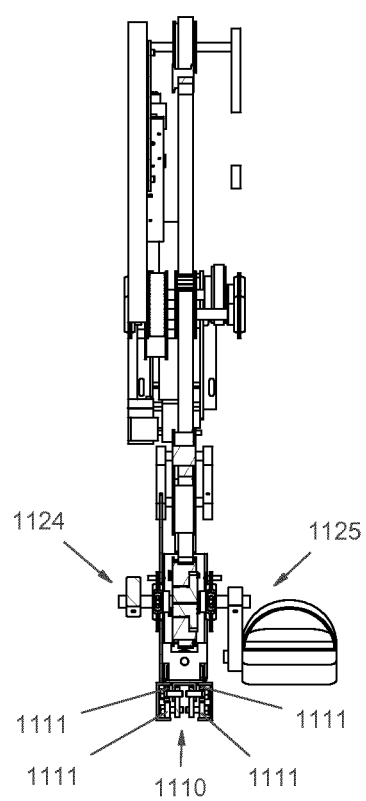
FIG. 52 is a front cross-sectional view of the combination hand crank and foot crank exercise and rehabilitation device of FIG. 51 taken along line 52-52.
Figure 53:
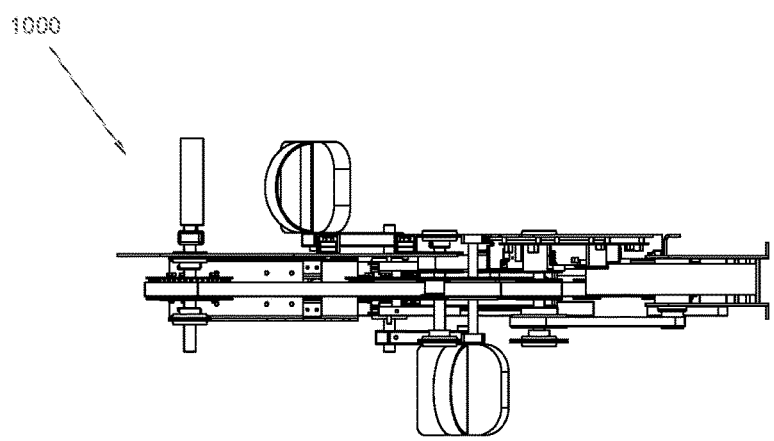
FIG. 53 is a top view of a portion of the combination hand crank and foot crank exercise and rehabilitation device of FIGS. 51-52, according to an exemplary embodiment.
Figures 54, 55:
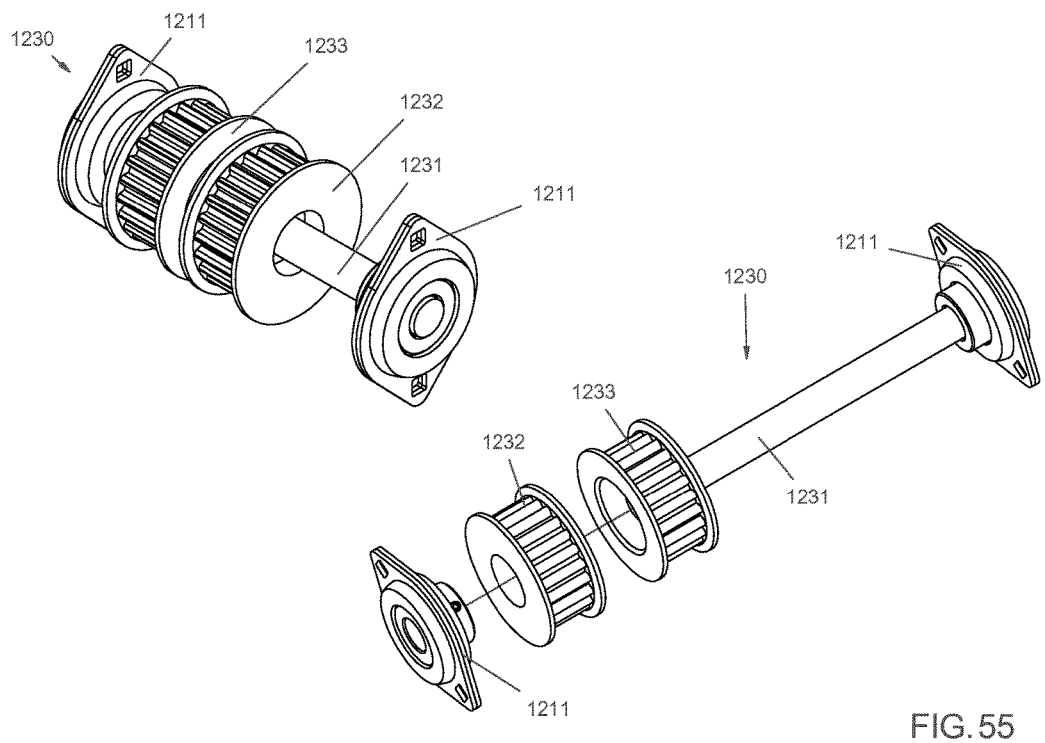
FIG. 54 is a perspective view of a front shaft assembly for the combination hand crank and foot crank exercise and rehabilitation device of FIG. 47, according to an exemplary embodiment.
FIG. 55 is an exploded assembly view the front shaft assembly of FIG. 54.
Figures 56, 57, 58:
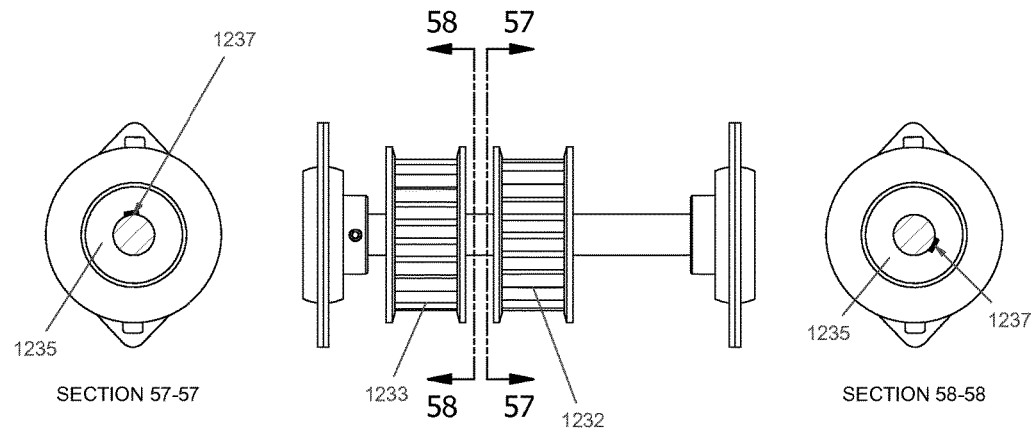
FIG. 56 is a front view of the front shaft assembly of FIG. 54.
FIG. 57 is a cross-sectional view of the front shaft assembly of FIG. 56 taken along line 57-57.
FIG. 58 is a cross-sectional view of the front shaft assembly of FIG. 56 taken along line 58-58.
Figures 61, 62, 63:
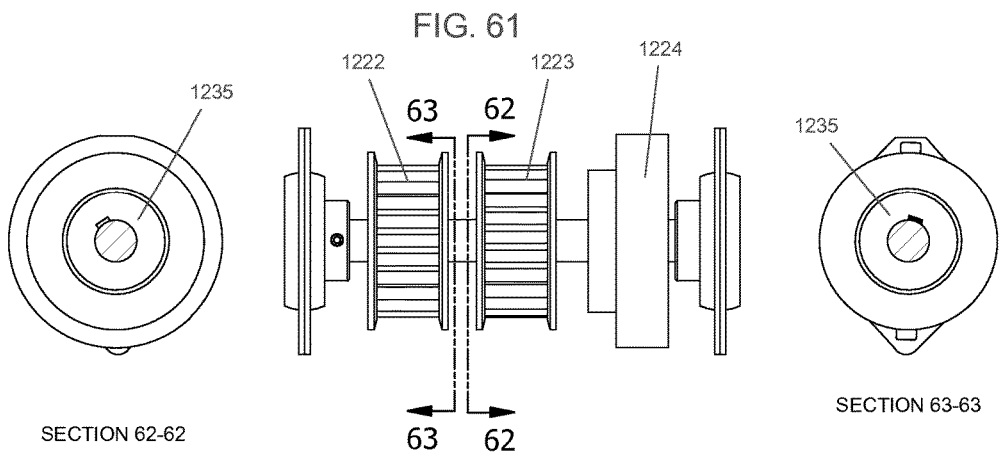
FIG. 61 is a front view of the drive shaft assembly of FIG. 59.
FIG. 62 is a cross-sectional view of the drive shaft assembly of FIG. 61 taken along line 62-62.
FIG. 63 is a cross-sectional view of the drive shaft assembly of FIG. 61 taken along line 63-63.

The drive shaft assembly 1220 and front shaft assembly 1230 are shown in greater detail in regard to FIGS. 55-58 (front shaft assembly 1230) and FIGS. 59-63 (drive shaft assembly 1220). As shown in FIGS. 48-52, the front shaft assembly 1230 includes a shaft 231 (e.g., rod, cylinder, etc.) supported on each end by a bearing 1211. Each bearing 1211 is fixedly attached to the left and right panels 1002, 1003 of the housing 1001, such that the shaft 1231 extends between the panels 1002, 1003. As shown, the bearings 1211 are structured as self-aligning flange bearings for supporting the shaft 1231 and permitting bi-directional rotation of the shaft 1231. The front shaft assembly 1230 includes two one-way pulley assemblies, shown as main drive pulley 1232 and pulley 1233. The one-way pulley assemblies 1232, 1233 are shown to include a one-way bearing 1235 that couples the pulley to the shaft 1231 via a key and keyway combination 1237. As shown in FIGS. 50-51, the main drive belt 1150 is at least partially disposed over the main drive pulley 1232 while the belt 1260 is at least partially disposed over the pulley 1233. Analogous to the upper shaft assembly 230 in FIGS. 1-46, the one-way pulley assemblies are configured to engage the shaft 1231 to cause rotation during a first rotational direction and freewheel (i.e., not cause rotation of the shaft 1231) during a second rotational direction that is opposite the first rotational direction. Thus, the one-way aspect or feature of the pulleys 1232, 1233 constrain each of the pulleys 1232, 1233 to only one torque-transmitting rotational direction.

In the embodiment depicted, each of the pulleys 1232, 1233 may be configured like the pulley assembly 500 (see, e.g., FIGS. 29-31 and the description herein), but with the pulley 1232 facing the pulley 1233. In this regard, the pulley 1232 transmits torque to the shaft 1231 (i.e., outside-to-inside) when the belt 1150 is driven clockwise and the pulley 1232 freewheels (i.e., spins freely with no torque transmission) when the belt 1150 is driven counterclockwise. Due to the opposite orientation, the pulley 1233 transmits torque to the shaft 1231 upon a counterclockwise torque and the shaft 1231 transmits torque to the pulley 1233 upon a clockwise torque from the shaft 1231.

As shown in FIGS. 60-63, the drive shaft assembly 1220 includes a shaft 1221 supported by a pair of bearings 1211 that are fixedly attached to the left and right panels 1002, 1003 of the housing 1001. The shaft 1221 defines a keyway 1227 that engages with a key of each of the one-way bearings 1235 (one for each of the pulleys 1222, 1223) to rotatably couple the pulleys 1222 and 1223 to the shaft 1221. The drive shaft assembly 1220 is also shown to include a generator pulley 1224. The generator pulley 1224 is coupled with the generator 1210 via a generator belt 1265. In one embodiment, the generator pulley 1224 is structured as a v-shaped pulley while the generator belt 1265 is structured as a v-shaped belt. Rotation of the belt 1265 in the power rotational is structured to generate electricity via the generator 1210 to power one more components in/on device 1000 (or, via the device 1000, such as a USB port).

In the embodiment depicted, the pulley 1223 may be configured like the pulley assembly 500 (see FIGS. 29-31 and the description herein), such that a counterclockwise torque causes the pulley 1223 to freewheel and a clockwise torque causes the pulley 1223 to transmit the torque to the shaft 1221. In comparison, the pulley 1222 may be configured like the assembly 400 (see FIGS. 26-28 and the description herein), such that a clockwise torque causes the pulley 1222 to transmit the torque to the shaft 1221 and a counterclockwise torque causes the pulley 1222 to freewheel.

As shown (see, e.g., FIGS. 50-51), the main drive belt 1150 is at least partially disposed over the main drive pulley 1223 while the belt 1260 is at least partially disposed over the pulley 1222. The main drive belt 1150 is also at least partially disposed over the pulley 1232 while the belt 1260 is at least partially disposed over the pulley 1233. In this regard, the main drive belt 1150 rotatably couples the main drive pulley 1223 to the pulley 1232 while the belt 1260 rotatably couples the pulley 1233 to the pulley 1222.

Figure 47:
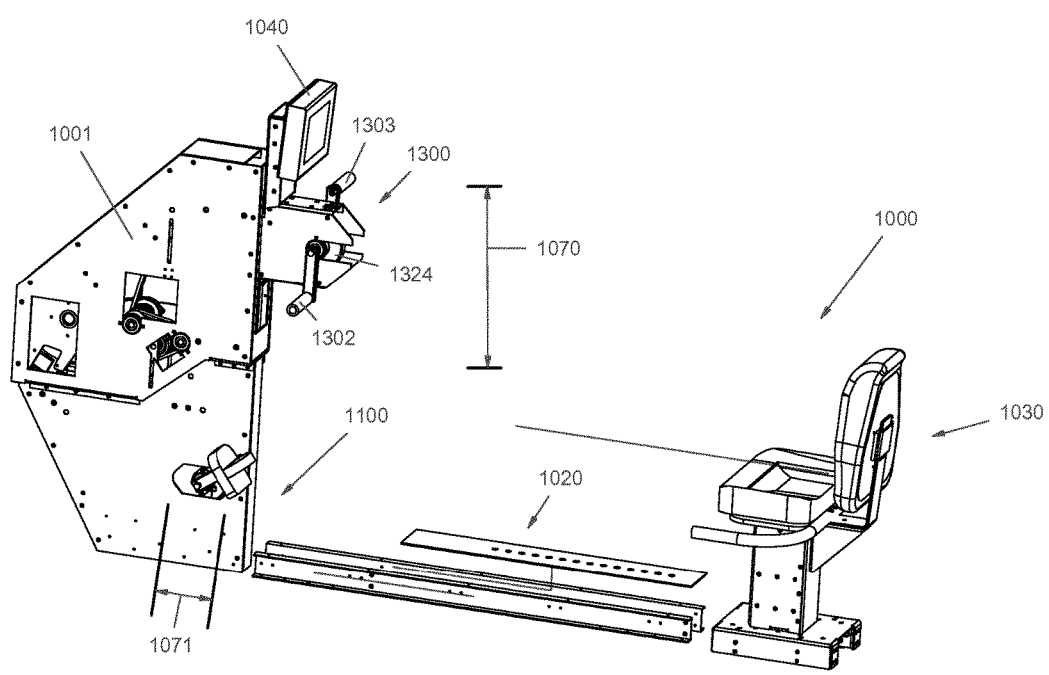
FIG. 47 is a partially exploded perspective view of another exemplary embodiment of a combination hand crank and foot crank exercise and rehabilitation device.

Referring back to FIGS. 47-53, the hand crank system 1300 is shown to include a housing 1301 slidably coupled to the housing 1001, protrusions 1304 extending from the housing 1301 on the left and right sides of the housing 1301, a front shaft assembly 1320, left and right hand cranks 1302, 1303, an assistive device shown as a gas-spring assist device 1330, and a pair of tension assemblies 1340. As shown in FIG. 47, the hand crank system 1300 (more particularly, housing 1301) is translatable in the vertical direction 1070. As shown in FIGS. 48-49, a pair of channels 1010 (e.g., u-channel, guide rails, guides, etc.) are coupled to an interior side of the left and right panels 1002, 1003 of the housing 1001. The channels 1010 are configured to receive the protrusions 1304 (e.g., rollers, wheels, casters, etc.) extending from the housing 1301. Accordingly, the housing 1301 is slidable with respect to the panels 1002, 1003 due to the interaction of the protrusions 1304 and the channels 1010.

Similar to the gas-spring assist device 1130, the gas-spring assist device 1330 is structured like the other gas-spring assist devices described herein in regard to FIGS. 1-46 (e.g., gas spring assist device 335). Accordingly, upon activation of a triggering mechanism (e.g., button, switch, etc.), the gas-spring assist device 1330 exerts a vertical force on the housing 1301 to cause the housing 1301 move in a vertical direction 1070 via the interaction of the rollers protrusions 1304 and the channels 1010. A lower end of the gas-spring assist device 1330 is attached to a bracket 1331 that is fixedly coupled to the housing 1001 (e.g., lower left and right panels 1006, 1007). In one embodiment, the gas-spring assist device 1330 only exerts a force to push the housing 1301 upwards. In another embodiment, the gas-spring assist device 1330 may be structured to exert a force a force to either move the housing 1301 upwards or downwards. In a turn, a user may place the hand cranks 1322, 1323. Further, once the desired location for the housing 1301 is achieved, the gas-spring assist device 1330 provides a holding force to the housing 1301 to hold the housing 1301 in the desired position.

The front shaft assembly 1320 includes a shaft 1321 rotatably coupled to left and right arm cranks 1322, 1323, and a pulley 1324 interconnected with the shaft 1321 (e.g., directly mounted on the shaft 1321). As shown, each of the left and right hand cranks 1322, 1323 include a handle coupled to an arm that is rotatably or fixedly coupled to the shaft 1321. The handles may freely rotate with respect to the arm. A bicycle-force applied to the pedals cranks 1322, 1323 causes the shaft 1321 to rotate due to the coupling to the shaft 1321. As shown, the shaft 1321 is supported by bearings 1325 (e.g., flange bearings, such as bearings 211) coupled to left and right sides of the housing 1301. The pulley 1324 is interconnected with the shaft 1121 (e.g., directly mounted on) and disposed within the housing 1301 (e.g., between the bearings 1325). As shown, the main drive belt 1150 is at least partially disposed over the pulley 1324. Accordingly, the pulley 1324 may be structured as a toothed pulley to complement the toothed nature (e.g., ribbed) of the belt 1150.

To maintain adequate tension for the main drive belt 1150 throughout the device 1000, several tension assemblies may be used. As shown most clearly in FIG. 45, a pair of rollers 1340 are coupled to the housing 1301 and configured to maintain tension in the belt 1150 when the device 1000 is in use and when the position of the housing 1301 is vertically adjusted. The rollers 1340 may freely rotate or be stationary, such that the belt 1150 slides over the rollers 1340 in use. Furthermore, positioned near a vertical top of the housing 1001 and attached to the housing 1001, a pulley 1342 coupled to a tension arm 1360 is configured to engage with the belt 1150 and also apply tension to the belt 1150. It should be understood that more, fewer, or different tension-providing devices may be included in the device 1000 and configured to apply tension to any of the belts (e.g., main drive belt 1150, belt 1260, or generator belt 1265). Accordingly, the tension assembly configuration is shown for illustrative purposes only.

With the above description of each of the foot crank system 1100, center body 1200, and hand crank system 1300, operation of the main drive belt 1150 during use of the device 1000 may be described as follows. In a first configuration, at least one of the hand cranks and foot cranks are rotated clockwise, which drives the main drive belt 1150 clockwise. From this rotation, the clockwise rotation causes a clockwise torque on the pulley 1232 and a counterclockwise torque on the pulley 1223. Thus, the pulley 1223 freewheels while the pulley 1232 transfers a clockwise torque to the shaft 1231. Due to the clockwise rotation of the shaft 1231, the clockwise torque is transmitted from the shaft 1231 to the pulley 1233 and the belt 1260 is driven clockwise. Due to the clockwise rotation of the belt 1260, the pulley 1222 transmits the clockwise torque to the shaft 1221. While the shaft 1221 then free spins within the pulley 1223, the clockwise rotating shaft 1221 causes the generator pulley 1224 to rotate clockwise, which drives the generator 1210.

In a second configuration, at least one of the foot cranks and hand cranks are driven counterclockwise, which drives the main drive belt 1150 counterclockwise. This rotation causes a counterclockwise torque on the pulley 1232, such that the pulley 1232 does not transmit the counterclockwise torque to the shaft 1231. In comparison, the belt 1150 causes a clockwise torque on the pulley 1223. This rotation causes the pulley 1223 to transmit the clockwise torque to the shaft 1221. The shaft 1221 free spins in the pulley 1233 but drive the generator pulley 1224 clockwise to drive the generator 1210. Therefore, the belt 1260 remains stationary during counterclockwise rotation of the belt 1150.

Accordingly and analogous to the embodiment of FIGS. 1-46, a clockwise rotation of the main drive belt 1150 causes engagement of both the belts 1150, 1260 while a counterclockwise rotation of the main drive belt 1150 only causes driving of the belt 1150. Thus, a counterclockwise rotational direction may correspond with relatively less resistance than a clockwise rotational direction of the belt 1150. It should be understood that the bi-directional shaft assembles 1220, 1230 may include position retaining mechanisms, such as snap rings, for each of the pulley assemblies in order to maintain their intended location longitudinally on the shafts 1221, 1231.

Thus, the device 1000 may also function to provide exercise and rehabilitation to a user via use of at least one of the hand cranks and foot cranks in an analogous manner to the device 10.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure.

It is important to note that the constructions and arrangements of the exercise and rehabilitation device as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed:

1. A recumbent therapeutic and exercise device, comprising:
    a frame;
    a hand crank system coupled to the frame, the hand crank system including a hand crank rotatable by a user, wherein the hand crank is adjustable in a substantially vertical plane closer to and further from a support surface for the frame;
    a foot crank system coupled to the frame, the foot crank system including a foot crank rotatable by the user, the foot crank system further comprising:
        a housing;
        a rail coupled to the housing and a bracket coupled to the frame, the rail and bracket being movable relative to one another;
        a front shaft rotatably coupled to the housing and proximate a front end of the frame, wherein the foot crank is rotatably coupled to the front shaft; and
        a rear shaft rotatably coupled to the front shaft; and
    a seat configured to a receive the user of the recumbent therapeutic and exercise device, wherein the seat is movable closer to and further from the foot crank system;
    wherein the front shaft and the foot crank of the foot crank system are horizontally adjustable fore and aft relative to the seat as a result of the movement of the rail and the bracket relative to one another.

2. The recumbent therapeutic and exercise device of claim 1, wherein the foot crank is rotatably coupled to the hand crank such that rotation of one of the foot crank or the hand crank results in rotational movement of the other of the foot crank or the hand crank.

3. The recumbent therapeutic and exercise device of claim 1, further comprising a first gas-spring device and a second gas-spring device, the first gas-spring device configured to provide an assistive force to aid adjustment of the foot crank in the substantially horizontal plane and the second gas-spring device configured to provide an assistive force to aid adjustment of the hand crank in the substantially vertically plane.

4. The recumbent therapeutic and exercise device of claim 3, wherein the first gas-spring device provides the assistive force in only one horizontal direction in the substantially horizontal plane while the second gas-spring device provides the assistive force in only one vertical direction in the substantially vertical plane.

5. The recumbent therapeutic and exercise device of claim 1, wherein the hand crank system includes:
a housing;
an upper arm assembly coupled to the housing, the upper arm assembly comprising:
a front shaft assembly coupled to the hand crank; and
a rear shaft assembly coupled to the front shaft assembly;
wherein the upper arm assembly is oriented at an angle relative to a horizontal plane.

6. The recumbent therapeutic and exercise device of claim 5, further comprising a slide assembly including:
a rail coupled to the housing of the hand crank system, wherein the upper arm assembly is slidably translatable along the rail in the substantially vertically plane.

* * * * *